United States Patent
Huang et al.

(10) Patent No.: US 12,446,008 B2
(45) Date of Patent: Oct. 14, 2025

(54) METHOD AND APPARATUS FOR SIDELINK TRANSMISSION IN UNLICENSED SPECTRUM IN A WIRELESS COMMUNICATION SYSTEM

(71) Applicant: ASUS Technology Licensing Inc., Taipei (TW)

(72) Inventors: Chun-Wei Huang, Taipei (TW); Ming-Che Li, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/890,387

(22) Filed: Sep. 19, 2024

(65) Prior Publication Data

US 2025/0097903 A1  Mar. 20, 2025

Related U.S. Application Data

(60) Provisional application No. 63/539,286, filed on Sep. 19, 2023.

(51) Int. Cl.
*H04W 72/02* (2009.01)
*H04W 16/14* (2009.01)
*H04W 74/0808* (2024.01)

(52) U.S. Cl.
CPC ........... *H04W 72/02* (2013.01); *H04W 16/14* (2013.01); *H04W 74/0808* (2013.01)

(58) Field of Classification Search
CPC .. H04W 72/02; H04W 16/14; H04W 74/0808
See application file for complete search history.

(56) References Cited

U.S. PATENT DOCUMENTS

2021/0099975 A1 *  4/2021  Wu ..................... H04L 1/1819
2023/0063943 A1    3/2023  Ding et al.
(Continued)

OTHER PUBLICATIONS

Moderator (Oppo); FL summary #2 for AI 8.2.1.1: SL-U channel access mechanism; 3GPP TSG RAN WG1 #114bis; R1-2310289; Oct. 9-13, 2023; 102 pages.

*Primary Examiner* — Siren Wei
(74) *Attorney, Agent, or Firm* — Skaar Ulbrich Macari, P.A.

(57) ABSTRACT

Methods, systems, and apparatuses are provided for sidelink transmission in unlicensed spectrum in a wireless communication system, wherein a method comprises receiving a configuration for configuring a first sidelink resource pool, triggering or requesting sensing-based resource selection or re-selection for performing one or more sidelink transmissions in the first sidelink resource pool, wherein one parameter is provided or determined or used to indicate a second number of consecutive Transmission Time Intervals (TTIs) being larger than one, determining a set of candidate resources, comprising: determining a first number of candidate resources in a resource selection window, wherein the first number of candidate resources comprises only candidate resources where each candidate resource starts in a TTI associated with the first sidelink resource pool and has the second number of consecutive TTIs in the first sidelink resource pool, and the second number of consecutive TTIs are consecutive in physical TTIs.

15 Claims, 13 Drawing Sheets

(56) References Cited

U.S. PATENT DOCUMENTS

| | | | |
|---|---|---|---|
| 2023/0254898 A1* | 8/2023 | Cheng | H04W 74/0816 |
| | | | 370/329 |
| 2024/0276453 A1* | 8/2024 | Medina | H04L 5/0044 |
| 2024/0306198 A1* | 9/2024 | Yu | H04W 16/14 |
| 2024/0340934 A1* | 10/2024 | Ye | H04W 72/40 |

* cited by examiner

US 12,446,008 B2

METHOD AND APPARATUS FOR SIDELINK TRANSMISSION IN UNLICENSED SPECTRUM IN A WIRELESS COMMUNICATION SYSTEM

CROSS-REFERENCE TO RELATED APPLICATIONS

The present Application claims priority to and the benefit of U.S. Provisional Patent Application Ser. No. 63/539,286, filed Sep. 19, 2023, which is fully incorporated herein by reference.

FIELD

This disclosure generally relates to wireless communication networks and, more particularly, to a method and apparatus for sidelink transmission in unlicensed spectrum in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for sidelink transmission in unlicensed spectrum in a wireless communication system, wherein a method of a first User Equipment (UE) comprises receiving a configuration for configuring one or more sidelink resource pools comprising a first sidelink resource pool, wherein the first sidelink resource pool is configured in a first carrier associated with or in unlicensed or shared spectrum, triggering or requesting sensing-based resource selection or re-selection for performing one or more sidelink transmissions in the first sidelink resource pool, wherein one parameter is provided or determined or used to indicate a second number of consecutive Transmission Time Intervals (TTIs) being larger than one, determining a set of candidate resources, comprising: determining a first number of candidate resources in a resource selection window, wherein the first number of candidate resources comprises only candidate resources where each candidate resource starts in a TTI associated with the first sidelink resource pool and has the second number of consecutive TTIs in the first sidelink resource pool, and the second number of consecutive TTIs are consecutive in physical TTIs, and determining the set of candidate resources from the first number of candidate resources, wherein a third number of candidate resources in the set of candidate resources is larger than or equal to X % of the first number of candidate resources, selecting one or more resources, from the set of candidate resources, for sidelink transmission in the first sidelink resource pool, and performing a sidelink transmission on at least one of the selected one or more resources.

In various embodiments, a method of a first UE comprises receiving a configuration for configuring one or more sidelink resource pools comprising a first sidelink resource pool, wherein the first sidelink resource pool is configured in a first carrier associated with or in unlicensed or shared spectrum, triggering or requesting sensing-based resource selection or re-selection for performing one or more sidelink transmissions in the first sidelink resource pool, wherein one parameter is provided or determined or used to indicate a second number of consecutive TTIs being larger than one, determining a set of candidate resources, comprising: determining a first number of candidate resources in a resource selection window, wherein the first number of candidate resources does not comprise a first candidate resource which starts in a TTI associated with the first sidelink resource pool and has the second number of consecutive TTIs in the first sidelink resource pool, and at least two consecutive TTIs of the second number of consecutive TTIs of the first candidate resource are not consecutive in physical TTIs, and determining the set of candidate resources from the first number of candidate resources, wherein a third number of candidate resources in of the set of candidate resources is larger than or equal to X % of the first number of candidate resources, selecting one or more resources from the set of candidate resources for sidelink transmission in the first sidelink resource pool, and performing a sidelink transmission on at least one of the selected one or more resources.

In various embodiments, a method comprises receiving a configuration for configuring a first sidelink resource pool, triggering or requesting sensing-based resource selection or re-selection for performing one or more sidelink transmissions in the first sidelink resource pool, wherein one parameter is provided or determined or used to indicate a second number of consecutive TTIs being larger than one, determining a set of candidate resources, comprising: determining a first number of candidate resources in a resource selection window, wherein the first number of candidate resources comprises only candidate resources where each candidate resource starts in a TTI associated with the first sidelink resource pool and has the second number of consecutive TTIs in the first sidelink resource pool, and the second number of consecutive TTIs are consecutive in physical TTIs.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1]3GPP specification 38.321 v16.7.0; [2]R1-2308756, Editor's summary on draft CR 37.213 for SL-U; [3]R1-2308720, Introduction of specification enhancements for NR sidelink evolution; [4]R1-2308714, Introduction of Rel-18 NR sidelink evolution; [5]3GPP TS 38.331 V17.0.0 (2022-03) 3rd Generation Partnership Project; Technical Specification Group Radio Access Network; NR; Radio Resource Control (RRC) protocol specification (Release 17); and [6] RP-222806. The standards and documents listed above are hereby expressly and fully incorporated herein by reference in their entirety.

Figure 1:
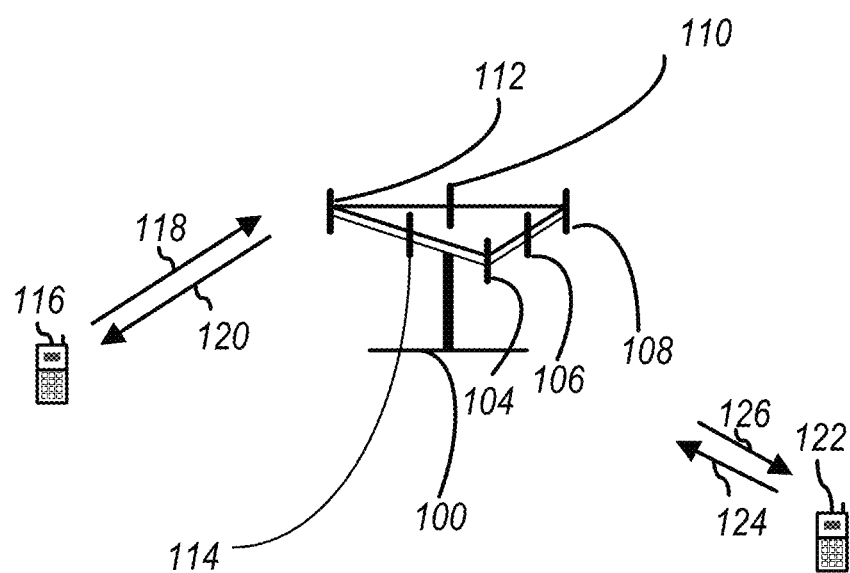
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
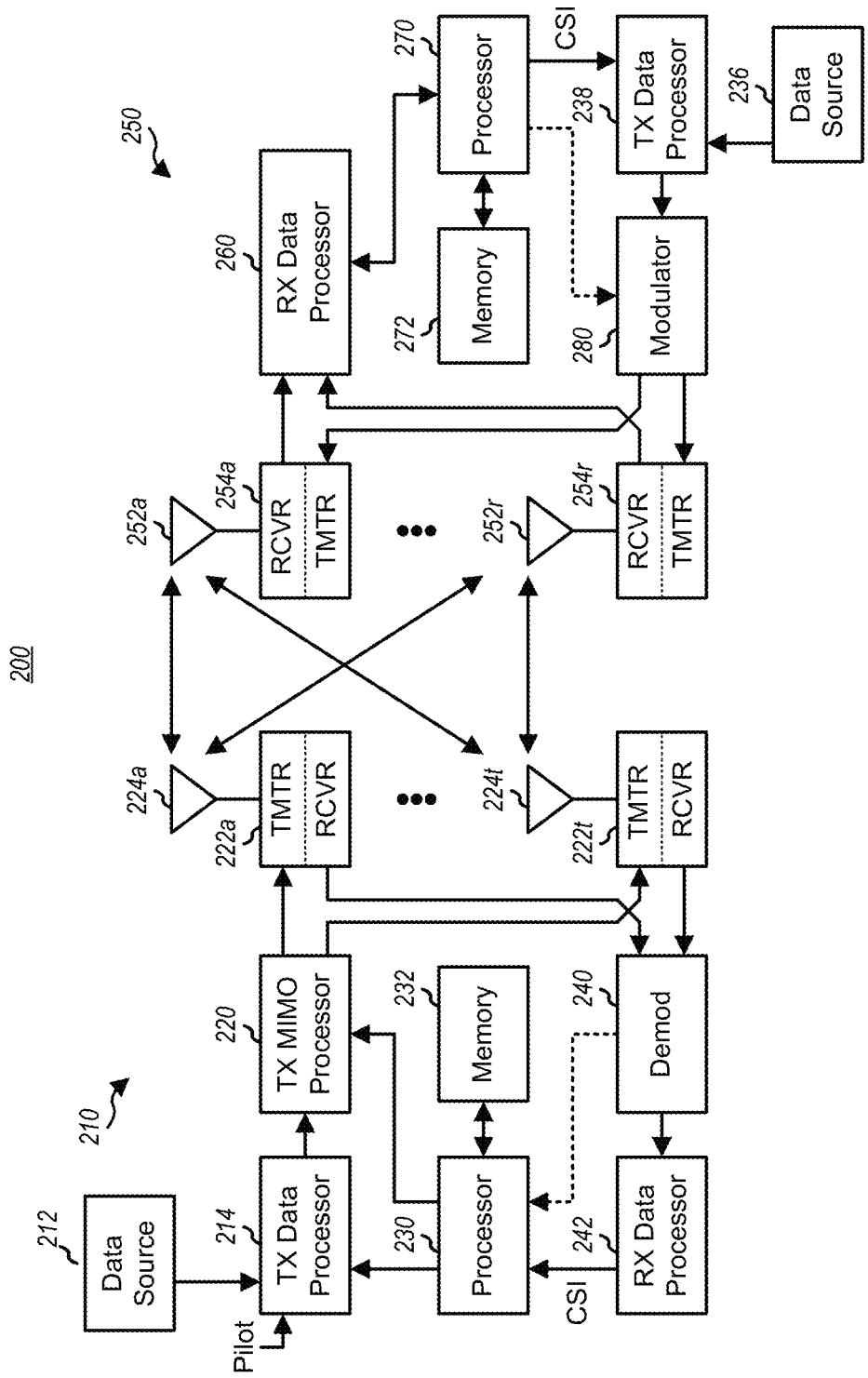
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from NR receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
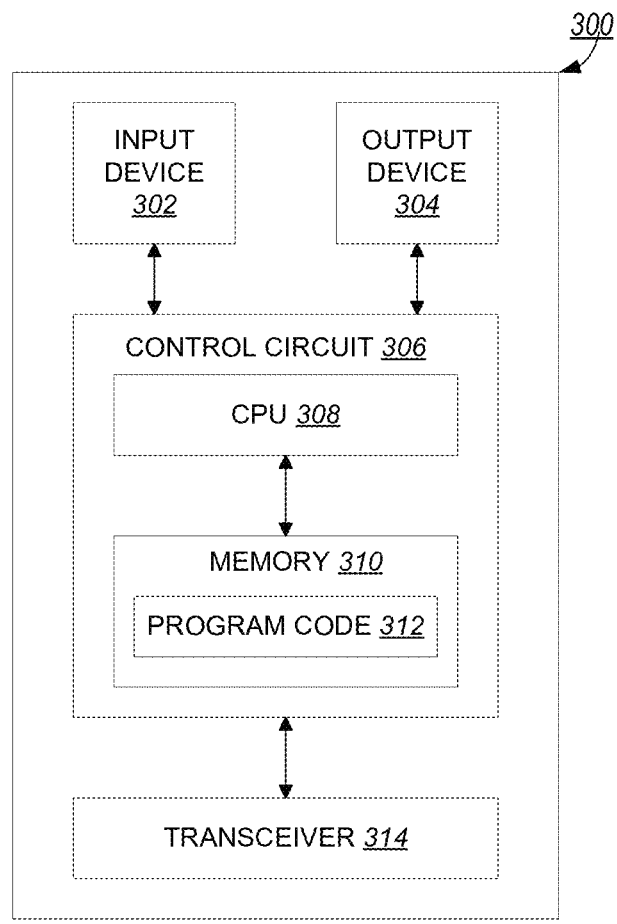
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
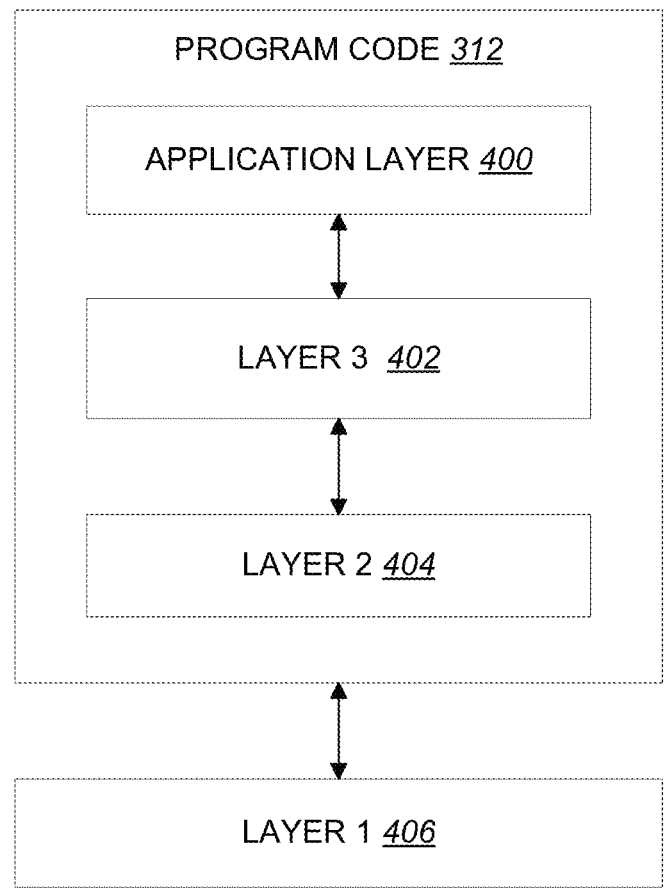
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or NR systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In [1]3GPP specification 38.321 v16.7.0, RAN1 agreements till now for SL unlicensed spectrum are quoted below.

1 Objective #2: NR Sidelink on Unlicensed Spectrum (SL-U)

1.1 RAN1 #109-e (09-20 May 2022)

Channel access and resource allocation

---

Agreement
Type 1 and Type 2 (2A/2B/2C) channel access procedures, transmission gap and LBT sensing idle time requirements specified in TS37.213 for NR-U are taken as baseline for NR sidelink operation in a shared channel.
Agreement
UE-to-UE COT sharing is supported in NR sidelink operation in a shared channel (SL-U).
Agreement
The existing sidelink mode 1 RA including dynamic grant, Type 1 and Type 2 configured grants are supported as a baseline for sidelink operation in a shared carrier, subject to applicable regional regulations.
At least in dynamic channel access, SL UE performs Type 1 or one of the Type 2 LBTs before SL-transmission using the allocated resource(s), in compliance with transmission gap and LBT sensing idle time requirements specified in TS37.213.
The existing sidelink mode 2 RA schemes are supported as a baseline for sidelink operation in a shared carrier, subject to applicable regional regulations. At least in dynamic channel access, SL UE performs Type 1 or one of the Type 2 LBTs before SL transmission using the selected and/or reserved resources, in compliance with transmission gap and LBT sensing idle time requirements specified in TS37.213.

---

PHY structure and procedures

---

Agreement
SL BWP, SL resource pool in R16/R17 NR SL and RB set in R16 NR-U are reused for SL-U as baseline
Only one SL BWP is (pre-)configured within a carrier
The SL BWP is (pre-)configured to include one or multiple SL resource pools
At least support that one SL resource pool can be (pre-)configured to include integer number of RB sets
PRBs within intra-cell guard band of two adjacent RB sets belong to a resource pool if the resource pool includes the two adjacent RB sets
Agreement
For PSCCH and PSSCH in SL-U:
Both R16/R17 NR SL contiguous RB-based and R16 NR-U interlace RB-based transmissions are considered as starting point

---

1.2 RAN1 #110 (22-26 Aug. 2022)

Channel access and resource allocation

---

Agreement
Type 2A/2B/2C SL channel access procedures
Type 2A channel access procedure is applicable to the following case:
Transmission(s) by a UE following transmission(s) by another UE for a gap ≥25 μs in a shared channel occupancy
FFS any other transmission by a UE (e.g., other than COT sharing)
FFS whether Type 2A is used also for the case of short control signalling transmission
Type 2B channel access procedure is applicable to the following case:
Transmission(s) by a UE following transmission(s) by another UE at least when the gap is 16 μs in a shared channel occupancy
FFS the case when the gap is between 16 and 25 us
FFS any other transmission by a UE (e.g., other than COT sharing)
Type 2C channel access procedure is applicable to the following case:
Transmission(s) by a UE following transmission(s) by another UE for a gap ≤16 μs in a shared channel occupancy and the duration of the corresponding transmission is at most 584 us.
FFS any other transmission by a UE (e.g., other than COT sharing)
FFS whether Type 2C is used also for the case of short control signalling transmission
FFS under which conditions (other than the gap) UEs can apply the Type 2A/2B/2C SL channel access procedures
FFS under which conditions Type 2B or Type 2C is applied in case of a gap of 16 μs
Agreement
Multi-consecutive slots transmission (MCSt) is supported for Mode 1 and Mode 2 resource allocation in SL-U.
FFS details
Agreement
For UE-to-UE COT sharing, continue considering the following alternatives:
Alt. 1: A responding SL UE can utilize a COT shared by a COT initiating UE when the responding SL UE is a target receiver of the at least COT initiating UE's PSSCH data transmission in the COT.
When the responding UE uses the shared COT for its transmission has an equal or smaller CAPC value than the CAPC value indicated in a shared COT information
FFS any additional conditions
Alt. 2: A responding SL UE can utilize a COT shared by a COT initiating UE when the responding SL UE is a target receiver of the COT initiating UE's transmission in the COT.
When the responding UE uses the shared COT for its transmission has an equal or smaller CAPC value than the CAPC value indicated in a shared COT information
FFS how to determine a SL UE is a target receiver
FFS: details of the channel type of the COT initiating UE's transmission
FFS any additional conditions
For Alt1 and Alt2: When a responding UE uses a shared COT for its transmission(s), the COT initiating UE is a target receiver of the responding UE's transmission(s).
FFS: details of the channel type of the responding UE's transmission(s)

---

PHY structure and procedures

---

Agreement
For PSCCH and PSSCH in SL-U:
Both R16/R17 NR SL contiguous RB-based and interlace RB-based transmissions similar to R16 NR-U are supported
Agreement
If RAN1 decides that LBT is performed for S-SSB transmission, in addition to the S-SSB occasions in R16/R17 NR SL design, support additional candidate S-SSB occasions

1.3 RAN1 #110bis-e (10-19 Oct. 2022)

Channel access and resource allocation

PHY structure and procedures

Agreement
For interlace RB-based PSCCH/PSSCH transmission in SL-U:
Regarding 1 sub-channel equals K interlace(s)
At least K = 1 and K = 2 is supported for 15 kHz SCS
At least K = 1 is supported for 30 kHz SCS
FFS: details related to multiple RB sets
Working assumption:
Support maximum 2 candidate starting symbols within a slot for a PSCCH/PSSCH transmission.
RAN1 strives to have unified design for PSCCH/PSSCH transmission from $1^{st}$ or $2^{nd}$ starting symbol
The candidate starting symbol(s) are intended for AGC purpose
Agreement
For PSCCH and PSSCH in SL-U:
PSCCH is transmitted within 1 sub-channel
At least support Option 1 below
Option 1: PSCCH locates in the lowest sub-channel of lowest RB set of corresponding PSSCH
Note:
the lowest sub-channel may not be entirely contained in the lowest RB set
FFS whether/how to handle the case where UEs supporting different bandwidths can use the same resource pool to communicate with each other, e.g., whether/how to additionally support Option 2 below
Option 2: PSCCH locates in every RB set of corresponding PSSCH
Note:
the above options do not imply any restriction on the mapping of sub-channels to PRBs.
FFS other details
Agreement
Regarding usage of PRBs within intra-cell guard band of two adjacent RB sets:
Such PRBs can be used for PSSCH transmission if and only if a UE can transmit on the respective LBT channels after performing channel access procedure in multi-channel case and the UE uses both of these two RB sets for PSSCH transmission
Such PRBs are not used for PSCCH transmission
Agreement
At least R16/R17 NR SL S-SSB slots are excluded from SL resource pool.
Agreement
Regarding additional candidate S-SSB occasions:
Their number and time domain locations are (pre-)configured or pre-defined

1.4 RAN1 #111 (14-18 Nov. 2022)

Channel access and resource allocation

Agreement
Type 2A channel access procedure is applicable for S-SSB transmissions from a UE without a shared channel occupancy, when the following constraints are met:
Time duration is at most 1 ms per transmission
The duty cycle of the S-SSB transmissions is at most 1/20
Agreement
For dynamic channel access mode with multi-channel case in SL-U, use NR-U DL (Type A or Type B) multi-channel access procedure as the baseline for multiple PSFCH transmissions on multiple channels, where each PSFCH transmission is confined within one LBT channel
Agreement
For UE-to-UE COT sharing,
When performing S-SSB transmission(s), a responding UE can utilize a COT shared by a COT initiating UE (using type 1 channel access) when the responding UE is intended to transmit S-SSB within RB set(s) corresponding to the shared COT. When performing PSFCH transmission(s), a responding UE can utilize a COT shared by a COT initiating UE at least when at least one of the responding UE's PSFCH transmissions in a symbol/slot within RB set(s) corresponding to the shared COT is intended for the COT initiating UE.

-continued

When performing PSSCH/PSCCH transmission(s), a responding UE can utilize a COT shared by a COT initiating UE at least when the responding UE's PSSCH/PSCCH transmission(s) within RB set(s) corresponding to the shared COT is intended for the COT initiating UE

PHY structure and procedures

Agreement
Slots with PSFCH symbols only have 1 candidate starting symbol for PSCCH/PSSCH.

1.5 RAN1 #112 (27 February-3 March, 2023)

Channel access and resource allocation

Agreement
The CAPC level that should be used for S-SSB transmissions:
Option 1: CAPC value (p) should be set to 1 when UE performs Type 1 channel access procedure for S-SSB transmission
Agreement
The CAPC level that should be used for PSFCH transmission, CAPC value (p) should be set to 1 when UE performs Type 1 channel access procedure for PSFCH transmission
Agreement
A responding UE over a shared COT can be:
a receiving UE, which is the target of a PSCCH/PSSCH transmission of a COT initiator
In the case of unicast from the COT initiator, within the same COT when the source and destination IDs contained in the COT initiator's SCI match to the corresponding destination and source IDs relating to the same unicast at the receiving UE
In the case of groupcast and broadcast, when the destination ID contained in the COT initiator's SCI match to a destination ID known at the receiving UE
a UE identified by ID(s), if additional IDs are supported in the COT sharing information (in addition to the source and destination IDs of the PSCCH/PSSCH transmission), when additional IDs are included in the COT sharing information from the COT initiator
FFS Limitations on what additional IDs may be included and how they may be indicated
Agreement
A responding UE's SL transmission(s) within RB set(s) corresponding to a shared COT can be transmitted when the CAPC value(s) of the SL transmission(s) have an equal or smaller CAPC value than the CAPC value indicated in the COT sharing information.
Agreement
A responding UE's PSSCH/PSCCH transmission(s) within RB set(s) corresponding to a shared COT is intended for the COT initiating UE when,
In the case of unicast from the responding UE, when the source and destination IDs contained in the responding UE's PSCCH/PSSCH match to the destination and source IDs from a COT initiator's unicast transmission that included COT sharing information, or match to the additional ID(s) included in the COT sharing information (if supported)
In the case of groupcast or broadcast from the responding UE, when the destination ID contained in the responding UE's PSCCH/PSSCH matches to the destination ID from a COT initiator's groupcast or broadcast transmission that included COT sharing information, or matches to the additional ID(s) included in the COT sharing information (if supported)
FFS: all other details and additional restrictions

PHY structure and procedures

Agreement
For slots with 2 candidate starting symbols for a PSCCH/PSSCH transmission:
The location of $1^{st}$ starting symbol can be (pre)configured from {#0, #1, #2, #3, #4, #5, #6} per BWP
By default (if no (pre)configuration), the location of the $1^{st}$ starting symbol is symbol#0

The location of $2^{nd}$ starting symbol is (pre-)configured from
{#3, #4, #5, #6, #7} per BWP
It shall be configured such that within a slot, the number of
symbols used for PSCCH/PSSCH transmission from $2^{nd}$ starting
symbol is not smaller than 6
It shall be configured such that within a slot, the $2^{nd}$ starting
symbol is later than the $1^{st}$ starting symbol
PSCCH/PSSCH transmission starting from $1^{st}$ or $2^{nd}$ starting symbol
shall have the same endingsymbol within a slot
Note:
assume symbol index in a slot starts from #0
Agreement
For interlace RB-based PSCCH/PSSCH transmission in SL-U:
Regarding mapping between sub-channel and interlace, 1 sub-channel
is defined and indexed within 1 RB set, and is periodically indexed
across different RB sets within the resource pool
Agreement
For contiguous RB-based PSCCH/PSSCH transmission in SL-U:
Regarding mapping between sub-channel and PRBs, down-select one of
the followings during RAN1#112:
Option 1 (sub-channel aligns with resource pool boundary): Same as
in legacy NR SL, i.e., the mapping of sub-channel starts from the
first PRB of the resource pool and mapped sequentially within the
resource pool according to the sub-channel size

1.6 RAN1 #112bis-e (17-26 April, 2023)
Channel access and resource allocation Agreement
The existing NR-U EDT procedures for uplink transmissions is
taken as the baseline for SL-U in Rel-18.
Agreement
The container for carrying the COT sharing information from a
COT initiator UE includes at least the SCI.
Agreement
At least the following information should be used as part of
COT sharing information from the COT initiator UE.
CAPC used for initiating the COT
Existing/legacy R16/17 L1 source and destination IDs
Time domain information of the shared COT
Frequency domain information of the shared COT

PHY structure and procedures

Working assumption
Additional candidate S-SSB occasions are excluded from resource
pool
Agreement
A SL-BWP is (pre-)configured with either contiguous RB-based or
interlace RB-based PSCCH/PSSCH transmission, i.e., not both.
Agreement
Regarding more than 1 PSFCH occasion per PSCCH/PSSCH transmission,
support the followings:
One PSCCH/PSSCH transmission has N associated candidate PSFCH
occasion(s) via (pre-)configuration
Agreement
Regarding frequency domain resource indication for interlace
RB-based PSSCH transmission, support the followings:
Option A: Support that for one PSSCH transmission, the used
interlace index(s) in different used RB sets are always the same
Option 1: Support explicitly indicating the used sub-channel
index(s) and RB set index(s)
Frequency domain resource of PSSCH transmission is determined by
an intersection of the resource blocks of the indicated sub-
channel(s) and the union of the indicated set of RB sets and intra-
cell guard bands between the indicated RB sets, if any
For a TB, the initial transmission and reservation of the resource(s)
for retransmission(s) use the same number of sub-channel(s) and same
number of RB set(s)
Use X bits for indicating sub-channel index(s), and use Y bits
for indicating contiguous RB set index(s)
R16 NR SL FRIV is reused as baseline
Agreement
For contiguous RB-based PSCCH/PSSCH transmission in SL-U, regarding
sub-channel(s) which include intra-cell guardband PRBs, down-
select one or more of the followings in RAN1#113:
Option 2: Such sub-channel(s) can be used for PSCCH/PSSCH
transmission
Note:
PRBs within intra-cell guard band are not used for PSCCH
transmission as per previous agreement
Option 3: Such sub-channel(s) cannot be used for PSCCH transmission,
and can be used for PSSCH transmission
Agreement
If a resource pool includes slots with 2 candidate starting symbols
for a PSCCH/PSSCH transmission:
TBS is determined based on a reference number of symbols (denoted
as L_ref)
Support the followings
Alt 1: Support Option 4 only
Note:
the options are as below
Option 4: The reference number of symbols is determined by
(pre-)configuration
Agreement
For interlace RB-based PSCCH/PSSCH transmission in SL-U,
regarding details of mapping between sub-channel and interlace:
In a resource pool with multiple RB sets, sub-channel with the
same index is mapped to K interlace(s) with the same index(s)
in different RB sets.
In a resource pool, support the following
At least for the agreed case where one SL resource pool can be
(pre-)configured to include integer number of RB sets
Option 2: sub-channel#0 is mapped to K interlace(s) starting from
interlace#0
sub-channel#1 is mapped to K interlace(s) starting from
interlace#K, and so on
At least support that the above K interlace(s) are contiguous
FFS: whether/how to support the above K interlace(s) are non-
contiguous
Interlace is indexed as per NR-U
Agreement
When the SL-BWP contains multiple RB sets, study the followings:
When UE attempts to transmit S-SSB in a S-SSB occasion (e.g.,
R16/17 S-SSB occasion, R18 additional candidate S-SSB occasion)
Alt 1: UE may transmit S-SSB repetition in more than one RB set
Agreement
For S-SSB transmission within 1 RB set, for 15 kHz and 30 kHz SCS,
Alt6 is supported:
Alt 6: Support both Option 3-1(revised) and Option B, and enable
one of them by (pre-)configuration
Note:
the Options are as below
Option 1-1: Using interlaced RB transmission for all of S-
PSS/S-SSS/PSBCH
FFS: whether/how to handle the case when each interlace has only
10 PRBs in a RB set, e.g. whether 1 or 2 interlaces will be used
for S-SSB
Option 3-1(revised): Transmit legacy S-PSS/S-SSS/PSBCH N times by
repetition in frequency domain, and there is a gap between the
repetition(s) to meet OCB requirement
FFS the length of gap between repetitions is (pre-)configured or
pre-defined, value of N (e.g., N = 2), whether/how to reduce PAPR.
FFS gap of 0
Option A: Legacy S-SSB
Continue studying how to meet the minimum 2 MHz requirements under
15 kHz SCS for OCB exemption.
Option B: Legacy S-SSB
RAN1 does not pursue further study on how to meet the minimum 2
MHz requirements under 15 kHz SCS for OCB exemption.
Note:
Option A and B are applicable in region with no OCB requirement,
or with OCB exemption.
Agreement
For interlace RB-based PSCCH/PSSCH transmission in SL-U, support
the following:
Option 1: lowest sub-channel is the sub-channel with smallest
sub-channel index 1.7 RAN1 #113 (22-26 May. 2023)
Channel access and resource allocation Agreement
For the time-domain information to be included as part of COT sharing information, at least the following is included:
Remaining COT duration
FFS it is an absolute time length in ms or in number of slots, and payload size
Agreement
A sidelink transmission burst is defined as a set of SL transmissions from a UE without any gaps greater than 16 μs.
Transmissions from a UE separated by a gap of more than 16 μs are considered as separate sidelink transmission bursts.
A UE can transmit SL transmission(s) after a gap of up to 16 μs within a sidelink transmission burst without sensing the corresponding channel(s) for availability.
Working assumption
For UE-to-UE COT sharing in SL-U, a parameter "ue-toUE-COT-SharingED-Threshold" is configured to be used in the energy detection threshold adaptation procedure (similar to ul-toDL-COT-SharingED-Threshold-r16 used for UL-to-DL COT sharing in NR-U)
Working assumption
The required UE processing time for decoding COT-SI is the same as SCI decoding, which is $T_{proc,\,0}^{SL}$ as defined by Table 8.1.4-1 in TS38.214.
The UE processing time starts from the end of slot of the SCI that carries the COT sharing information in a slot
Working assumption
For the case where a COT initiating UE uses Type 1 channel access procedure to initiate a SL transmission, it is supported that the COT initiating UE can transmit transmission(s) within the same channel occupancy that follows a COT responding UE's SL transmission(s) according to the channel access procedures.
Agreement
If a responding UE shares a channel occupancy initiated by a COT initiating UE using Type 1 SL channel access procedure on a channel, the responding UE may transmit a SL transmission that follows a SL transmission by the COT initiating UE after a gap as follows:
If the gap is at least 25 μs, the responding UE can transmit the SL transmission on the shared channel after performing Type 2A SL channel access procedures.
If the gap is equal to 16 μs, the responding UE can transmit the SL transmission on the shared channel after performing Type 2B SL channel access procedures.
If the gap is up to 16 μs and the transmission is limited to 584 μs, the responding UE can transmit the SL transmission on the channel after performing Type 2C SL channel access.

PHY structure and procedures

Agreement
Regarding "Option 3-1 (revised): Transmit legacy S-PSS/S-SSS/PSBCH N times by repetition in frequency domain, and there is a gap between the repetition(s) to meet OCB requirement":
- Support:
  - Alt 3: the value of gap is (pre-)configured, and the value of N is (pre-)configured Agreement
Regarding the number and location(s) of additional candidate S-SSB occasions, support:
- Option 2 (12): Each R16/R17 NR SL S-SSB slot has K corresponding additional candidate S-SSB occasion(s) in different time slot(s), and the gap between them is (pre-)configured Agreement
For interlace RB-based PSCCH/PSSCH transmission in SL-U, support the followings:
- Option A3: N_ref is (pre-)configured
  - The value range for N_ref at least includes {10, 11}

Agreement
If a resource pool includes slots with 2 candidate starting symbols for a PSCCH/PSSCH transmission, for TBS determination and 2$^{nd}$ SCI overhead, in TS 38.214 Clause 8.1.3.2:
- L_ref replaces sl-LengthSymbols
  - Value range of L_ref is {7, 8, 9, 10, 11, 12, 13, 14} symbols
- $N_{symb}^{PSFCH}$ is determined in the same way as in legacy NR SL Working assumption
Regarding frequency domain resource indication for interlace RB-based PSSCH transmission, support the followings:
- Use $FRIV_{subCH}$ to indicate used sub-channel index(es)
- $FRIV_{subCH}$ is conveyed in 1$^{st}$ stage SCI
- $FRIV_{subCH}$ is calculated as below
  - If sl-MaxNumPerReserve is 2 then $$FRIV_{subCH} = n_{subCH,1}^{start} + \sum_{i=1}^{L_{subCH}^{RBset}-1} \left(N_{subchannel}^{RBset} + 1 - i\right)$$

- If sl-MaxNumPerReserve is 3 then $$FRIV_{subCH} = n_{subCH,1}^{start} + n_{subCH,2}^{start} \cdot \left(N_{subchannel}^{RBset} + 1 - L_{subCH}^{RBset}\right) + \sum_{i=1}^{L_{subCH}^{RBset}-1} \left(N_{subchannel}^{RBset} + 1 - i\right)^2$$

- where
    - $n_{subCH,1}^{start}$ denotes the starting sub-channel index for the second resource
    - $n_{subCH,2}^{start}$ denotes the starting sub-channel index for the third resource
    - $N_{subchannel}^{RBset}$ is the number of sub-channels for each RB set
    - $L_{subCH}^{RBset}$ is the number of used sub-channels for each RB set for each of the indicated resources Working assumption
Regarding frequency domain resource indication for interlace RB-based PSSCH transmission, support the followings:
- Use $FRIV_{RBset}$ to indicate used RB set index(es)
- $FRIV_{RBset}$ is conveyed in 1$^{st}$ SCI
- $FRIV_{RBset}$ is calculated as below
  - If sl-MaxNumPerReserve is 2 then $$FRIV_{RBset} = n_{RBset,1}^{start} + \sum_{i=1}^{L_{RBset}-1} (N_{RBset} + 1 - i)$$

○ If sl-MaxNumPerReserve is 3 then

■ $FRIV_{RBset} = n_{RBset,1}^{start} + n_{RBset,2}^{start} \cdot (N_{RBset} + 1 - L_{RBset}) + \sum_{i=1}^{L_{RBset}-1} (N_{RBset} + 1 - i)^2$ ○ where
- ■ $n_{RBset,1}^{start}$ denotes the starting RB set index for the second resource
- ■ $n_{RBset,2}^{start}$ denotes the starting RB set index for the third resource
- ■ $N_{RBset}$ is the number of RB sets in a resource pool
- ■ $L_{RBset}$ is the number of used RB sets for each of the indicated resources Agreement
For contiguous RB-based PSCCH/PSSCH transmission in SL-U, regarding sub-channel(s) which include intra-cell guardband PRBs, support only option 3.
- FFS other details, e.g., impacts on resource selection, PSCCH mapping, etc.
- Note:
  ○ Option 2: Such sub-channel(s) can be used for PSCCH/PSSCH transmission
    ■ Note: PRBs within intra-cell guard band are not used for PSCCH transmission as per previous agreement
  ○ Option 3: Such sub-channel(s) cannot be used for PSCCH transmission, and can be used for PSSCH transmission
  ○ $N_{left}$ : the number of remaining PRBs of a sub-channel belonging to a RB set after excluding the PRBs belonging to intra-cell guardband
  ○ $N_{PSCCH}$ : the number of PRBs for PSCCH transmission 1.8 RAN1 #114 (21-25 Aug. 2023)

Agreement

"CAPC level of the initiated channel occupancy", the payload size is 2 bits and it is carried in the $2^{nd}$ stage SCI.

Agreement

The applicable RB set(s) for COT sharing is derived based on the "Frequency resource assignment" field in the 1V stage SCI corresponding to PSSCH with COT sharing.

. . .

Agreement

For the case where a COT initiating UE uses Type 1 channel access procedure to initiate a SL transmission, in order to support the COT initiating UE to resume its transmission(s) within the same channel occupancy after a COT responding UE's transmission,
  If the COT initiator UE determines the TX gap between responding UE's SL transmission and the initiator UE's resumed transmission,
    The COT initiating UE performs Type 2A, or Type 2B, or Type 2C SL channel access procedures if the gap is at least 25 s, or equal to 16ρs, or up to 16ρs, respectively.
  Otherwise, the COT initiating UE performs Type 2A SL channel access procedures to resume its SL transmission.

Agreement

A UE using a Type 1 channel access procedure to initiate a channel occupancy for SL transmission can resume its transmission(s) within the same channel occupancy, after the COT initiating UE has stopped transmitting, by performing a Type 2A SL channel access procedures, if the channel sensed by the UE is continuously idle.

Agreement

"Remaining COT duration" is expressed in physical slots and it is carried in the $2^{nd}$ stage SCI. The payload size is 4 bits in 15 kHz, 5 bits in 30 kHz and 6 bits in 60 kHz
  If the indicated remaining COT duration is 0 slot, then the COT is not shared by the initiator UE.
  The starting slot for the remaining COT duration is the slot in which the COT-SI is transmitted.
    Note, when the COT-SI is transmitted in slot n, and if the remaining COT duration is set to K, then the end of the COT duration to share is slot n+K.
    Note: "Remaining COT duration" cannot be such that the COT exceeds the maximum COT duration.

Working Assumption

When UE performs Type 1 channel access for a MCSt carrying multiple TBs, the CAPC value to be used in Type 1 channel access is the highest CAPC value (lowest CAPC level) associated with the multiple TBs.

. . .

Working Assumption

In Mode 2 resource allocation:
  Alt. 1: (rectangular shaped)
    For contiguous RB based
      A candidate multi-slots resource $R_{x,y}$ is defined as a set of $L_{subCH}$ contiguous sub-channels starting from sub-channel x in $N_{slot,MCSt}$ consecutive slots starting from slot $t'_y{}^{SL}$.
    For interlaced RB based
      A candidate multi-slots resource $R_{x,y,z}$ is defined as a set of $L_{subCH}$ contiguous sub-channels starting from sub-channel x in $N_{slot,MCSt}$ consecutive slots starting from slot $t'_y{}^{SL}$ in $L_{RBset}$ contiguous RB sets starting from RB set z.
      A candidate single-slot resource $R_{x,y,z}$ is defined as a set of $L_{subCH}$ contiguous sub-channels starting from sub-channel x in slot $t'_y{}^{SL}$ in $L_{RBset}$ contiguous RB sets starting from RB set z.
  Note, different candidate multi-slot resources can overlap in time.

. . .

Agreement

In Mode 2 resource allocation,
  The higher layer can indicate a "number of consecutive slots for MCSt" ($N_{slot,MCSt}$) larger than 1 for L1 reporting multi-slots candidates to the higher layer. The candidate multi-slots resource definition is applied.
    Otherwise, the candidate single-slot resource definition is applied (same as R16/17).
  The higher layer selects resources from the reported $S_A$ according to one of the following based on UE implementation:
    Random selection as per R16/17
    Higher layer is not restricted to select resources at random, and can select in consecutive slots It is up to RAN2 to define detailed behaviour as needed It is RAN1 intention that, once the higher layer selects a multi-slots candidate from the set $S_A$, it will use all the single-slot resources of the selected multi-slots candidate for transmission. This RAN1 agreement has no intention on potential RAN2 discussion about how SL resource selection processes are defined in MCSt.

Note, the above is intended to support Approach 1 and 2 only.

Send an LS to RAN2 informing that it is up to RAN2 to decide in regards to the HARQ RTT timing (minimum time gap)

whether a single TB transmitted over consecutive slots is supported in a resource pool configured with PSFCH resource Working Assumption For interlace RB-based PSCCH/PSSCH transmission in SL-U:

The PSCCH modulation symbols are mapped sequentially over the PRBs of a sub-channel, regardless the number of interlace within one sub-channel The PSSCH modulation symbols are mapped sequentially over the PRBs among all the allocated PRBs for PSSCH transmission, regardless the number of interlace within one sub-channel and number of allocated sub-channels Note: this working assumption will be automatically confirmed if no concern is raised before the end of RAN1 #114.

Agreement

Regarding frequency domain resource indication for interlace RB-based PSSCH transmission:

Alt A: MAC layer indicates both $L_{subCH}$ and $L_{RBset}$ to PHY layer, where $L_{RBset}$ is the number of used RB sets for one PSCCH/PSSCH transmission Regarding $L_{subCH}$ in TS 38.214 Clause 8.1.4, down-select one of the followings in RAN1 #114:

Sub-Alt 1: $L_{subCH}$ is "the number of sub-channels within each RB set to be used for the PSSCH/PSCCH transmission in a slot"

Note: $L_{subCH}^{RBset} = L_{subCH}$

Note: LRCe is the number of used sub-channels within each RB set for one PSCCH/PSSCH transmission Resources from the RB set where C-LBT failure was detected are not reported to MAC layer.

Note: RAN1 assumes "MAC informs PHY of the RB set information where SL C-LBT failure was detected" as per RAN2's LS in R1-2306174

Agreement

Regarding "For contiguous RB-based PSCCH/PSSCH transmission in SL-U, regarding sub-channel(s) which include intra-cell guardband PRBs, support only option 3" and "Option 3: Such sub-channel(s) cannot be used for PSCCH transmission, and can be used for PSSCH transmission":

Candidate resource, whose lowest sub-channel includes intra-cell guardband PRBs, is excluded Such exclusion is performed in PHY layer, and such candidate resource is excluded in Step 1

Agreement

For contiguous RB-based PSSCH transmission:

MAC layer indicates only $L_{subCH}$ to PHY layer as in legacy NR SL $L_{subCH}$ is "the number of sub-channels within all used RB sets to be used for the PSSCH/PSCCH transmission in a slot"

In [1]3GPP specification 38.321 v16.7.0, LBT related operation and SL operation is quoted below:

5.21 LBT Operation 5.21.1 General

The lower layer may perform an LBT procedure, see TS 37.213 [18], according to which a transmission is not performed by lower layers if the channel is identified as being occupied. When lower layer performs an LBT procedure before a transmission and the transmission is not performed, an LBT failure indication is sent to the MAC entity from lower layers. Unless otherwise specified, when LBT procedure is performed for a transmission, actions as specified in this specification are performed regardless of if an LBT failure indication is received from lower layers. When LBT is not performed by the lower layers, LBT failure indication is not received from lower layers.

5.22 SL-SCH Data Transfer 5.22.1 SL-SCH Data Transmission 5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1 as indicated in TS 38.331 [5], the MAC entity shall for each PDCCH occasion and for each grant received for this PDCCH occasion:

1> if a sidelink grant has been received on the PDCCH for the MAC entity's SL-RNTI:

2> if the NDI received on the PDCCH has not been toggled compared to the value in the previously received HARQ information for the HARQ Process ID:

3> use the received sidelink grant to determine PSCCH duration(s) and PSSCH duration(s) for one or more retransmissions of a single MAC PDU for the corresponding Sidelink process according to clause 8.1.2 of TS 38.214 [7].

2> else:

3> use the received sidelink grant to determine PSCCH duration(s) and PSSCH duration(s) for initial transmission and, if available, retransmission(s) of a single MAC PDU according to clause 8.1.2 of TS 38.214 [7].

2> if a sidelink grant is available for retransmission(s) of a MAC PDU which has been positively acknowledged as specified in clause 5.22.1.3.1a:

3> clear the PSCCH duration(s) and PSSCH duration(s) corresponding to retransmission(s) of the MAC PDU from the sidelink grant.

1> else if a sidelink grant has been received on the PDCCH for the MAC entity's SLCS-RNTI:

2> if PDCCH contents indicate retransmission(s) for the identified HARQ process ID that has been set for an activated configured sidelink grant identified by sl-ConfigIndexCG:

3> use the received sidelink grant to determine PSCCH duration(s) and PSSCH duration(s) for one or more retransmissions of a single MAC PDU according to clause 8.1.2 of TS 38.214 [7].
2> else if PDCCH contents indicate configured grant Type 2 deactivation for a configured sidelink grant:
  3> trigger configured sidelink grant confirmation for the configured sidelink grant.
2> else if PDCCH contents indicate configured grant Type 2 activation for a configured sidelink grant:
  3> trigger configured sidelink grant confirmation for the configured sidelink grant;
  3> store the configured sidelink grant;
  3> initialise or re-initialise the configured sidelink grant to determine the set of PSCCH durations and the set of PSSCH durations for transmissions of multiple MAC PDUs according to clause 8.1.2 of TS 38.214 [7].

If the MAC entity has been configured with Sidelink resource allocation mode 2 to transmit using pool(s) of resources in a carrier as indicated in TS 38.331 [5] or TS 36.331 [21] based on full sensing, or partial sensing, or random selection or any combination(s), the MAC entity shall for each Sidelink process:
. . .
1> if the MAC entity has selected to create a selected sidelink grant corresponding to transmissions of multiple MAC PDUs, and SL data is available in a logical channel:
  2> if the MAC entity has not selected a pool of resources allowed for the logical channel:
    3> if sl-HARQ-FeedbackEnabled is set to enabled for the logical channel:
      4> select any pool of resources configured with PSFCH resources among the pools of resources.
    3> else:
      4> select any pool of resources among the pools of resources.
  2> perform the TX resource (re-)selection check on the selected pool of resources as specified in clause 5.22.1.2;
. . .
  2> if the TX resource (re-)selection is triggered as the result of the TX resource (re-)selection check:
    3> if one or multiple SL DRX is configured in the destination UE(s) receiving SL-SCH data:
      4> indicate to the physical layer SL DRX active time in the destination UE(s) receiving SL-SCH data, as specified in clause 5.28.2.
    3> select one of the allowed values configured by RRC in sl-ResourceReservePeriodList and set the resource reservation interval, $P_{rsvp\_TX}$, with the selected value;
    3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;
    3> select the number of HARQ retransmissions from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
    3> select an amount of frequency resources within the range, if configured by RRC, between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
    3> if not configured by RRC, interUECoordinationSchemel Explicit or interUECoordinationSchemel Condition enabling reception of preferred resource set and non-preferred resource set:
      4> if transmission based on random selection is configured by upper layers:
        5> randomly select the time and frequency resources for one transmission opportunity from the resource pool which occur within the SL DRX active time as specified in clause 5.28.2 of the destination UE selected for indicating to the physical layer the SL DRX active time above, according to the amount of selected frequency resources and the remaining PDB of SL data available in the logical channel(s) allowed on the carrier.
        5> if selected resource for initial transmission occasion is not in the SL DRX Active time as specified in clause 5.28.1 of any destination that has data to be sent:
          6> use retransmission occasion(s) for initial transmission of PSCCH and PSSCH.
      4> else:
        5> randomly select the time and frequency resources for one transmission opportunity from the resources indicated by the physical layer as specified in clause 8.1.4 of TS 38.214 [7] which occur within the SL DRX active time as specified in clause 5.28.2 of the destination UE selected for indicating to the physical layer the SL DRX active time above, according to the amount of selected frequency resources and the remaining PDB of SL data available in the logical channel(s) allowed on the carrier.
. . .
    3> if one or more HARQ retransmissions are selected:
      4> if not configured by RRC, interUECoordinationSchemel Explicit or interUECoordinationSchemelCondition enabling reception of preferred resource set and non-preferred resource set:

5> if transmission based on full sensing or partial sensing is configured by upper layers and there are available resources left in the resources indicated by the physical layer according to clause 8.1.4 of TS 38.214 [7] for more transmission opportunities; or 5> if transmission based on random selection is configured by upper layers and there are available resources left in the resource pool for more transmission opportunities:

6> randomly select the time and frequency resources for one or more transmission opportunities from the available resources which occur within the SL DRX active time as specified in clause 5.28.2 of the destination UE selected for indicating to the physical layer the SL DRX active time above, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].

. . .

4> use the randomly selected resource to select a set of periodic resources spaced by the resource reservation interval for transmissions of PSCCH and PSSCH corresponding to the number of retransmission opportunities of the MAC PDUs determined in TS 38.214 [7];

4> consider the first set of transmission opportunities as the initial transmission opportunities and the other set(s) of transmission opportunities as the retransmission opportunities;

4> consider the sets of initial transmission opportunities and retransmission opportunities as the selected sidelink grant.

3> else:

4> consider the set as the selected sidelink grant.

3> use the selected sidelink grant to determine the set of PSCCH durations and the set of PSSCH durations according to TS 38.214 [7].

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by RRC in sl-ProbResourceKeep:

3> clear the selected sidelink grant, if available;

3> randomly select, with equal probability, an integer value in the interval [5, 15] for the resource reservation interval higher than or equal to 100 ms or in the interval $$\left[5\times\left\lceil\frac{100}{\max(20, P_{rsvp\_TX})}\right\rceil, 15\times\left\lceil\frac{100}{\max(20, P_{rsvp\_TX})}\right\rceil\right]$$

for the resource reservation interval lower than 100 ms and set SL_RESOURCE_RESELECTION_COUNTER to the selected value;

3> reuse the previously selected sidelink grant for the number of transmissions of the MAC PDUs determined in TS 38.214 [7] with the resource reservation interval to determine the set of PSCCH durations and the set of PSSCH durations according to TS 38.214 [7].

1> if the MAC entity has selected to create a selected sidelink grant corresponding to transmission(s) of a single MAC PDU, and if SL data is available in a logical channel, or an SL-CSI reporting is triggered:

2> if SL data is available in the logical channel for sidelink discovery:

3> if sl-BWP-DiscPoolConfig or sl-BWP-DiscPoolConfigCommon is configured according to TS 38.331 [5]:

4> select the sl-DiscTxPoolSelected configured in sl-BWP-DiscPoolConfig or sl-BWP-DiscPoolConfigCommon for the transmission of sidelink discovery message.

3> else:

4> select any pool of resources among the configured pools of resources.

2> else if SL data is available in the logical channel:

3> if sl-HARQ-FeedbackEnabled is set to enabled for the logical channel:

4> select any pool of resources configured with PSFCH resources among the pools of resources except the pool(s) in sl-BWP-DiscPoolConfig or sl-BWP-DiscPoolConfigCommon, if configured.

3> else:

4> select any pool of resources among the pools of resources except the pool(s) in sl-BWP-DiscPoolConfig or sl-BWP-DiscPoolConfigCommon, if configured.

2> else if an SL-CSI reporting is triggered:

3> select any pool of resources among the pools of resources except the pool(s) in sl-BWP-DiscPoolConfig or sl-BWP-DiscPoolConfigCommon, if configured.

2> perform the TX resource (re-)selection check on the selected pool of resources as specified in clause 5.22.1.2;

2> if the TX resource (re-)selection is triggered as the result of the TX resource (re-)selection check:

3> if one or multiple SL DRX is configured in the destination UE(s) receiving SL-SCH data:

4> indicate to the physical layer SL DRX active time in the destination UE(s) receiving SL-SCH data, as specified in clause 5.28.2.

3> select the number of HARQ retransmissions from the allowed numbers, if configured by RRC, in sl-MaxTxTransNwnPSSCH included in sl-PSSCH-TxConfigList and, if configured by RRC, overlapped in sl-MaxTxTransNunPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;

3> select an amount of frequency resources within the range, if configured by RRC, between sl-MinSubChannelNumPSSCH and sl-MaxSubChannelNumPSSCH included in sl-PSSCH- TxConfigList and, if configured by RRC, overlapped between sl-MinSubChannelNumPSSCH and sl-MaxSubChannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;

3> if not configured by RRC, interUECoordinationSchemeI Explicit or interUECoordinationSchemeI Condition enabling reception of preferred resource set and non-preferred resource set:
   4> if transmission based on random selection is configured by upper layers:
      5> randomly select the time and frequency resources for one transmission opportunity from the resources pool which occur within the SL DRX active time as specified in clause 5.28.2 of the destination UE selected for indicating to the physical layer the SL DRX active time above, according to the amount of selected frequency resources and the remaining PDB of SL data available in the logical channel(s) allowed on the carrier, and the latency requirement of the triggered SL CSI reporting.
   4> else:
      5> randomly select the time and frequency resources for one transmission opportunity from the resources indicated by the physical layer as specified in clause 8.1.4 of TS 38.214 [7] which occur within the SL DRX active time as specified in clause 5.28.2 of the destination UE selected for indicating to the physical layer the SL DRX active time above, according to the amount of selected frequency resources and the remaining PDB of SL data available in the logical channel(s) allowed on the carrier, and/or the latency requirement of the triggered SL-CSI reporting.
. . .
3> if one or more HARQ retransmissions are selected:
   4> if not configured by RRC, interUECoordinationSchemeIExplicit or interUECoordinationSchemeICondition enabling reception of preferred resource set and non-preferred resource set:
      5> if transmission based on sensing or partial sensing is configured by upper layers and there are available resources left in the resources indicated by the physical layer according to clause 8.1.4 of TS 38.214 [7] for more transmission opportunities; or
      5> if transmission based on random selection is configured by upper layers and there are available resources left in the resources pool for more transmission opportunities:
         6> randomly select the time and frequency resources for one or more transmission opportunities from the available resources which occur within the SL DRX active time as specified in clause 5.28.2 of the destination UE selected for indicating to the physical layer the SL DRX active time above, according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources, and that a retransmission resource can be indicated by the time resource assignment of a prior SCI according to clause 8.3.1.1 of TS 38.212 [9];
      6> consider a transmission opportunity which comes first in time as the initial transmission opportunity and other transmission opportunities as the retransmission opportunities;
      6> consider all the transmission opportunities as the selected sidelink grant.
. . .
   4> use the randomly selected resource to select a set of periodic resources spaced by the resource reservation interval for transmissions of PSCCH and PSSCH corresponding to the number of retransmission opportunities of the MAC PDUs determined in TS 38.214 [7];
   4> consider the first set of transmission opportunities as the initial transmission opportunities and the other set(s) of transmission opportunities as the retransmission opportunities;
   4> consider the sets of initial transmission opportunities and retransmission opportunities as the selected sidelink grant.
   3> else:
      4> consider the set as the selected sidelink grant.
   3> use the selected sidelink grant to determine PSCCH duration(s) and PSSCH duration(s) according to TS 38.214 [7].
1> if a selected sidelink grant is available for retransmission(s) of a MAC PDU which has been positively acknowledged as specified in clause 5.22.1.3.3:
   2> clear the PSCCH duration(s) and PSSCH duration(s) corresponding to retransmission(s) of the MAC PDU from the selected sidelink grant.
The MAC entity shall for each PSSCH duration:
1> for each sidelink grant occurring in this PSSCH duration:
   2> select a MCS table allowed in the pool of resource which is associated with the sidelink grant; NOTE 4a: MCS table selection is up to UE implementation if more than one MCS table is configured.
   2> if the MAC entity has been configured with Sidelink resource allocation mode 1:
      3> select a MCS which is, if configured, within the range that is configured by RRC between sl-MinMCS-PSSCH and sl-MaxMCS-PSSCH associated with the selected MCS table included in sl-ConfigDedicatedNR;
      3> set the resource reservation interval to 0 ms.
   2> else:
. . .
      3> if the MAC entity decides not to use the selected sidelink grant for the next PSSCH duration corresponding to an initial transmission opportunity:
         4> set the resource reservation interval to 0 ms.
      3> else:
         4> set the resource reservation interval to the selected value.

2> if the configured sidelink grant has been activated and this PSSCH duration corresponds to the first PSSCH transmission opportunity within this sl-PeriodCG of the configured sidelink grant:
:   3> set the HARQ Process ID to the HARQ Process ID associated with this PSSCH duration and, if available, all subsequent PSSCH duration(s) occurring in this sl-PeriodCG for the configured sidelink grant;
    3> determine that this PSSCH duration is used for initial transmission;
    3> flush the HARQ buffer of Sidelink process associated with the HARQ Process ID.
2> deliver the sidelink grant, the selected MCS, and the associated HARQ information to the Sidelink HARQ Entity for this PSSCH duration.

For configured sidelink grants, the HARQ Process ID associated with the first slot of an SL transmission is derived from the following equation:

$$HARQ\ Process\ ID = [Floor(CURRENT\_slot/PeriodicitySL)]$$
$$modulo\ sl-NrOfHARQ-Processes + sl-HARQ-ProcID-offset$$

where CURRENT_slot refers to current logical slot in the associated resource pool, and PeriodicitySL is defined in clause 5.8.3.

5.22.1.3 Sidelink HARQ Operation
5.22.1.3.1 Sidelink HARQ Entity

The MAC entity includes at most one Sidelink HARQ entity for transmission on SL-SCH, which maintains a number of parallel Sidelink processes.

The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.

A delivered sidelink grant and its associated Sidelink transmission information are associated with a Sidelink process. Each Sidelink process supports one TB.

For each sidelink grant, the Sidelink HARQ Entity shall:
1> if the MAC entity determines that the sidelink grant is used for initial transmission as specified in clause 5.22.1.1; or
1> if the sidelink grant is a configured sidelink grant and no MAC PDU has been obtained in an sl-PeriodCG of the configured sidelink grant; or
1> if the sidelink grant is a dynamic sidelink grant or selected sidelink grant and no MAC PDU has been obtained in the previous sidelink grant when PSCCH duration(s) and $2^{nd}$ stage SCI on PSSCH of the previous sidelink grant is not in SL DRX Active time as specified in clause 5.28.1 of the destination that has data to be sent:

Note 1: Void.
:   2> (re-)associate a Sidelink process to this grant, and for the associated Sidelink process:
    2> if all PSCCH duration(s) and PSSCH duration(s) for initial transmission of a MAC PDU of the dynamic sidelink grant or the configured sidelink grant is not in SL DRX Active time as specified in clause 5.28.1 of the destination that has data to be sent:
    :   3> ignore the sidelink grant.
    3> obtain the MAC PDU to transmit from the Multiplexing and assembly entity, if any;
    3> if a MAC PDU to transmit has been obtained:
    :   4> if a HARQ Process ID has been set for the sidelink grant:
        :   5> (re-)associate the HARQ Process ID corresponding to the sidelink grant to the Sidelink process.
        4> determines Sidelink transmission information of the TB for the source and destination pair of the MAC PDU as follows:
        :   5> set the Source Layer-1 ID to the 8 LSB of the Source Layer-2 ID of the MAC PDU;
            5> set the Destination Layer-1 ID to the 16 LSB of the Destination Layer-2 ID of the MAC PDU;
            5> (re-)associate the Sidelink process to a Sidelink process ID;
            5> consider the NDI to have been toggled compared to the value of the previous transmission corresponding to the Sidelink identification information and the Sidelink process ID of the MAC PDU and set the NDI to the toggled value;
            5> set the cast type indicator to one of broadcast, groupcast and unicast as indicated by upper layers:
            5> if HARQ feedback has been enabled for the MAC PDU according to clause 5.22.1.4.2;
            :   6> set the HARQ feedback enabled/disabled indicator to enabled.
            5> else:
            :   6> set the HARQ feedback enabled/disabled indicator to disabled.
            5> set the priority to the value of the highest priority of the logical channel(s), if any, and a MAC CE, if included, in the MAC PDU;
            . . . 5> set the Redundancy version to the selected value.
        4> deliver the MAC PDU, the sidelink grant and the Sidelink transmission information of the TB to the associated Sidelink process;
        4> instruct the associated Sidelink process to trigger a new transmission.
    3> else:
    :   4> flush the HARQ buffer of the associated Sidelink process.
1> else (i.e. retransmission):
:   2> if the HARQ Process ID corresponding to the sidelink grant received on PDCCH, the configured sidelink grant or the selected sidelink grant is associated to a Sidelink process of which HARQ buffer is empty; or
    2> if the HARQ Process ID corresponding to the sidelink grant received on PDCCH is not associated to any Sidelink process; or
    2> if PSCCH duration(s) and PSSCH duration(s) for one or more retransmissions of a MAC PDU of the dynamic sidelink grant or the configured sidelink grant is not in SL DRX Active time as specified in clause 5.28.1 of the destination that has data to be sent:
    :   3> ignore the sidelink grant.
    2> else:
    :   3> identify the Sidelink process associated with this grant, and for the associated Sidelink process:

4> deliver the sidelink grant of the MAC PDU to the associated Sidelink process;

4> instruct the associated Sidelink process to trigger a retransmission.

5.22.1.3.1a Sidelink Process

The Sidelink process is associated with a HARQ buffer.

New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.

If the Sidelink process is configured to perform transmissions of multiple MAC PDUs with Sidelink resource allocation mode 2, the process maintains a counter SL_RESOURCE_RESELECTION_COUNTER. For other configurations of the Sidelink process, this counter is not available.

Priority of a MAC PDU is determined by the highest priority of the logical channel(s) or a MAC CE in the MAC PDU.

If the Sidelink HARQ Entity requests a new transmission, the Sidelink process shall:

1> store the MAC PDU in the associated HARQ buffer;

1> store the sidelink grant received from the Sidelink HARQ Entity;

1> generate a transmission as described below.

If the Sidelink HARQ Entity requests a retransmission, the Sidelink process shall:

1> store the sidelink grant received from the Sidelink HARQ Entity;

1> generate a transmission as described below.

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:

2> instruct the physical layer to transmit SCI according to the stored sidelink grant with the associated Sidelink transmission information;

2> instruct the physical layer to generate a transmission according to the stored sidelink grant;

2> if HARQ feedback has been enabled for the MAC PDU according to clause 5.22.1.4.2:

3> instruct the physical layer to monitor PSFCH for the transmission and perform PSFCH reception as specified in clause 5.22.1.3.2.

2> if sl-PUCCH-Config is configured by RRC for the stored sidelink grant:

3> determine transmission of an acknowledgement on the PUCCH as specified in clause 5.22.1.3.2.

1> if this transmission corresponds to the last transmission of the MAC PDU:

2> decrement SL_RESOURCE_RESELECTION_COUNTER by 1, if available.

5.22.1.4 Multiplexing and Assembly

For PDU(s) associated with one SCI, MAC shall consider only logical channels with the same Source Layer-2 ID-Destination Layer-2 ID pair for one of unicast, groupcast and broadcast which is associated with the pair. Multiple transmissions for different Sidelink processes are allowed to be independently performed in different PSSCH durations.

NOTE: Sidelink discovery and sidelink data transmitted by a UE cannot be multiplexed into the same TB because they are always associated with different destination L2 IDs.

5.22.1.4.1 Logical Channel Prioritization 5.22.1.4.1.1 General

The sidelink Logical Channel Prioritization procedure is applied whenever a new transmission is performed.

RRC controls the scheduling of sidelink data by signalling for each logical channel:

sl-Priority where an increasing priority value indicates a lower priority level;

sl-PrioritisedBitRate which sets the sidelink Prioritized Bit Rate (sPBR);

sl-BucketSizeDuration which sets the sidelink Bucket Size Duration (sBSD).

RRC additionally controls the LCP procedure by configuring mapping restrictions for each logical channel:

sl-configuredGrantType1Allowed which sets whether a configured grant Type 1 can be used for sidelink transmission;

sl-AllowedCG-List which sets the allowed configured grant(s) for sidelink transmission;

sl-HARQ-FeedbackEnabled which sets whether the logical channel is allowed to be multiplexed with logical channel(s) with sl-HARQ-FeedbackEnabled set to enabled or disabled.

5.22.1.4.1.2 Selection of Logical Channels

The MAC entity shall for each SCI corresponding to a new transmission:

1> if sl-BWP-DiscPoolConfig or sl-BWP-DiscPoolConfigCommon is configured according to TS 38.331 [5]:

. . .

1> else:

2> select a Destination associated to one of unicast, groupcast and broadcast, that is in the SL active time for the SL transmission occasion if SL DRX is applied for the destination, and having at least one of the MAC CE and the logical channel with the highest priority, among the logical channels that satisfy all the following conditions and MAC CE(s), if any, for the SL grant associated to the SCI:

3> SL data is available for transmission; and

3> SBj>0, in case there is any logical channel having SBj>0; and

3> sl-configuredGrantTypelAllowed, if configured, is set to true in case the SL grant is a Configured Grant Type 1; and 3> sl-AllowedCG-List, if configured, includes the configured grant index associated to the SL grant; and 3> sl-HARQ-FeedbackEnabled is set to disabled, if PSFCH is not configured for the SL grant associated to the SCI.

1> select the logical channels satisfying all the following conditions among the logical channels belonging to the selected Destination:

2> SL data is available for transmission; and

2> sl-configuredGrantTypelAllowed, if configured, is set to true in case the SL grant is a Configured Grant Type 1; and.

2> sl-AllowedCG-List, if configured, includes the configured grant index associated to the SL grant; and 3> if PSFCH is configured for the sidelink grant associated to the SCI:

4> sl-HARQ-FeedbackEnabled is set to enabled, if sl-HARQ-FeedbackEnabled is set to enabled for the highest priority logical channel satisfying the above conditions; or
4> sl-HARQ-FeedbackEnabled is set to disabled, if sl-HARQ-FeedbackEnabled is set to disabled for the highest priority logical channel satisfying the above conditions.
3> else:
4> sl-HARQ-FeedbackEnabled is set to disabled.

5.22.1.4.1.3 Allocation of Sidelink Resources

The MAC entity shall for each SCI corresponding to a new transmission:
1> allocate resources to the logical channels as follows:
2> logical channels selected in clause 5.22.1.4.1.2 for the SL grant with SBj>0 are allocated resources in a decreasing priority order. If the sPBR of a logical channel is set to infinity, the MAC entity shall allocate resources for all the data that is available for transmission on the logical channel before meeting the sPBR of the lower priority logical channel(s);
2> decrement SBj by the total size of MAC SDUs served to logical channel j above;
2> if any resources remain, all the logical channels selected in clause 5.22.1.4.1.2 are served in a strict decreasing priority order (regardless of the value of SBj) until either the data for that logical channel or the SL grant is exhausted, whichever comes first. Logical channels configured with equal priority should be served equally.
NOTE: The value of SBj can be negative.

The UE shall also follow the rules below during the SL scheduling procedures above:
the UE should not segment an RLC SDU (or partially transmitted SDU or retransmitted RLC PDU) if the whole SDU (or partially transmitted SDU or retransmitted RLC PDU) fits into the remaining resources of the associated MAC entity;
if the UE segments an RLC SDU from the logical channel, it shall maximize the size of the segment to fill the grant of the associated MAC entity as much as possible;
the UE should maximise the transmission of data;
if the MAC entity is given a sidelink grant size that is equal to or larger than 12 bytes while having data available and allowed (according to clause 5.22.1.4.1) for transmission, the MAC entity shall not transmit only padding;
A logical channel configured with sl-HARQ-FeedbackEnabled set to enabled and a logical channel configured with sl-HARQ-FeedbackEnabled set to disabled cannot be multiplexed into the same MAC PDU.

The MAC entity shall not generate a MAC PDU for the HARQ entity if the following conditions are satisfied:
there is no Sidelink CSI Reporting MAC CE generated for this PSSCH transmission as specified in clause 5.22.1.7; and
there is no Sidelink DRX Command MAC CE generated for this PSSCH transmission as specified in clause 5.22.1.8; and
there is no Sidelink Inter-UE Coordination Request MAC CE generated for this PSSCH transmission as specified in clause 5.22.1.9; and
there is no Sidelink Inter-UE Coordination Information MAC CE generated for this PSSCH transmission as specified in clause 5.22.1.10; and
the MAC PDU includes zero MAC SDUs.

Logical channels shall be prioritised in accordance with the following order (highest priority listed first):
data from SCCH;
Sidelink CSI Reporting MAC CE;
Sidelink Inter-UE Coordination Request MAC CE and Sidelink Inter-UE Coordination Reporting MAC CE;
Sidelink DRX Command MAC CE;
data from any STCH.

5.22.1.4.2 Multiplexing of MAC Control Elements and MAC SDUs

The MAC entity shall multiplex a MAC CE and MAC SDUs in a MAC PDU according to clauses 5.22.1.4.1 and 6.1.6.

5.22.2 SL-SCH Data Reception 5.22.2.1 SCI Reception

SCI indicates if there is a transmission on SL-SCH and provide the relevant HARQ information. An SCI consists of two parts: the $1^{st}$ stage SCI on PSCCH and the $2^{nd}$ stage SCI on PSSCH as specified in clause 8.1 of TS 38.214 [7].

The MAC entity shall:
1> for each PSCCH duration during which the MAC entity monitors PSCCH:
2> if a $1^{st}$ stage SCI has been received on the PSCCH:
3> determine the set of PSSCH durations in which reception of a $2^{nd}$ stage SCI and the transport block occur using the received part of the SCI;
3> if the $2^{nd}$ stage SCI for this PSSCH duration has been received on the PSSCH:
4> store the SCI as a valid SCI for the PSSCH durations corresponding to transmission(s) of the transport block and the associated HARQ information and QoS information;
1> for each PSSCH duration for which the MAC entity has a valid SCI:
2> deliver the SCI and the associated Sidelink transmission information to the Sidelink HARQ Entity.

5.22.2.2 Sidelink HARQ Operation 5.22.2.2.1 Sidelink HARQ Entity

There is at most one Sidelink HARQ Entity at the MAC entity for reception of the SL-SCH, which maintains a number of parallel Sidelink processes.

Each Sidelink process is associated with SCI in which the MAC entity is interested. This interest is determined by the Sidelink identification information of the SCI. The Sidelink HARQ Entity directs Sidelink transmission information and associated TBs received on the SL-SCH to the corresponding Sidelink processes.

The number of Receiving Sidelink processes associated with the Sidelink HARQ Entity is defined in TS 38.306 [5].

For each PSSCH duration, the Sidelink IHARQ Entity shall:
1> for each SCI valid for this PSSCH duration:
2> if the NDI has been toggled compared to the value of the previous received transmission corresponding to the Sidelink identification information and the Sidelink process ID of the SCI or this is the very first received transmission for the pair of the Sidelink identification information and the Sidelink process ID of the SCI:
3> if there is a Sidelink process associated with the Sidelink identification information and the Sidelink process ID of the SCI:
4> consider the Sidelink process as unoccupied;
4> flush the soft buffer for the Sidelink process.

3> allocate the TB received from the physical layer and the associated Sidelink identification information and Sidelink process ID to an unoccupied Sidelink process;
3> associate the Sidelink process with the Sidelink identification information and the Sidelink process ID of this SCI and consider this transmission to be a new transmission.
1> for each Sidelink process:
2> if the NDI has not been toggled compared to the value of the previous received transmission corresponding to the Sidelink identification information and the Sidelink process ID of the SCI for the Sidelink process according to its associated SCI:
3> allocate the TB received from the physical layer to the Sidelink process and consider this transmission to be a retransmission.

5.22.2.2.2 Sidelink Process

For each PSSCH duration where a transmission takes place for the Sidelink process, one TB and the associated HARQ information is received from the Sidelink HARQ Entity.

For each received TB and associated Sidelink transmission information, the Sidelink process shall:
1> if this is a new transmission:
2> attempt to decode the received data.
1> else if this is a retransmission:
2> if the data for this TB has not yet been successfully decoded:
3> instruct the physical layer to combine the received data with the data currently in the soft buffer for this TB and attempt to decode the combined data.
1> if the data which the MAC entity attempted to decode was successfully decoded for this TB; or
1> if the data for this TB was successfully decoded before:
2> if this is the first successful decoding of the data for this TB:
3> if this TB is associated to unicast, the DST field of the decoded MAC PDU subheader is equal to the 8 MSB of any of the Source Layer-2 ID(s) of the UE for which the 16 LSB are equal to the Destination ID in the corresponding SCI, and the SRC field of the decoded MAC PDU subheader is equal to the 16 MSB of any of the Destination Layer-2 ID(s) of the UE for which the 8 LSB are equal to the Source ID in the corresponding SCI; or
3> if this TB is associated to groupcast or broadcast and the DST field of the decoded MAC PDU subheader is equal to the 8 MSB of any of the Destination Layer-2 ID(s) of the UE for which the 16 LSB are equal to the Destination ID in the corresponding SCI:
4> deliver the decoded MAC PDU to the disassembly and demultiplexing entity;
2> consider the Sidelink process as unoccupied.
1> else:
2> instruct the physical layer to replace the data in the soft buffer for this TB with the data which the MAC entity attempted to decode.

5.22.2.3 Disassembly and Demultiplexing

The MAC entity shall disassemble and demultiplex a MAC PDU as defined in clause 6.1.6.

In [2]R1-2308756, Editor's summary on draft CR 37.213 for SL-U, channel procedure for unlicensed spectrum are quoted below.

4 Channel Access Procedure 4.0 General

Unless otherwise noted, the definitions below are applicable for the following terminologies used in this specification:

A channel refers to a carrier or a part of a carrier consisting of a contiguous set of resource blocks (RBs) on which a channel access procedure is performed in shared spectrum.

A channel access procedure is a procedure based on sensing that evaluates the availability of a channel for performing transmissions. The basic unit for sensing is a sensing slot with a duration $T_{sl}=9\mu s$. The sensing slot duration $T_{sl}$ is considered to be idle if an eNB/gNB or a UE senses the channel during the sensing slot duration, and determines that the detected power for at least 4ρs within the sensing slot duration is less than energy detection threshold $X_{Thresh}$. Otherwise, the sensing slot duration $T_{sl}$ is considered to be busy.

A channel occupancy refers to transmission(s) on channel(s) by eNB/gNB/UE(s) after performing the corresponding channel access procedures in this clause.

A Channel Occupancy Time refers to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25ρs, the gap duration is counted in the channel occupancy time. A channel occupancy time can be shared for transmission between an eNB/gNB and the corresponding UE(s).

. . .

A SL transmission burst is defined as a set of SL transmissions from a UE without any gaps greater than 16 μs. The SL transmissions from a UE separated by a gap of more than 16 μs, are considered as separate SL transmission bursts. A UE can transmit SL transmission(s) after a gap within a SL transmission burst without sensing the corresponding channel(s) for availability.

4.5 Sidelink Channel Access Procedures

A UE operating in sidelink resource allocation mode 1 or mode 2 and performing SL transmission(s) on channel(s) shall perform the procedures described in this clause for the UE to access the channel(s) on which the transmission(s) are performed.

In this clause, transmissions from a UE are considered as separate SL transmissions, irrespective of having a gap between transmissions or not, and $X_{Thresh}$ for sensing is adjusted as described in clause 4.5.5 when applicable.

A UE can access a channel on which SL transmission(s) are performed according to one of Type 1 or Type 2 SL channel access procedures as described in clauses 4.5.1 and 4.5.2, respectively.

When a UE applies Type 1 channel access procedures to transmit SL transmission(s), the applicable channel access priority class (CAPC) is defined in Table 4.5-1.

When a UE applies Type 1 channel access procedures to transmit SL transmission(s) including PSSCH with user plane data and associated PSCCH, the UE determines the corresponding SL channel access priority class p in Table 4.5-1 following the procedures described in Clause 16.9.x.2 in [9].

When a UE applies Type 1 channel access procedures to transmit SL transmission(s) including PSFCH or S-SSB transmission(s), the UE shall use the channel access priority class p=1 in Table 4.5-1.

A UE shall not transmit on a channel for a Channel Occupancy Time that exceeds $T_{slm\_cot,p}$ where the channel access procedure is performed based on the channel access priority class p associated with the UE transmissions, as given in Table 4.5-1.

When a UE applies Type 1 channel access procedure to transmit multiple transport blocks (TBs) over multiple consecutive slots, the highest CAPC value among the associated CAPC values with the multiple TBs is used performing the Type 1 channel access procedure.

If a UE fails to access the channel(s) prior to an intended SL transmission(s), Layer 1 notifies higher layers about the channel access failure and the channel(s) that the UE fails to access.

TABLE 4.5-1

Channel Access Priority Class (CAPC) for SL

| Channel Access Priority Class (p) | $m_p$ | $CW_{min,p}$ | $CW_{max,p}$ | $T_{slm\_cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{slm\_cot,p}$ = 10 ms if the higher layer parameter sl-absenceOfAnyOtherTechnology-r18 is provided, otherwise, $T_{slm\_cot,p}$ = 6 ms.
NOTE 2:
When $T_{slm\_cot,p}$ = 6 ms it may be increased to 8 ms by inserting one or more gaps. The minimum duration of a gap shall be 100 µs. The maximum duration before including any such gap shall be 6 ms.

4.5.1 Type 1 SL Channel Access Procedure

This clause describes channel access procedures by a UE where the time duration spanned by the sensing slots that are sensed to be idle before a SL transmission(s) is random. The clause is applicable to the SL transmission(s) including at least any of PSSCH/PSCCH or PSFCH or S-SSB.

A UE may transmit the transmission using Type 1 channel access procedure after first sensing the channel to be idle during the sensing slot durations of a defer duration $T_d$, and after the counter N is zero in step 4. The counter N is adjusted by sensing the channel for additional sensing slot duration(s) according to the steps described below.

1) set N=$N_{init}$, where $N_{init}$ is a random number uniformly distributed between 0 and $CW_p$, and go to step 4;
2) if N>0 and the UE chooses to decrement the counter, set N=N−1;
3) sense the channel for an additional sensing slot duration, and if the additional sensing slot duration is idle, go to step 4; else, go to step 5;
4) if N=0, stop; else, go to step 2.
5) sense the channel until either a busy sensing slot is detected within an additional defer duration $T_d$ or all the sensing slots of the additional defer duration $T_d$ are detected to be idle;
6) if the channel is sensed to be idle during all the sensing slot durations of the additional defer duration $T_d$, go to step 4; else, go to step 5;

If a UE has not transmitted a SL transmission on a channel on which SL transmission(s) are performed after step 4 in the procedure above, the UE may transmit a transmission on the channel, if the channel is sensed to be idle at least in a sensing slot duration $T_{sl}$ when the UE is ready to transmit the transmission and if the channel has been sensed to be idle during all the sensing slot durations of a defer duration $T_d$ immediately before the transmission. If the channel has not been sensed to be idle in a sensing slot duration $T_{sl}$ when the UE first senses the channel after it is ready to transmit, or if the channel has not been sensed to be idle during any of the sensing slot durations of a defer duration $T_d$ immediately before the intended transmission, the UE proceeds to step 1 after sensing the channel to be idle during the sensing slot durations of a defer duration $T_d$.

The defer duration $T_d$ consists of duration $T_f$=16 µs immediately followed by $m_p$ consecutive sensing slot durations where each sensing slot duration is $T_{sl}$=9 µs, and $T_f$ includes an idle sensing slot duration $T_{sl}$ at start of $T_f$.

$CW_{min,p} \leq CW_p \leq CW_{max,p}$ is the contention window. $CW_p$ adjustment is described in clause 4.5.4.

$CW_{min,p}$ and $CW_{max,p}$ are chosen before step 1 of the procedure above.

$m_p$, $CW_{min,p}$, and $CW_{max,p}$ are based on a channel access priority class p as shown in Table 4.5-1.

4.5.2 Type 2 SL Channel Access Procedure

This clause describes channel access procedures by UE where the time duration spanned by the sensing slots that are sensed to be idle before a SL transmission(s) is deterministic.

Type 2A SL channel access procedure as described in clause 4.5.2.1 are applicable to the following transmission(s) performed by a UE:

If a UE intends to transmit a SL transmission at least 25 µs after a SL transmission by another UE in a shared channel occupancy as described in clause 4.5.3, the UE uses Type 2A SL channel access procedures for the SL transmission.

If a UE intends to transmit only S-SSB in transmission(s) where the time duration of S-SSB transmission(s) is at most 1 ms with a duty cycle of at most 1/20, the UE uses Type 2A SL channel access procedures for the SL transmission(s).

When a UE initiates a channel occupancy on a channel to transmit SL transmission(s) within the channel occupancy, if the UE stops transmitting on the channel, the UE can resume SL transmission(s) within the channel occupancy on the channel after performing Type 2A channel access procedures as described in clause 4.5.2.1 if the UE continuously senses the channel to be idle before resuming transmission.

Type 2B or Type 2C SL channel access procedure as described in clause 4.5.2.2 and 4.5.2.3, respectively, are applicable to the transmission(s) performed by a UE following transmission(s) by a UE after a gap of 16 µs or up to 16 µs, respectively, in a shared channel occupancy as described in clause 4.5.3.

4.5.2.1 Type 2A SL Channel Access Procedure

When a UE uses Type 2A SL channel access procedures for a transmission, the UE may transmit the transmission immediately after sensing the channel to be idle for at least a sensing interval $T_{short\_sl}$=25 µs.−The interval $T_{short\_sl}$ consists of a duration $T_f$=16 µs immediately followed by one sensing slot and $T_f$ includes a sensing slot at start of $T_f$. The channel is considered to be idle for $T_{short\_sl}$ if both sensing slots of $T_{short\_sl}$ are sensed to be idle.

4.5.2.2 Type 2B SL Channel Access Procedure

When a UE uses Type 2B SL channel access procedures for a transmission, the UE may transmit the transmission immediately after sensing the channel to be idle within a duration of $T_f=16$ μs. $T_f$ includes a sensing slot that occurs within the last 9 us of $T_f$. The channel is considered to be idle within the duration $T_f$ if the channel is sensed to be idle for total of at least 5 us with at least 4 us of sensing occurring in the sensing slot.

4.5.2.3 Type 2C SL Channel Access Procedure

When a UE uses Type 2C SL channel access procedures for a transmission, the UE does not sense the channel before the transmission. The duration of the corresponding SL transmission is at most 584 μs.

4.5.3 SL Channel Access Procedures in a Shared Channel Occupancy

When a UE initiates a channel occupancy using the channel access procedures described in clause 4.5.1 on a channel to transmit SL transmission(s), the UE can provide a channel occupancy sharing information in SL control information that includes at least the Layer 1 source and destination IDs, the corresponding channel access priority class, the remaining channel occupancy duration, and the frequency domain information for the applicable RB set(s) of the channel occupancy. The channel occupancy sharing information can also include additional IDs and associated cast type. The additional IDs includes one pair of Layer 1 source and destination IDs for all cast types, where the source ID is set to the source ID of the UE initiating channel occupancy for unicast and to the reserved bits for groupcast and broadcast. The channel occupancy sharing information transmitted in slot n, can indicate the remaining channel occupancy duration in a number of slot(s) K. If K=0, the initiated channel occupancy by the UE shall not be shared for SL transmission(s) by other UE(s). Otherwise, the initiated channel occupancy by the UE can be shared for SL transmission(s) by other UE(s) within a duration starting from the end of slot n and ending at slot n+K.

For the case when a UE transmits SL transmission(s) in a shared channel occupancy initiated by a UE, the channel access priority class value corresponding the SL transmission(s) is at most equal to the channel access priority class value provided by the channel access priority class in the channel occupancy sharing information.

When a UE initiates a channel occupancy to transmit SL transmission(s) within a RB set(s) and provides channel occupancy sharing information with a unicast PSCCH/PSSCH transmission within the RB set(s), another UE may transmit unicast PSCCH/PSSCH transmission(s) sharing the initiated channel occupancy within the RB set(s), if the destination and source IDs in the corresponding SL control information match the source and destination IDs, respectively, in the PSCCH/PSSCH transmission carrying the channel occupancy information or match a pair of additional source and destination IDs and associated cast type if provided by the channel occupancy sharing information and the corresponding COT sharing cast type indicates '10' value for unicast cast type. Another UE may transmit groupcast or broadcast PSCCH/PSSCH transmissions sharing the initiated channel occupancy within the RB set(s), if the destination ID in the corresponding SL control information matches an additional destination ID and associated cast type if provided by the channel occupancy sharing information and the corresponding COT sharing cast type indicates '00' or '01' value for groupcast or broadcast cast type, respectively.

When a UE initiates a channel occupancy to transmit SL transmission(s) within a RB set(s) and provides channel occupancy sharing information with a groupcast or broadcast PSCCH/PSSCH transmission within the RB set(s), another UE may transmit a groupcast or broadcast PSCCH/PSSCH transmission(s) sharing the initiated channel occupancy within the RB set(s), if the destination ID in the corresponding SL control information matches the destination ID in the groupcast or broadcast PSCCH/PSSCH transmission carrying the channel occupancy sharing information or matches an additional destination ID and associated cast type if provided by the channel occupancy sharing information and the corresponding COT sharing cast type indicates '00' or '01' value for groupcast or broadcast cast type, respectively. Another UE may transmit unicast PSCCH/PSSCH transmissions sharing the initiated channel occupancy within the RB set(s), if the destination and source IDs in the corresponding SL control information match a pair of additional source and destination IDs and associated cast type if provided by the channel occupancy sharing information and the corresponding COT sharing cast type indicates '10' value for unicast cast type.

When a UE initiates a channel occupancy to transmit SL transmission(s) within a RB set(s) and provides channel occupancy sharing information with a PSSCH/PSCCH transmission within the RB set(s), another UE may transmit a S-SSB transmission(s) sharing the initiated channel occupancy within the RB set(s).

When a UE initiates a channel occupancy to transmit SL transmission(s) within a RB set(s) and provides channel occupancy sharing information with a PSSCH/PSCCH transmission within the RB set(s), another UE may transmit a PSFCH transmission(s) sharing the initiated channel occupancy within the RB set(s) if at least one of the PSFCH transmission(s) is intended for the UE initiating the channel occupancy.

If a UE shares a channel occupancy initiated by another UE using the channel access procedures described in clause 4.5.1 on a channel to transmit SL transmission(s), the UE may transmit a SL transmission that follows the SL transmission by the UE that has initiated the channel occupancy after a transmission gap as follows:

If the transmission gap is at least 25 μs, the UE can transmit the SL transmission on the channel after performing Type 2A channel access procedures as described in clause 4.5.2.1.

If the transmission gap is 16 μs, the UE can transmit the SL transmission on the channel after performing Type 2B channel access procedures as described in clause 4.5.2.2.

If the transmission gap is up to 16 μs, the UE can transmit the SL transmission on the channel after performing Type 2C channel access as described in clause 4.5.2.3.

When a UE uses channel access procedures to initiate a channel occupancy to transmit SL transmission(s) and shares the corresponding channel occupancy with another UE that transmits a SL transmission(s), the UE may transmit a SL transmission(s) within its channel occupancy that follows the SL transmission(s) that share the initiated channel occupancy as the following.

If the UE determines a transmission gap from another UE's SL transmission(s), the followings are applicable:
If the transmission gap is at least 25 μs, the UE can transmit the SL transmission on the channel after performing Type 2A channel access procedures as described in clause 4.5.2.1.
If the transmission gap is 16 μs, the UE can transmit the SL transmission on the channel after performing Type 2B channel access procedures as described in clause 4.5.2.2.

If the transmission gap is up to 16 μs, the UE can transmit the SL transmission on the channel after performing Type 2C channel access as described in clause 4.5.2.3.

Otherwise, the UE can transmit the SL transmission on the channel after performing Type 2A channel access procedures as described in clause 4.5.2.1.

. . .

4.5.5 Energy Detection Threshold Adaptation Procedure

A UE accessing a channel on which SL transmission(s) are performed, shall set the energy detection threshold ($X_{Thresh}$) to be less than or equal to the maximum energy detection threshold $X_{Thresh\_max}$.

$X_{Thresh\_max}$ is determined as follows:

If the UE is configured with higher layer parameter sl-maxEnergyDetectionThreshold-r18, $X_{Thresh\_max}$ is set equal to the value signalled by the higher layer parameter;

otherwise the UE shall determine $X'_{Thresh\_max}$ according to the procedure described in clause 4.5.5.1;

if the UE is configured with higher layer parameter sl-energyDetectionThresholdOffset-r18

$X_{Thresh\_max}$ is set by adjusting $X'_{Thresh\_max}$ according to the offset value signalled by the higher layer parameter;

otherwise the UE shall set $X_{Thresh\_max} = X'_{Thresh\_max}$.

If the higher layer parameter sl-absenceOfAnyOtherTechnology-r18 is not configured to a UE, and the higher layer parameter ue-toUE-COT-SharingED-Threshold is configured to the UE, the UE should use the UE's transmit power in determining the resulting energy detection threshold ue-toUE-COT-SharingED-Threshold.

For the case where a UE performs channel access procedures as described in clause 4.5.1 for SL transmission(s) and indicates channel occupancy sharing information, $X_{Thresh\_max}$ is set equal to the value provided by the higher layer parameter ue-toUE-COT-SharingED-Threshold, if provided.

4.5.5.1 Default Maximum Energy Detection Threshold Computation Procedure

If the higher layer parameter sl-absenceOfAnyOtherTechnology-r18 is provided $$X'_{Thresh\_max} = \min\left\{\begin{array}{l} T_{max} + 10 \text{ dB} \\ X_r \end{array}\right\}$$

where $X_r$ is Maximum energy detection threshold defined by regulatory requirements in dBm when such requirements are defined, otherwise $X_r = T_{max} + 10$ dB otherwise $$X'_{Thresh\_max} = \max\left\{\begin{array}{l} -72 + 10 \cdot \log 10(BWMHz/20 \text{ MHz}) \text{ dBm}, \\ \min\left\{\begin{array}{l} T_{max}, \\ T_{max} - T_A + (P_H + 10 \cdot \log 10(BWMHz/20 \text{ MHz}) - P_{TX}) \end{array}\right\} \end{array}\right\}$$

where $T_A = 5$ dB if Type 2A SL channel access procedures is performed for a SL transmission(s) that occurs outside a shared channel occupancy and includes only S-SSB as described in clause 4.5.2; otherwise $T_A = 10$ dB;

$P_H = 23$ dBm;

$P_{TX}$ is set to the value of $P_{CMAX\_H,C}$ as defined in [3];

$$T_{max}(\text{dBm}) = 10 \cdot \log 10 \left(3.16228 \cdot 10^{-8} (\text{mW/MHz}) \cdot BWMHz \text{ (MHz)}\right);$$

BWMHz is the single channel bandwidth in MHz.

The higher layer parameter sl-absenceOfAnyOtherTechnology-r18 is not expected to be provided if the channel(s) where UE performing SL transmission(s) is overlapped with either an LAA Scell(s) on channel(s) or channel(s) where gNB/UE performing DL/UL transmission(s).

In running CR of TS 38.214 ([3]R1-2308720, Introduction of specification enhancements for NR sidelink evolution), the following is provided.

8 Physical Sidelink Shared Channel Related Procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain,

If the higher layer parameter transmissionStructureForPSCCHandPSSCH is not provided, or it is set to 'contiguousRB', a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.

If the higher layer parameter transmissionStructureForPSCCHandPSSCH is set to 'interlaceRB', in the frequency domain, a sidelink resource pool consists of sl-NumSubchannel sub-channels, where each sub-channel consists of numInterlacePerSubchannel interlaces having contiguous interlace indices.

For operation with shared spectrum channel access for frequency range 1, a sidelink resource pool can be (pre-) configured to include integer number of RB sets. A UE can be configured with intra-cell guard bands according to the higher layer parameter intraCellGuardBandsSL-List. The configured intra-cell guard band PRBs between any two adjacent RB sets can be used only for PSSCH transmission, if and only if, the UE has successfully performed channel access procedure in both adjacent RB sets, and the UE uses both of these RB sets for PSSCH transmission.

The set of slots that may belong to a sidelink resource pool is denoted by $(t_0^{SL}, t_1^{SL}, \ldots, t_{T_{max}-1}^{SL})$ where $0 \leq t_i^{SL} < 10240 \times 2^\mu$, $0 \leq i < T_{max}$, the slot index is relative to slot #0 of the radio frame corresponding to SFN 0 of the serving cell or DFN 0, the set includes all the slots except the following slots, $N_{S\text{-}SSB}$ slots in which S-SS/PSBCH block (S-SSB) or additional transmission occasion for S-SSB is configured, $N_{nonSL}$ slots in each of which at least one of Y-th, (Y+1)-th, . . . , (Y+X−1)-th OFDM symbols are not semi-statically configured as UL as per the higher layer parameter tdd-UL-DL-ConfigurationCommon of the serving cell if provided or sl-TDD-Configuration if provided or sl-TDD-Config of the received PSBCH if provided, where Y and X are set by the higher layer parameters sl-StartSymbol and sl-LengthSymbols, respectively.

The reserved slots which are determined by the following steps.
1) the remaining slots excluding $N_{S-SSB}$ slots and $N_{nonSL}$ slots from the set of all the slots are denoted by $(l_0, l_1, \ldots, l_{(10240 \times 2\mu - N_{S-SSB} - N_{nonSL} - 1)})$ arranged in increasing order of slot index.
2) a slot $l_r$ $(0 \leq r \leq 10240 \times 2^\mu - N_{S-SSB} - N_{nonsL})$ belongs to the reserved slots if $$r = \left\lfloor \frac{m \cdot (10240 \times 2^\mu - N_{S-SSB} - N_{nonSL})}{N_{reserved}} \right\rfloor,$$

here m=0, 1, ..., $N_{reserved}$–1 and $N_{reserved}$=(10240×2$^\mu$– $N_{S-SSB}$–$N_{nonSL}$) mod $L_{bitmap}$ where $L_{bitmap}$ denotes the length of bitmap configured by higher layers.

The slots in the set are arranged in increasing order of slot index.

The UE determines the set of slots assigned to a sidelink resource pool as follows:
  a bitmap $(b_0, b_1, \ldots, b_{L_{bitmap}-1})$ associated with the resource pool is used where $L_{bitmap}$ the length of the bitmap is configured by higher layers.
  a slot $t_k^{SL}$ $(0 \leq k < 10240 \times 2^\mu - N_{S-SSB} - N_{nonSL} - N_{reserved})$ belongs to the set if $b_{k'}$=1 where k'=k mod $L_{bitmap}$.
  The slots in the set are re-indexed such that the subscripts i of the remaining slots $t'_i^{SL}$ are successive $\{0, 1, \ldots, T'_{max}-1\}$ where $T'_{max}$ is the number of the slots remaining in the set.

The UE determines the set of resource blocks assigned to a sidelink resource pool as follows:
  The resource block pool consists of $N_{PRB}$ PRBs.
  If the higher layer parameter transmissionStructureForPSCCHandPSSCH is not provided, or is set to 'contiguousRB', the sub-channel in for m=0, 1, ..., numSubchannel–1 consists of a set of $n_{subCHsize}$ contiguous resource blocks with the physical resource block number $n_{PRB} = n_{subCHRBstart} + m \cdot n_{subCHsize} + j$ for j=0, 1, ..., $n_{subCHsize}$–1, where $n_{subCHRBstart}$, $n_{subCHsize}$ and numSubchannel are given by higher layer parameters sl-StartRB-Subchannel, sl-SubchannelSize and sl-NumSubchannel, respectively.
  If the higher layer parameter transmissionStructureForPSCCHandPSSCH is set to 'interlaceRB', the sub-channel in for m=0, 1, ..., numSubchannel–1 consists of a set of numInterlacePerSubchannel contiguous interlaces, where each interlace consists of at least 10 resource blocks as defined in clause 4.4.4.6 of [4, TS 38.211]. The sub-channel m is indexed per RB set and is periodically indexed across multiple RB sets within the resource pool. The sub-channel with the same index is mapped to the set of numinterlacePerSubchannel interlace(s) with the same index(s) in different RB sets. The sub-channel #0 is mapped to interlaces 0 to numinterlacePerSubchannel-1, the subchannel #1 is mapped to interlaces numInterlacePerSubchannel to numInterlacePerSubchannel*2-1, and so on.

A UE is not expected to use the last $N_{PRB}$ mod $n_{subCHsize}$ PRBs in the resource pool.

8.1 UE Procedure for Transmitting the Physical Sidelink Shared Channel
  Each PSSCH transmission is associated with an PSCCH transmission.
  That PSCCH transmission carries the 1$^{st}$ stage of the SCI associated with the PSSCH transmission; the 2$^{nd}$ stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot
  one transport block is transmitted with up to two layers;
  The number of layers (u) is determined according to the 'Number of DMRS port' field in the SCI;
  The set of consecutive symbols within the slot for transmission of the PSSCH is determined according to clause 8.1.2.1;
  The set of contiguous or interlaced resource blocks for transmission of the PSSCH is determined according to clause 8.1.2.2;
  The UE shall set the contents of the SCI format 2-A as follows:
    the UE shall set value of the 'HARQ process number' field as indicated by higher layers.
    the UE shall set value of the 'NDI' field as indicated by higher layers.
    the UE shall set value of the 'Redundancy version' field as indicated by higher layers.
    the UE shall set value of the 'Source ID' field as indicated by higher layers.
    the UE shall set value of the 'Destination ID' field as indicated by higher layers.
    the UE shall set value of the 'HARQfeedback enabled/disabled indicator' field as indicated by higher layers.
    the UE shall set value of the 'Cast type indicator' field as indicated by higher layers.
    the UE shall set value of the 'CSI request' field as indicated by higher layers.
    the UE shall set value of the 'CAPC' field as indicated by higher layers.
    the UE shall set value of the 'COT sharing cast type' field as indicated by higher layers.
    the UE shall set value of the 'COT sharing Additional ID' field as indicated by higher layers.
    the UE shall set value of the 'Remaining COT duration' field as indicated by higher layers.]

8.1.1 Transmission Schemes
  Only one transmission scheme is defined for the PSSCH and is used for all PSSCH transmissions.
  PSSCH transmission is performed with up to two antenna ports, with antenna ports 1000-1001 as defined in clause 8.2.4 of [4, TS 38.211].

8.1.2 Resource Allocation
  In sidelink resource allocation mode 1:
  for PSSCH and PSCCH transmission, dynamic grant, configured grant type 1 and configured grant type 2 are supported. The configured grant Type 2 sidelink transmission is semi-persistently scheduled by a SL grant in a valid activation DCI according to Clause 10.2A of [6, TS 38.213].

8.1.2.1 Resource Allocation in Time Domain
  The UE shall transmit the PSSCH in the same slot as the associated PSCCH.
  The minimum resource allocation unit in the time domain is a slot.
  The UE shall transmit the PSSCH in consecutive symbols within the slot, subject to the following restrictions:
    The UE shall not transmit PSSCH in symbols which are not configured for sidelink. A symbol is configured for sidelink, according to higher layer parameters sl-Start-Symbol and sl-LengthSymbols, where sl-StartSymbol is the symbol index of the first symbol of sl-LengthSymbols consecutive symbols configured for sidelink.

Within the slot, PSSCH resource allocation starts at symbol sl-StartSymbol+1, except when startingSymbolFirst and startingSymbolSecond are provided for a SL-BWP. If startingSymbolFirst and startingSymbolSecond are provided for the SL-BWP, there are 2 candidate starting symbols for PSSCH transmission for slots without PSFCH symbols. PSSCH resource allocation starts at the next symbol after each candidate starting symbol. In a slot, the UE may use the second candidate starting symbol, provided by startingSymbolSecond, only if it fails to access the channel prior to the first starting symbol provided by startingSymbolFirst. The UE shall not use the second starting symbol in slots with PSFCH symbols.

The UE shall not transmit PSSCH in symbols which are configured for use by PSFCH, if PSFCH is configured in this slot.

The UE shall not transmit PSSCH in the last symbol configured for sidelink.

The UE shall not transmit PSSCH in the symbol immediately preceding the symbols which are configured for use by PSFCH, if PSFCH is configured in this slot.

. . .

In sidelink resource allocation mode 1:

For sidelink dynamic grant, the PSSCH transmission is scheduled by a DCI format 3_0.

For sidelink configured grant type 2, the configured grant is activated by a DCI format 3_0.

For sidelink dynamic grant and sidelink configured grant type 2:
  The "Time gap" field value m of the DCI format 3_0 provides an index m+1 into a slot offset table. That table is given by higher layer parameter sl-DCI-ToSL-Trans and the table value at index m+1 will be referred to as slot offset $K_{SL}$.
  The slot of the first sidelink transmission scheduled by the DCI is the first SL slot of the corresponding resource pool that starts not earlier than $$T_{DL} - \frac{T_{TA}}{2} + K_{SL} \times T_{slot},$$

where $T_{DL}$ is the starting time of the downlink slot carrying the corresponding DCI, $T_{TA}$ is the timing advance value corresponding to the TAG of the serving cell on which the DCI is received and $K_{SL}$ is the slot offset between the slot of the DCI and the first sidelink transmission scheduled by DCI and $T_{slot}$ is the SL slot duration.
  The "Configuration index" field of the DCI format 3_0, if provided and not reserved, indicates the index of the sidelink configured type 2.

For sidelink configured grant type 1:
  The slot of the first sidelink transmissions follows the higher layer configuration according to [10, TS 38.321].

<omitted text>

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

When PSSCH is transmitted on multiple RB sets, the corresponding PSCCH is located on the sub-channel with smallest index of the lowest RB set.

<omitted text>

. . .

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;

L1 priority, $prio_{TX}$;

the remaining packet delay budget;

If the higher layer parameter transmissionStructureForPSCCHandPSSCH is not provided, the number of sub-channels to be used for the PSSCH/PSCCH transmission in a slot is $L_{subCH}$. If the higher layer parameter transmissionStructureForPSCCHandPSSCH is set to 'contiguousRB', $L_{subCH}$ corresponds to the number of sub-channels within all used RB sets to be used for the PSCCH/PSSCH transmission in a slot. If the higher layer parameter transmissionStructureForPSCCHandPSSCH is set to 'interlaceRB', $L_{subCH}$ corresponds to the number of sub-channels to be used for the PSSCH/PSCCH transmission in a slot in each RB set, If the higher layer parameter transmissionStructureForPSCCHandPSSCH is set to 'interlaceRB', the number of used RB sets for one PSCCH/PSSCH transmission, $L_{RBset}$.

optionally, the number of consecutive slots for Multi-consecutive slots transmission, $N_{slot,MCSt}$.

optionally, the resource reservation interval, $P_{rsvp\_TX}$, in units of msec.

. . .

Optionally, the indication of resource selection mechanism.

Optionally, rbSetsWithConsecutiveLBTFailure, which indicates the RB sets where consistent LBT failure has been indicated.

$N_{slot,MCSt}$, which indicates the number of consecutive slots for MCSt.

The following higher layer parameters affect this procedure:

sl-SelectionWindowList: internal parameter $T_{2min}$ is set to the corresponding value from higher layer parameter si-SelectionWindowList for the given value of $prio_{TX}$.

sl-Thres-RSRP-List: this higher layer parameter provides an RSRP threshold for each combination ($p_i$, $p_j$), where $p_i$ is the value of the priority field in a received SCI format 1-A and $p_j$ is the priority of the transmission of the UE selecting resources; for a given invocation of this procedure, $p_j$=$prio_{TX}$.

sl-RS-ForSensing selects if the UE uses the PSSCH-RSRP or PSCCH-RSRP measurement, as defined in clause 8.4.2.1.

sl-ResourceReservePeriodList sl-Sensing Window: internal parameter $T_0$ is defined as the number of slots corresponding to sl-Sensing Window msec sl-TxPercentageList: internal parameter X for a given $prio_{TX}$ is defined as sl-TxPercentageList ($prio_{TX}$) converted from percentage to ratio

. . .

The resource reservation interval, $P_{rsvp\_TX}$, if provided, is converted from units of msec to units of logical slots, resulting in $P'_{rsvp\_TX}$ according to clause 8.1.7.

When the resource pool is (pre-)configured with sl-AllowedResourceSelectionConfig including full sensing, and full sensing is configured in the UE by higher layers, the UE performs full sensing.

When periodic reservation for another TB (sl-MultiReserveResource) is enabled for the resource pool, the resource pool is (pre-)configured with sl-AllowedResourceSelectionConfig including partial sensing, and partial sensing is configured by higher layer, the UE performs periodic-based partial sensing, unless other conditions state otherwise in the specification.

When a UE is triggered by higher layer to report resources for resource (re-)selection in a mode 2 Tx pool, the resource pool is (pre-)configured with sl-AllowedResourceSelectionConfig including partial sensing, and partial sensing is configured by higher layer, the UE performs contiguous partial sensing, unless stated otherwise in the specification.

Notation:

($t'_0{}^{SL}$, $t'_1{}^{SL}$, $t'_2{}^{SL}$, . . . ) denotes the set of slots which belongs to the sidelink resource pool and is defined in Clause 8.

For dynamic co-channel coexistence of LTE sidelink and NR sidelink, ($t_0{}^{LTESL}$, $t_1{}^{LTESL}$, . . . , $t_{T_{max}-1}{}^{LTESL}$) denotes the set of subframes that may belong to an LTE sidelink resource pool as defined in clause 14.1.5 of [19, TS36.213].

The following steps are used:

1) If a number of consecutive slots $N_{slot,MCSt}$ is provided with a value larger than 1, the candidate multi-slot resource definition is applied. Otherwise, the candidate single-slot resource definition is applied.

If the higher layer parameter transmissionStructureForPSCCHandPSSCH is set to 'contiguousRB', a candidate multi-slot resource $R_x$, is defined as a set of $L_{subCH}$ contiguous sub-channels starting from sub-channel x in $N_{slot,MCSt}$ consecutive slots starting from slot $t'_y{}^{SL}$.

If the higher layer parameter transnissionStructureForPSCCHandPSSCH is set to 'interlaceRB', a candidate multi-slot resource $R_{x,y}$; is defined as a set of $L_{subCH}$ contiguous sub-channels starting from sub-channel x in $N_{slot,MCSt}$ consecutive slots starting from slot $t'_y{}^{SL}$ in $L_{RBset}$ contiguous RB sets starting from RB set z.

If the higher layer parameter transmissionStructureForPSCCHandPSSCH is not provided, a candidate single-slot resource for transmission $R_{x,y}$ is defined as a set of $L_{subCH}$ contiguous sub-channels with sub-channel x+j in slot $t'_y{}^{SL}$ where j=0, . . . , $L_{subCH}-1$.

The UE shall assume that any set of $L_{subCH}$ contiguous sub-channels or $L_{subCH}$ contiguous sub-channels in $L_{RBset}$ contiguous RB sets included in the corresponding resource pool within the time interval [$n+T_1$, $n+T_2$] correspond to one candidate single-slot resource or one candidate multi-slot resource for UE performing full sensing, in a set of Y candidate slots within the time interval [$n+T_1$, $n+T_2$] correspond to one candidate single-slot resource for UE performing periodic-based partial sensing together with contiguous partial sensing and resource (re)selection triggered by periodic transmission ($P_{rsvp\_TX} \neq 0$), or in a set of Y' candidate slots within the time interval [$n+T_1$, $n+T_2$] correspond to one candidate single-slot resource for UE performing at least contiguous partial sensing and resource (re)selection triggered by aperiodic transmission ($P_{rsvp\_TX}=0$), where selection of $T_1$ is up to UE implementation under $0 \leq T_1 \leq T_{proc,1}{}^{SL}$, where $T_{proc,1}{}^{SL}$ is defined in slots in Table 8.1.4-2 where $\mu_{SL}$ is the SCS configuration of the SL BWP;

if $T_{2min}$ is shorter than the remaining packet delay budget (in slots) then $T_2$ is up to UE implementation subject to $T_{2min} \leq T_2 \leq$ remaining packet delay budget (in slots); otherwise $T_2$ is set to the remaining packet delay budget (in slots).

Y is selected by UE where $Y \geq Y_{min}$.

Y' is selected by UE where $Y' \geq Y'_{min}$. When the UE performs at least contiguous partial sensing and if $P_{rsvp\_TX}=0$, the UE selects a set of Y' candidate slots with corresponding PBPS and/or CPS results (if available). If the number of candidate slots Y' is smaller than $Y'_{min}$, it is up to UE implementation to include other candidate slots.

If the higher layer parameter transnissionStructureForPSCCHandPSSCH is set to 'contiguousRB', the UE shall exclude candidate single-slot or candidate multi-slot resources with the lowest sub-channel including resource blocks of the intra-cell guardband PRBs, configured by higher layer parameter, intraCellGuardBandsSL-List.

The total number of remaining candidate single-slot resources or candidate multi-slot resources is denoted by $M_{total}$.

2) The sensing window is defined by the range of slots [$n-T_0$, $n-T_{proc,0}{}^{SL}$), when the UE performs full sensing, where $T_0$ is defined above and $T_{proc,0}{}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

When the UE performs periodic-based partial sensing, the UE shall monitor slots at $t'_{y-k \times P'_{reserve}}{}^{SL}$ where $t'_y{}^{SL}$ is a slot of the selected candidate slots and $P'_{reserve}$ is $P_{reserve}$ converted to units of logical slot according to clause 8.1.7. The UE shall perform the behaviour in the following steps based on PSCCH decoded and RSRP measured in these slots.

The value of $P_{reserve}$ corresponds to sl-PBPS-OccasionReservePeriodList if (pre-)configured, otherwise, the values correspond to all periodicity from sl-ResourceReservePeriodList.

The UE monitors sensing occasion(s) determined by sl-Additional-PBPS-Occasion, as previously described, and not earlier than $n-T_0$. For a given periodicity $P_{reserve}$, the values of k correspond to the most recent sensing occasion earlier than $t'_{y0}{}^{SL}-(T_{proc,0}{}^{SL}+T_{proc,1}{}^{SL})$ if sl-Additional-PBPS-Occasion is not (pre-)configured, and additionally includes the value of k corresponding to the last periodic sensing occasion prior to the most recent one if sl-Additional-PBPS-Occasion is (pre-)configured. $t'_{y0}{}^{SL}$ is the first slot of the selected Y candidate slots of PBPS.

. . .

. . .

3) The internal parameter $Th(p_i, p_j)$ is set to the corresponding value of RSRP threshold indicated by the i-th field in sl-Thres-RSRP-List, where $i=p_i+(p_j-1)*8$.

. . .

4) The set $S_A$ is initialized to the set of all the candidate single-slot resources or candidate multi-slot resources.
5) The UE shall exclude any candidate single-slot resource $R_{x,y}$ or $R_{x,y,z}$, or candidate multi-slot resource $R_{x,y}$ or $R_{x,y,z}$ from the set $S_A$ if it meets all the following conditions:

the UE has not monitored slot $t'_m{}^{SL}$ in Step 2.
for any periodicity value allowed by the higher layer parameter sl-ResourceReservePeriodList and a hypothetical SCI format 1-A received in slot $t'_m{}^{SL}$ with 'Resource reservation period' field set to that periodicity value and indicating all subchannels of the resource pool in this slot, condition c in step 6 would be met.

5a) If the number of candidate single-slot resources $R_{x,y}$ or $R_{x,y,z}$, or the number of candidate multi-slot resource $R_Xy$ or $R_{x,y,z}$ remaining in the set $S_A$ is smaller than $X \cdot M_{total}$, the set $S_A$ is initialized to the set of all the candidate single-slot resources as in step 4.
6) The UE shall exclude any candidate single-slot resource $R_{x,y}$ or $R_{x,y,z}$, or candidate multi-slot resource $R_{x,y}$ or $R_{x,y,z}$ from the set $S_A$ if it meets all the following conditions:
   a) the UE receives an SCI format 1-A in slot $t'_m{}^{SL}$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];
   b) the RSRP measurement performed, according to clause 8.4.2.1 for the received SCI format 1-A, is higher than $Th(prio_{RX}, prio_{TX})$;
   c) the SCI format received in slot $t'_m{}^{SL}$ or the same SCI format which, if and only if the 'Resource reservation period' field is present in the received SCI format 1-A, is assumed to be received in slot(s) $t'_{m+q \times P'_{rsvp\_RX}}{}^{SL}$ determines according to clause 8.1.5 the set of resource blocks and slots which overlaps with $R_{x,y+j \times P'_{rsvpTX}}$ for q=1, 2, . . . , Q and j=0, 1, . . . , $C_{resel}$−1. Here, $P'_{rsvp\_RX}$ is $P_{rsvp\_RX}$ converted to units of logical slots according to clause 8.1.7, $$Q = \left\lceil \frac{T_{scal}}{P'_{rsvp\_RX}} \right\rceil$$

if $P_{rsvp_{RX}} < T_{scal}$ and $n'-m \le P'_{rsvp\_RX}$, where if the UE is configured with full sensing by its higher layer, $t'_n{}^{SL}$=n if slot n belongs to the set $(t'_0{}^{SL}, t'_1{}^{SL}, \ldots, t'_{T_{max}-1}{}^{SL})$, otherwise slot $t'_n{}^{SL}$ is the first slot after slot n belonging to the set $(t'_0{}^{SL}, t'_1{}^{SL}, \ldots, t'_{T_{max}-1}{}^{SL})$; If UE is configured with partial sensing by its higher layer, $t'_n{}^{SL}=t'_{y_i}{}^{SL}-T_{proc,1}{}^{SL}$ if slot $t'_{y_1}{}^{SL}-T_{proc,1}{}^{SL}$ belongs to the set $(t'_0{}^{SL}, t'_1{}^{SL}, \ldots, t'_{T_{max}-1}{}^{SL})$, otherwise, slot $t'_n{}^{SL}$ is the first slot after slot $t'_{y_i}{}^{SL}-T_{proc,1}{}^{SL}$ belonging to the set $(t'_0{}^{SL}, t'_1{}^{SL}, \ldots, t'_{T_{max}-1}{}^{SL})$. Otherwise Q=1. If the UE is configured with full sensing by its higher layer, $T_{scal}$ is set to selection window size $T_2$ converted to units of msec. If UE is configured with partial sensing by its higher layer, $T_{scal}=t'_{y_L}{}^{SL}-(t'_{y_L}{}^{SL}-T_{proc,1}{}^{SL})$ shall be converted to milliseconds, where slot $t'_{y_L}{}^{SL}$ is the last slot of the Y or Y' candidate slots. The slot $t'_{y_i}{}^{SL}$ is the first slot of the selected/remaining set of Y or Y' candidate slots.

. . .

6a) This step is executed only if the procedure in clause 8.1.4A is triggered.
6b) This step is executed only if the procedure in clause 8.1.4C is triggered.

7) If the number of candidate single-slot resources or candidate multi-slot resources remaining in the set $S_A$ is smaller than $X \cdot M_{total}$, then $Th(p_i, p_j)$ [and $ThLTE(p_i, p_j)$, if set,] is increased by 3 dB for each priority value $(p_i, p_j)$ and the procedure continues with step 4.

. . .

The UE shall report set $S_A$ to higher layers.

. . .

TABLE 8.1.4-1

| $T_{proc, 0}{}^{SL}$ depending on sub-carrier spacing | |
|---|---|
| $\mu_{SL}$ | $T_{proc, 0}{}^{SL}$ [slots] |
| 0 | 1 |
| 1 | 1 |
| 2 | 2 |
| 3 | 4 |

TABLE 8.1.4-2

| $T_{proc, 1}{}^{SL}$ depending on sub-carrier spacing | |
|---|---|
| $\mu_{SL}$ | $T_{proc, 1}{}^{SL}$ [slots] |
| 0 | 3 |
| 1 | 5 |
| 2 | 9 |
| 3 | 17 |

<omitted text>

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below. 'Time resource assignment' carries logical slot offset indication of N=1 or 2 actual resources when sl-MaxNumPerReserve is 2, and N=1 or 2 or 3 actual resources when sl-MaxNumPerReserve is 3, in a form of time RIV (TRIV) field which is determined as follows:

```
if N = 1
   TRIV = 0
elseif N = 2
   TRIV = t₁
else
   if (t₂ − t₁ − 1) ≤ 15
     ● TRIV = 30(t₂ − t₁ − 1) + t₁ + 31
   else
     ● TRIV = 30(31 − t₂ + t₁) + 62 − t₁
   end if
end if
``` where the first resource is in the slot where SCI format 1-A was received, and $t_i$ denotes i-th resource time offset in logical slots of a resource pool with respect to the first resource where for N=2, $1 \le t_1 \le 31$; and for N=3, $1 \le t_1 \le 30$, $t_1 < t_2 \le 31$.

The starting sub-channel $n_{subCH,0}{}^{start}$ of the first resource is determined according to clause 8.1.2.2. The number of contiguously allocated sub-channels for each of the N resources $L_{subCH} \ge 1$ and the starting sub-channel indexes of resources indicated by the received SCI format 1-A, except the resource in the slot where SCI format 1-A was received, are determined from "Frequency resource assignment" which is equal to a frequency RIV (FRIV) where.

If sl-MaxNumPerReserve is 2 then $$FRIV = n_{subCH,1}^{start} + \sum_{i=1}^{L_{subCH}-1}(N_{subchannel}^{SL} + 1 - i)$$

If sl-MaxNumPerReserve is 3 then $$FRIV = n_{subCH,1}^{start} +$$

$$n_{subCH,2}^{start} \cdot (N_{subchannel}^{SL} + 1 - L_{subCH}) + \sum_{i=1}^{L_{subCH}-1}(N_{subchannel}^{SL} + 1 - i)^2$$

where $n_{subCH,1}^{start}$, denotes the starting sub-channel index for the second resource $n_{subCH,2}$ denotes the starting sub-channel index for the third resource $N_{subchannel}^{SL}$ is the number of sub-channels in a resource pool, or if the higher layer parameter transmissionStructureForPSCCHandPSSCH is set to 'interlaceRB', the number of sub-channels in each RB set, provided according to the higher layer parameter sl-NumSubchannel If the higher layer parameter transmissionStructureForPSCCHandPSSCH is set to 'interlaceRB', the applied interlace index(es) in different RB sets are the same.

If the higher layer parameter transmissionStructureForPSCCHandPSSCH is set to 'interlaceRB', the starting RB set $n_{RBset,0}^{start}$ of the first resource is determined according to the clause [ABCDE]. The number of contiguously allocated RB sets for each of the N resources $L_{RBset} \geq 1$ and the starting RB set indexes of resources indicated by the received SCI format 1-A, except the resource in the slot where SCI format 1-A was received, are determined from "Frequency resource assignment" which is equal to a frequency RIV (FRIV) where.

If sl-MaxNumPerReserve is 2 then $$FRIV_{RBset} = n_{RBset,1}^{start} + \sum_{i=1}^{L_{RBset}-1}(N_{RBset} + 1 - i)$$

If sl-MaxNumPerReserve is 3 then $$FRIV_{RBset} =$$

$$n_{RBset,1}^{start} + n_{RBset,2}^{start} \cdot (N_{RBset} + 1 - L_{RBset}) + \sum_{i=1}^{L_{RBset}-1}(N_{RBset} + 1 - i)^2$$

where $n_{RBset,1}^{start}$ denotes the starting RB set index for the second resource $n_{RBset,2}^{start}$ denotes the starting RB set index for the third resource $N_{RBset}$ is the number of RB sets in a resource pool $L_{RBset}$ is the number of RB sets for each of the indicated resources If the higher layer parameter transmissionStructureForPSCCHandPSSCH is set to 'interlaceRB', the resource is determined by an intersection of the interlaces corresponding to the indicated sub-channel(s) and the union of the indicated set of RB sets and intra-cell guard bands between the indicated RB sets, if any.

If TRIV indicates N<sl-MaxNumPerReserve, the starting sub-channel indexes corresponding to sl-MaxNumPerReserve minus N last resources are not used.

The number of slots in one set of the time and frequency resources for transmission opportunities of PSSCH is given by $C_{resel}$ where $C_{resel}$=10*SL_RESOURCE_RESELECTION_COUNTER [10, TS 38.321] if configured else $C_{resel}$ is set to 1.

If a set of sub-channels in slot $t'^{SL}_m$ is determined as the time and frequency resource for PSSCH transmission corresponding to the selected sidelink grant (described in [10, TS 38.321]), the same set of sub-channels in slots $$t'^{SL}_{m+j \times P'_{rsvp\_TX}}$$

are also determined for PSSCH transmissions corresponding to the same sidelink grant where j=1, 2, . . . , $C_{resel}$−1, $P_{rsvp\_TX}$, if provided, is converted from units of msec to units of logical slots, resulting in $P'_{rsvp\_TX}$ according to clause 8.1.7, and ($t'^{SL}_0$, $t'^{SL}_1$, $t'^{SL}_2$, . . . ) is determined by Clause 8. Here, $P_{rsvp\_TX}$ is the resource reservation interval indicated by higher layers.

<omitted text>

In running CR of TS 38.212 ([4]R1-2308714, Introduction of Rel-18 NR sidelink evolution), the following is provided.

8.3.1.1 SCI Format 1-A

SCI format 1-A is used for the scheduling of PSSCH and $2^{nd}$-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321]. Value '000' of Priority field corresponds to priority value 'I', value '001' of Priority field corresponds to priority value '2', and so on.

Frequency resource assignment—number of bits determined by the following:

If higher layer parameter transmissionStructureForPSCCHandPSSCH in SL-BWP-Config is not configured or configured to 'contigousRB'

$$\left\lceil \log_2\left(\frac{N_{subChannel}^{SL}(N_{subChannel}^{SL} + 1)}{2}\right) \right\rceil$$

bits when the value of the higher layer parameter sl-MaxNumPerReserve is configured to 2; otherwise $$\left\lceil \log_2\left(\frac{N_{subChannel}^{SL}(N_{subChannel}^{SL} + 1)(2N_{subChannel}^{SL} + 1)}{6}\right) \right\rceil$$

bits when the value of the higher layer parameter sl-MaxNumPerReserve is configured to 3, as defined in clause 8.1.5 of [6, TS 38.214].

If the higher layer parameter transmissionStructureForPSCCHandPSSCH in SL-BWP-Config is configured to 'interlaceRB'

X+Y bits provide the frequency domain resource allocation according to Clause x.x of [6, TS 38.214], where the X MSBs provide the RB set allocation and the Y LSBs provide the sub-channel allocation, the value of X is determined by $$\left\lceil \log_2\left(\frac{N_{RBset}(N_{RBset}+1)}{2}\right) \right\rceil$$

when the value of the higher layer parameter sl-MaxNumPerReserve is configured to 2, or determined by $$\left\lceil \log_2\left(\frac{N_{RBset}(N_{RBset}+1)(2N_{RBset}+1)}{6}\right) \right\rceil$$

when the value of the higher layer parameter sl-MaxNumPerReserve is configured to 3, where $N_{RBset}$ is the number of RB sets in a resource pool the value of Y is determined by $$\left\lceil \log_2\left(\frac{N_{subChannel}^{RBset}(N_{subChannel}^{RBset}+1)}{2}\right) \right\rceil$$

when the value of the higher layer parameter sl-MaxNumPerReserve is configured to 2, or determined by $$\left\lceil \log_2\left(\frac{N_{subChannel}^{RBset}(N_{subChannel}^{RBset}+1)(2N_{subChannel}^{RBset}+1)}{6}\right) \right\rceil$$

when the value of the higher layer parameter sl-MaxNumPerReserve is configured to 3, where $N_{subChannel}^{RBset}$ is the number of sub-channels for each RB set.

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

$2^{nd}$-stage SCI format—2 bits as defined in Table 8.3.1.1-1.

Beta_offset indicator—2 bits as provided by higher layer parameter sl-BetaOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by the following:

$N_{reserved}$ bits as configured by higher layer parameter sl-NunReservedBits, with value set to zero, if higher layer parameter sl-IndicationUE-B is not configured, or if higher layer parameter sl-Indication UE-B is configured to 'disabled';

($N_{reserved}$-1) bits otherwise, with value set to zero.

Conflict information receiver flag—0 or 1 bit 1 bit if higher layer parameter sl-IndicationUE-B is configured to 'enabled', where the bit value of 0 indicates that the UE cannot be a UE to receive conflict information and the bit value of 1 indicates that the UE can be a UE to receive conflict information as defined in Clause 16.3.0 of [5, TS 38.213];

0 bit otherwise.

TABLE 8.3.1.1-1

$2^{nd}$-stage SCI formats

| Value of 2nd-stage SCI format field | 2nd-stage SCI format |
| --- | --- |
| 00 | SCI format 2-A |
| 01 | SCI format 2-B |
| 10 | SCI format 2-C |
| 11 | Reserved |

TABLE 8.3.1.1-2

Mapping of Beta_offset indicator values to indexes in Table 9.3-2 of [5, TS38.213]

| Value of Beta_offset indicator | Beta_offset index in Table 9.3-2 of [5, TS38.213] |
| --- | --- |
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

TABLE 8.3.1.1-3

Number of DMRS port(s)

| Value of the Number of DMRS port field | Antenna ports |
| --- | --- |
| 0 | 1000 |
| 1 | 1000 and 1001 |

<Unchanged parts are omitted>

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits.

New data indicator—1 bit.

Redundancy version—2 bits as defined in Table 7.3.1.1.1-2.

Source ID—8 bits as defined in clause 8.1 of [6, TS 38.214].
Destination ID—16 bits as defined in clause 8.1 of [6, TS 38.214].
HARQ feedback enabled/disabled indicator—1 bit as defined in clause 16.3 of [5, TS 38.213].
Cast type indicator—2 bits as defined in Table 8.4.1.1-1 and in clause 8.1 of [6, TS 38.214].
CSI request—1 bit as defined in clause 8.2.1 of [6, TS 38.214] and in clause 8.1 of [6, TS 38.214].
If higher layer parameter transmissionStructureForPSCCHandPSSCH in SL-BWP-Config is configured, all the remaining fields are set as follows:
CAPC—2 bits. Value '00' of CAPC field corresponds to CAPC value '1', value '01' of CAPC field corresponds to priority value '2', and so on.
COT sharing cast type—2 bits as defined in Table 8.4.1.1-1.
COT sharing additional ID—24 bits. The 16 LSBs provide layer 1 destination ID and the 8 MSBs provide layer 1 source ID, as defined in [6, TS 38.214]. The 8 MSBs are reserved when value of COT sharing cast type field is set to '00' or '01'.
Remaining COT duration—$\lceil \log_2(10 \cdot 2^\mu) \rceil$ bits, where p is defined in Table 4.2-1 of Clause 4.2 of [4, TS 38.211].

TABLE 8.4.1.1-1

Cast type indicator or COT sharing cast type

| Value of Cast type indicator or COT sharing cast type | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Note
The row with value '11' is reserved, if higher layer parameter transmissionStructureForPSCCHandPSSCH in SL-BWP-Config is configured.

In [5]3GPP TS 38.331 V17.0.0 (2022-03) 3rd Generation Partnership Project; Technical Specification Group Radio Access Network; NR; Radio Resource Control (RRC) protocol specification (Release 17), some IEs are quoted below.

SL-BWP-Config

The IE SL-BWP-Config is used to configure the UE specific NR sidelink communication on one particular sidelink bandwidth part.

SL-BWP-Config information element

```
-- ASN1START
-- TAG-SL-BWP-CONFIG-START
SL-BWP-Config-r16 ::=        SEQUENCE {
    sl-BWP-Id                BWP-Id,
    sl-BWP-Generic-r16       SL-BWP-Generic-r16
OPTIONAL,  -- Need M
    sl-BWP-PoolConfig-r16    SL-BWP-PoolConfig-r16
OPTIONAL,  -- Need M
    ...,
    [[
    sl-BWP-PoolConfigPS-r17  SetupRelease {SL-BWP-PoolConfigPS-r17}
OPTIONAL,  -- Need M
    sl-BWP-DiscPoolConfig-r17 SetupRelease {SL-BWP-DiscPoolConfig-r17}
OPTIONAL,  -- Need M
    ]]
}
SL-BWP-Generic-r16 ::=       SEQUENCE {
    sl-BWP-r16               BWP
OPTIONAL,  -- Need M
    sl-LengthSymbols-r16     ENUMERATED {sym7, sym8, sym9, sym10, sym11, sym12, sym13, sym14}  OPTIONAL,  -- Need M
    sl-StartSymbol-r16       ENUMERATED {sym0, sym1, sym2, sym3, sym4, sym5, sym6, sym7}  OPTIONAL,  -- Need M
    sl-PSBCH-Config-r16      SetupRelease {SL-PSBCH-Config-r16}
OPTIONAL,  -- Need M
    sl-TxDirectCurrentLocation-r16  INTEGER (0..3301)
OPTIONAL,  -- Need M
    ...
}
-- TAG-SL-BWP-CONFIG-STOP
-- ASN1STOP
```

| SL-BWP-Config field descriptions |
| --- |
| sl-BWP-DiscPoolConfig |
| This field indicates the NR sidelink discovery dedicated resource pool configurations on the configured sidelink BWP. The total number of Rx/Tx resource pools configured for communication and discovery does not exceed the maximum number of Rx/Tx resource pool for NR sidelink communication (i.e. maxNrofRXPool-r16/maxNrofTXPool-r16). |
| sl-BWP-Generic |
| This field indicates the generic parameters on the configured sidelink BWP. |
| si-BWP-PoolConfig |
| This field indicates the resource pool configurations on the configured sidelink BWP. |
| sl-BWP-Id |
| An identifier for this sidelink bandwidth part. |
| sl-BWP-PoolConfigPS |
| This field indicates the resource pool configurations for power saving on the configured sidelink BWP. |

| SL-BWP-Generic field descriptions |
| --- |
| sl-LengthSymbols<br>This field indicates the number of symbols used for sidelink in a slot without SL-SSB. A single value can be (pre)configured per sidelink bandwidth part.<br>sl-StartSymbol<br>This field indicates the starting symbol used for sidelink in a slot without SL-SSB. A single value can be (pre)configured per sidelink bandwidth part. |

SL-BWP-PoolConfig

The IE SL-BWP-PoolConfig is used to configure NR sidelink communication resource pool.

| SL-BWP-PoolConfig field descriptions |
| --- |
| sl-RxPool<br>Indicates the receiving resource pool on the configured BWP. For the PSFCH related configuration, if configured, will be used for PSFCH transmission/reception. If the field is included, it replaces any previous list, i.e. all the entries of the list are replaced and each of the SL-ResourcePool entries is considered to be newly created.<br>sl-TxPoolExceptional<br>Indicates the resources by which the UE is allowed to transmit NR sidelink communication in exceptional conditions on the configured BWP. For the PSFCH related configuration, if configured, will be used for PSFCH transmission/reception.<br>sl-TxPoolScheduling<br>Indicates the resources by which the UE is allowed to transmit NR sidelink communication based on network scheduling on the configured BWP. For the PSFCH related configuration, if configured, will be used for PSFCH transmission/reception.<br>sl-TxPoolSelectedNormal<br>Indicates the resources by which the UE is allowed to transmit NR sidelink communication by UE autonomous resource selection on the configured BWP. For the PSFCH related configuration, if configured, will be used for PSFCH transmission/reception. |

SL-FreqConfig

The IE SL-FreqConfig specifies the dedicated configuration information on one particular carrier frequency for NR sidelink communication.

| SL-BWP-PoolConfig information element |
| --- |
| ```
-- ASN1START
-- TAG-SL-BWP-POOLCONFIG-START
SL-BWP-PoolConfig-r16 ::=      SEQUENCE {
    sl-RxPool-r16                  SEQUENCE (SIZE (1..maxNrofRXPool-r16)) OF SL-ResourcePool-r16
OPTIONAL,  -- Cond HO
    sl-TxPoolSelectedNormal-r16    SL-TxPoolDedicated-r16
OPTIONAL,  -- Need M
    sl-TxPoolScheduling-r16        SL-TxPoolDedicated-r16
OPTIONAL,  -- Need N
    sl-TxPoolExceptional-r16       SL-ResourcePoolConfig-r16
OPTIONAL   -- Need M
}
SL-TxPoolDedicated-r16 ::=     SEQUENCE {
    sl-PoolToReleaseList-r16       SEQUENCE (SIZE (1..maxNrofTXPool-r16)) OF SL-ResourcePoolID-r16
OPTIONAL,  -- Need N
    sl-PoolToAddModList-r16        SEQUENCE (SIZE (1..maxNrofTXPool-r16)) OF SL-ResourcePoolConfig-
r16 OPTIONAL   -- Need N
}
SL-ResourcePoolConfig-r16 ::=  SEQUENCE {
    sl-ResourcePoolID-r16          SL-ResourcePoolID-r16,
    sl-ResourcePool-r16            SL-ResourcePool-r16
OPTIONAL   -- Need M
}
SL-ResourcePoolID-r16 ::=      INTEGER (1..maxNrofPoolID-r16)
-- TAG-SL-BWP-POOLCONFIG-STOP
-- ASN1STOP
``` |

SL-FreqConfig information element

```
-- ASN1START
-- TAG-SL-FREQCONFIG-START
SL-FreqConfig-r16 ::=              SEQUENCE {
    sl-Freq-Id-r16                     SL-Freq-Id-r16,
    sl-SCS-SpecificCarrierList-r16     SEQUENCE (SIZE (1..maxSCSs)) OF SCS-SpecificCarrier,
    sl-AbsoluteFrequencyPointA-r16     ARFCN-ValueNR
OPTIONAL, -- Need M
    sl-AbsoluteFrequencySSB-r16        ARFCN-ValueNR
OPTIONAL, -- Need R
    frequencyShift7p5khzSL-r16         ENUMERATED {true}
OPTIONAL, -- Cond V2X-SL-Shared
    valueN-r16                         INTEGER (-1..1),
    sl-BWP-ToReleaseList-r16           SEQUENCE (SIZE (1..maxNrofSL-BWPs-r16)) OF BWP-Id
OPTIONAL, -- Need N
    sl-BWP-ToAddModList-r16            SEQUENCE (SIZE (1..maxNrofSL-BWPs-r16)) OF SL-BWP-Config-r16
OPTIONAL, -- Need N
    sl-SyncConfigList-r16              SL-SyncConfigList-r16
OPTIONAL, -- Need M
    sl-SyncPriority-r16                ENUMERATED {gnss, gnbEnb}
OPTIONAL --Need M
}
SL-Freq-Id-r16 ::=                 INTEGER (1..maxNrofFreqSL-r16)
-- TAG-SL-FREQCONFIG-STOP
-- ASN1STOP
```

SL-FreqConfig field descriptions frequencyShift7p5khzSL
Enable the NR SL transmission with a 7.5 kHz shift to the LTE raster.
If the field is absent, the frequency shift is disabled.
sl-AbsoluteFrequencyPointA
Absolute frequency of the reference resource block (Common RB 0). Its lowest subcarrier is also known as Point A.
sl-AbsoluteFrequencySSB
Indicates the frequency location of sidelink SSB. The transmission bandwidth for sidelink SSB is within the bandwidth of this sidelink BWP.
sl-BWP-ToAddModList
This field indicates the list of sidelink BWP(s) on which the NR sidelink communication configuration is to be added or reconfigured. In this release, only one BWP is allowed to be configured for NR sidelink communication.
sl-BWP-ToReleaseList
This field indicates the list of sidelink BWP(s) on which the NR sidelink communication configuration is to be released.

-continued

SL-FreqConfig field descriptions sl-Freq-Id
This field indicates the identity of the dedicated configuration information on the carrier frequency for NR sidelink communication.
sl-SCS-SpecificCarrierList
A set of UE specific channel bandwidth and location configurations for different subcarrier spacings (numerologies). Defined in relation to Point A. The UE uses the configuration provided in this field only for the purpose of channel bandwidth and location determination. In this release, only one SCS-SpecificCarrier is allowed to be configured for NR sidelink communication.
sl-SyncPriority
This field indicates synchronization priority order, as specified in clause 5.8.6.
valueN
Indicate the NR SL transmission with a valueN *5 kHz shift to the LTE raster. (see TS 38.101-1 [15], clause 5.4E.2).

SL-ResourcePool

The IE SL-ResourcePool specifies the configuration information for NR sidelink communication resource pool.

SL-ResourcePool information element

```
-- ASN1START
-- TAG-SL-RESOURCEPOOL-START
SL-ResourcePool-r16 ::=            SEQUENCE {
    sl-PSCCH-Config-r16                SetupRelease { SL-PSCCH-Config-r16 }
OPTIONAL,   --Need M
    sl-PSCCH-Config-r16                SetupRelease { SL-PSSCH-Config-r16 }
OPTIONAL,   --Need M
    sl-PSCCH-Config-r16                SetupRelease { SL-PSFCH-Config-r16 }
OPTIONAL,   --Need M
    sl-SyncAllowed-r16                 SL-SyncAllowed-r16
OPTIONAL,   --Need M
    sl-SubchannelSize-r16              ENUMERATED {n10, n12, n15, n20, n25, n50, n75, n100}
OPTIONAL,   --Need M
    dummy                              INTEGER (10...160)
OPTIONAL,   --Need M
    sl-StartRB-Subchannel-r16          INTEGER (0...265)
OPTIONAL,   --Need M
    sl-NumSubchannel-r16               INTEGER (1...27)
OPTIONAL,   --Need M
    sl-Additional-MCS-Table-r16        ENUMERATED {qam256, qam64LowSE, qam256-gam64LowSE }
OPTIONAL,   --Need M
    sl-ThreshS-RSSI-CBR-r16            INTEGER (0...45)
```

-continued

| SL-ResourcePool information element |
| --- |

```
   OPTIONAL,   --Need M
     sl-TimeWindowSizeCBR-r16      ENUMERATED {ms100, slot100}
   OPTIONAL,   --Need M
     sl-TimeWindowSizeCR-r16       ENUMERATED {ms1000, slot1000}
   OPTIONAL,   --Need M
     sl-PTRS-Config-r16            SL-PTRS-Config-r16
   OPTIONAL,   --Need M
     sl-UE-SelectedConfigRP-r16    SL-UE-SelectedConfigRP-r16
   OPTIONAL,   --Need M
     sl-RxParametersNcell-r16      SEQUENCE {
       sl-TDD-Configuration-r16       TDD-UL-DL-ConfigCommon
   OPTIONAL,   --Need M
       sl-SyncConfigIndex-r16         INTEGER (0...15)
     }
   OPTIONAL,   --Need M
     sl-ZoneConfigMCR-List-r16     SEQUENCE (SIZE (16)) OF SL-ZoneConfigMCR-r16
   OPTIONAL,   --Need M
     sl-FilterCoefficient-r16      FilterCoefficient
   OPTIONAL,   --Need M
     sl-RB-Number-r16              INTEGER (10...275)
   OPTIONAL,   --Need M
     sl-PreemptionEnable-r16       ENUMERATED {enabled, pl1, pl2, pl3, pl4, pl5, pl6, pl7, pl8}
   OPTIONAL,   --Need R
     sl-PriorityThreshold-UL-URLLC-r16  INTEGER (1...9)
   OPTIONAL,   --Need M
     sl-PriorityThreshold-r16      INTEGER (1...9)
   OPTIONAL,   --Need M
     sl-X-Overhead-r16             ENUMERATED {n0,n3, n9}
   OPTIONAL,   --Need S
     sl-PowerControl-r16           SL-PowerControl-r16
   OPTIONAL,   --Need M
     sl-TxPercentageList-r16       SL-TxPercentageList-r16
   OPTIONAL,   --Need M
     sl-MinMaxMCS-List-r16         SL-MinMaxMCS-List-r16
   OPTIONAL,   --Need M
   ...,
   [[
   sl-TimeResource-r16             BIT STRING (SIZE (10..160))
   OPTIONAL,   --Need M
   ]],
   [[
   sl-PBPS-CPS-Config-r17          SetupRelease { SL-PBPS-CPS-Config-r17 }
   OPTIONAL,   --Need M
     sl-InterUE-CoordinationConfig-r17  SetupRelease { SL-InterUE-CoordinationConfig-r17 }
   OPTIONAL,   --Need M
   ]]
   }
SL-ZoneConfigMCR-r16 ::=          SEQUENCE {
     sl-ZoneConfigMCR-Index-r16       INTEGER (0...15),
     sl-TransRange-r16                ENUMERATED {m20, m50, m80, m100, m120, m150, m180,
m200, m220, m250, m270, m300, m350,
                                         m370, m400, m420, m450, m480, m500, m550,
m600, m700, m1000, spare9, spare8,
                                         spare7, spare6, spare5, spare4, spare3,
spare2, spare1}
   OPTIONAL,   --Need M
     sl-ZoneConfig-r16                SL-ZoneConfig-r16
   OPTIONAL,   --Need M
     ...
   }
SL-PSCCH-Config-r16 ::=           SEQUENCE {
     sl-TimeResourcePSCCH-r16         ENUMERATED {n2, n3}
   OPTIONAL,   --Need M
     sl-FreqResourcePSCCH-r16         ENUMERATED {n10,n12, n15, n20, n25}
   OPTIONAL,   --Need M
     sl-DMRS-ScrambleID-r16           INTEGER (0...65535)
   OPTIONAL,   --Need M
     sl-NumReservedBits-r16           INTEGER (2..4)
   OPTIONAL,   --Need M
     ...
   }
SL-PSSCH-Config-r16 ::=           SEQUENCE {
     sl-PSSCH-DMRS-TimePatternList-r16   SEQUENCE (SIZE (1..3)) OF INTEGER (2..4)
   OPTIONAL,   --Need M
     sl-BetaOffsets2ndSCI-r16         SEQUENCE (SIZE (4)) OF SL-BetaOffsets-r16
   OPTIONAL,   --Need M
     sl-Scaling-r16                   ENUMERATED {f0p5, f0p65, f0p8, f1}
```

| SL-ResourcePool information element |  |
|---|---|
| OPTIONAL,   --Need M<br>...<br>}<br>SL-PSFCH-Config-r16 ::=<br>  sl-PSFCH-Period-r16<br>OPTIONAL,   --Need M<br>  sl-PSFCH-RB-Set-r16<br>OPTIONAL,   --Need M<br>  sl-NumMuxCS-Pair-r16<br>OPTIONAL,   --Need M<br>  sl-MinTimeGapPSFCH-r16<br>OPTIONAL,   --Need M<br>  sl-PSFCH-HopID-r16<br>OPTIONAL,   --Need M<br>  sl-PSFCH-CandidateResourceType-r16<br>OPTIONAL,   --Need M<br>...<br>}<br>SL-UE-SelectedConfigRP-r16 ::=<br>  sl-CBR-PriorityTxConfigList-r16<br>OPTIONAL,   --Need M<br>  sl-Thres-RSRP-List-r16<br>OPTIONAL,   --Need M<br>  sl-MultiReserveResource-r16<br>OPTIONAL,   --Need M<br>  sl-MaxNumPerReserve-r16<br>OPTIONAL,   --Need M<br>  sl-SensingWindow-r16<br>OPTIONAL,   --Need M<br>  sl-SelectionWindowList-r16<br>OPTIONAL,   --Need M<br>  sl-ResourceReservePeriodList-r16<br>OPTIONAL,   --Need M<br>  sl-RS-ForSensing-r16<br>  ...,<br>  [[<br>  sl-CBR-PriorityTxConfigList-v1650<br>OPTIONAL,   --Need M<br>  ]]<br>}<br>SL-ResourceReservePeriod-r16 ::=<br>  sl-ResourceReservePeriod1-r16<br>ms600, ms700, ms800, ms900, ms1000},<br>  sl-ResourceReservePeriod2-r16<br>}<br>SL-SelectionWindowList-r16 ::=<br>SL-SelectionWindowConfig-r16 ::=<br>  sl-Priority-r16<br>  sl-SelectionWindow-r16<br>}<br>SL-TxPercentageList-r16 ::=<br>SL-TxPercentageConfig-r16 ::=<br>  sl-Priority-r16<br>  sl-TxPercentage-r16<br>}<br>}<br>-- TAG-SL-RESOURCEPOOL-STOP<br>-- ASN1STOP | <br><br><br>SEQUENCE {<br>ENUMERATED {s10, s11, s12, s14}<br><br>BIT String (SIZE (10..275))<br><br>ENUMERATED {n1, n2, n3, n6}<br><br>ENUMERATED {s12, s13}<br><br>INTEGER (0..1023)<br><br>ENUMERATED {startSubCH, allocSubCH}<br><br><br><br>SEQUENCE {<br>SL-CBR-PriorityTxConfigList-r16<br><br>SL-Thres-RSRP-List-r16<br><br>ENUMERATED {enabled}<br><br>ENUMERATED {n2, n3}<br><br>ENUMERATED {ms100, ms1100}<br><br>SL-SelectionWindowList-r16<br><br>SEQUENCE (SIZE (1..16) ) OF SL-ResourceReservePeriod-r16<br><br>ENUMERATED {pscch, pssch},<br><br><br>SL-CBR-PriorityTxConfigList-v1650<br><br><br><br>CHOICE {<br>ENUMERATED {ms0, ms100, ms200, ms300, ms400, ms500,<br><br>INTEGER (1..99)<br><br>SEQUENCE (SIZE (8)) OF SL-SelectionWindowConfig-r16<br>SEQUENCE {<br>INTEGER (1..8),<br>ENUMERATED {n1, n5, n10, n20}<br><br>SEQUENCE (SIZE (8)) OF SL-TxPercentageConfig-r16<br>SEQUENCE {<br>INTEGER (1..8),<br>ENUMERATED {p20, p35, p50} |

| SL-ResourcePool field descriptions |
|---|
| dummy<br>This field is not used in the specification. If received it shall be ignored by the UE.<br>sl-Additional-MCS-Table<br>Indicates the MCS table(s) additionally used in the resource pool. 64QAM table is (pre-)configured as default. Zero, one or two can be additionally (pre-)configured using the 256QAM and/or low-SE MCS tables. If two MCS tables are indicated, 256QAM MCS table is the 1$^{st}$ table and qam64lowSE MCS table is the 2$^{nd}$ table as specified in TS 38.214 [19], clause 8.1.3.1.<br>sl-FilterCoefficient<br>This field indicates the filtering coefficient for long-term measurement and reference signal power derivation used for sidelink open-loop power control.<br>sl-InterUE-CoordinationConfig<br>Indicates the configured sidelink inter-UE coordination parameters.<br>sl-NumSubchannel<br>Indicates the number of subchannels in the corresponding resource pool, which consists of contiguous PRBs only.<br>sl-PBPS-CPS-Config<br>Indicates configuration information for the operation of full sensing only, partial sensing only, random resource selection only, or any combination(s) configured.<br>sl-PreemptionEnable<br>Indicates whether pre-emption is disabled or enabled in a resource |

SL-ResourcePool field descriptions pool. If the field is present and the value is pl1, pl2, and so on (but not enabled), it means that pre-emption is enabled and a priority level p_preemption is configured. If the field is present and the value is enabled, the pre-emption is enabled (but p_preemption is not configured) and pre-emption is applicable to all levels.
sl-PriorityThreshold-UL-URLLC
Indicates the threshold used to determine whether NR sidelink transmission is prioritized over uplink transmission of priority index 1 as specified in TS 38.213[13], clause 16.2.4.3, or whether PUCCH transmission carrying SL HARQ is prioritized over PUCCH transmission carrying UCI of priority index 1 if they overlap in time as specified in TS 38.213 [13], clause 9.2.5.0.
sl-PriorityThreshold
Indicates the threshold used to determine whether NR sidelink transmission is prioritized over uplink transmission of priority index 0 as specified in TS 38.213[13], clause 16.2.4.3, or whether PUCCH transmission carrying SL HARQ is prioritized over PUCCH transmission carrying UCI of priority index 0 if they overlap in time as specified in TS 38.213 [13], clause 9.2.5.0.
sl-RB-Number
Indicates the number of PRBs in the corresponding resource pool, which consists of contiguous PRBs only. The remaining RB cannot be used (See TS 38.214[19], clause 8).
sl-StartRB-Subchannel
Indicates the lowest RB index of the subchannel with the lowest index in the resource pool with respect to the lowest RB index of a SL BWP.
sl-SubchannelSize
Indicates the minimum granularity in frequency domain for the sensing for PSSCH resource selection in the unit of PRB.
sl-SyncAllowed
Indicates the allowed synchronization reference(s) which is (are) allowed to use the configured resource pool.
sl-SyncConfigIndex
Indicates the synchronisation configuration that is associated with a reception pool, by means of an index to the corresponding entry SL-SyncConfigList of in SIB12 for NR sidelink communication.
sl-TDD-Configuration
Indicates the TDD configuration associated with the reception pool of the cell indicated by sl-SyncConfigIndex.
sl-ThreshS-RSSI-CBR
Indicates the S-RSSI threshold for determining the contribution of a sub-channel to the CBR measurement. Value 0 corresponds to −112 dBm, value 1 to −110 dBm, value n to (−112 + n*2) dBm, and so on.
sl-TimeResource
Indicates the bitmap of the resource pool, which is defined by repeating the bitmap with a periodicity during a SFN or DFN cycle.
sl-TimeWindowSizeCBR
Indicates the time window size for CBR measurement.
sl-TimeWindowSizeCR
Indicates the time window size for CR evaluation.
sl-TxPercentageList
Indicates the portion of candidate single-slot PSSCH resources over the total resources. Value p20 corresponds to 20%, and so on.
sl-X-Overhead
Accounts for overhead from CSI-RS, PT-RS. If the field is absent, the UE applies value n0 (see TS 38.214 [19], clause 5.1.3.2).

SL-PSCCH-Config field descriptions sl-FreqResourcePSCCH
Indicates the number of PRBs for PSCCH in a resource pool where it is not greater than the number PRBs of the subchannel.
sl-DMRS-ScrambleID
Indicates the initialization value for PSCCH DMRS scrambling.
sl-NumReservedBits
Indicates the number of reserved bits in first stage SCI.
sl-TimeResourcePSCCH
Indicates the number of symbols of PSCCH in a resource pool.

SL-PSSCH-Config field descriptions sl-BetaOffsets2ndSCI
Indicates candidates of beta-offset values to determine the number of coded modulation symbols for second stage SCI. The value indicates the index of Table 9.3-2 of TS 38.213 [13].
sl-PSSCH-DMRS-TimePatternList
Indicates the set of PSSCH DMRS time domain patterns in terms of PSSCH DMRS symbols in a slot that can be used in the resource pool.
sl-Scaling
Indicates a scaling factor to limit the number of resource elements assigned to the second stage SCI on PSSCH. Value f0p5 corresponds to 0.5, value f0p65 corresponds to 0.65, and so on.

SL-PSFCH-Config field descriptions sl-MinTimeGapPSFCH
The minimum time gap between PSFCH and the associated PSSCH in the unit of slots.
sl-NumMuxCS-Pair
Indicates the number of cyclic shift pairs used for a PSFCH transmission that can be multiplexed in a PRB.
sl-PSFCH-CandidateResourceType
Indicates the number of PSFCH resources available for multiplexing HARQ-ACK information in a PSFCH transmission (see TS 38.213 [13], clause 16.3).
sl-PSFCH-HopID
Scrambling ID for sequence hopping of the PSFCH used in the resource pool.
sl-PSFCH-Period
Indicates the period of PSFCH resource in the unit of slots within this resource pool. If set to sl0, no resource for PSFCH, and HARQ feedback for all transmissions in the resource pool is disabled.
sl-PSFCH-RB-Set
Indicates the set of PRBs that are actually used for PSFCH transmission and reception. The leftmost bit of the bitmap refers to the lowest RB index in the resource pool, and so on. Value 0 in the bitmap indicates that the corresponding PRB is not used for PSFCH transmission and reception while value 1 indicates that the corresponding PRB is used for PSFCH transmission and reception (see TS 38.213 [13]).

SL-UE-SelectedConfigRP field descriptions sl-CBR-PriorityTxConfigList
Indicates the mapping between PSSCH transmission parameter (such as MCS, PRB number, retransmission number, CR limit) sets by using the indexes of the configurations in sl-CBR-PSSCH-TxConfigList, CBR ranges by using the indexes to the entry of the CBR range configurations in sl-CBR-RangeConfigList, and priority ranges. It also indicates the default PSSCH transmission parameters to be used when CBR measurement results are not available, and MCS range for the MCS tables used in the resource pool. The field sl-CBR-PriorityTxConfigList-v1650 is present only when sl-CBR-PriorityTxConfigList-r16 is configured.
sl-MaxNumPerReserve
Indicates the maximum number of reserved PSCCH/PSSCH resources that can be indicated by an SCI.
sl-MultiReserveResource
Indicates if it is allowed to reserve a sidelink resource for an initial transmission of a TB by an SCI associated with a different TB, based on sensing and resource selection procedure.
sl-ResourceReservePeriodList
Set of possible resource reservation period allowed in the resource pool in the unit of ms. Up to 16 values can be configured per resource pool. The value ms0 is always configured.
sl-RS-ForSensing
Indicates whether DMRS of PSCCH or PSSCH is used for L1 RSRP measurement in the sensing operation.
sl-SensingWindow
Parameter that indicates the start of the sensing window.
sl-SelectionWindowList
Parameter that determines the end of the selection window in the -continued

| SL-UE-SelectedConfigRP field descriptions |
|---|
| resource selection for a TB with respect to priority indicated in SCI. Value n1 corresponds to $1*2^\mu$, value n5 corresponds to $5*2^\mu$, and so on, where $\mu = 0, 1, 2, 3$ refers to SCS 15, 30, 60, 120 kHz respectively.<br>sl-Thres-RSRP-List<br>Indicates a list of 64 thresholds, and the threshold should be selected based on the priority in the decoded SCI and the priority in the SCI to be transmitted. A resource is excluded if it is indicated or reserved by a decoded SCI and PSSCH/PCCH RSRP in the associated data resource is above a threshold. |

In [6] RP-222806, justification and objectives are quoted below.

Justification

In Rel-16, sidelink communication was developed in RAN mainly to support advanced V2X applications. In Rel-17, SA2 studied and standardized Proximity based service including public safety and commercial related service. As part of Rel-17, power saving solutions (e.g., partial sensing, DRX) and inter-UE coordination have been developed in RAN1 and RAN2 to improve power consumption for battery limited terminals and reliability of sidelink transmissions.

Although NR sidelink was initially developed for V2X applications, there is growing interest in the industry to expand the applicability of NR sidelink to commercial use cases. For commercial sidelink applications, two key requirements have been identified:

Increased sidelink data rate

Support of new carrier frequencies for sidelink

Increased sidelink data rate is motivated by applications such as sensor information (video) sharing between vehicles with high degree of driving automation. Commercial use cases could require data rates in excess of what is possible in Rel-17. Increased data rate can be achieved with the support of sidelink carrier aggregation and sidelink over unlicensed spectrum. Furthermore, by enhancing the FR2 sidelink operation, increased data rate can be more efficiently supported on FR2. While the support of new carrier frequencies and larger bandwidths would also allow to improve its data rate, the main benefit would come from making sidelink more applicable for a wider range of applications. More specifically, with the support of unlicensed spectrum and the enhancement in FR2, sidelink will be in a better position to be implemented in commercial devices since utilization of the ITS band is limited to ITS safety related applications.

Another aspect to consider is the V2X deployment scenario where both LTE V2X and NR V2X devices are to coexist in the same frequency channel. For the two different types of devices to coexist while using a common carrier frequency, it is important that there is mechanism to efficiently utilize resource allocation by the two technologies without negatively impacting the operation of each technology. This requirement was also mentioned as part of the input from 5G Automotive Association to the Rel-18 RAN Workshop.

4 Objective 4.1 Objective of SI or Core Part WI or Testing Part WI

To check in RAN #97 for objectives 1 and 3, taking into account the progress on objectives 2 and 4, aiming to have specification work for both objective 1 and 3.

. . .

1. Study and specify support of sidelink on unlicensed spectrum for both mode 1 and mode 2 where Uu operation for mode 1 is limited to licensed spectrum only [RAN1, RAN2, RAN4]

Channel access mechanisms from NR-U shall be reused for sidelink unlicensed operation Assess the applicability of sidelink resource reservation from Rel-16/Rel-17 to sidelink unlicensed operation within the boundaries of unlicensed channel access mechanism and operation No specific enhancements for Rel-17 resource allocation mechanisms If the existing NR-U channel access framework does not support the required SL-U functionality, WGs will make appropriate recommendations for RAN approval.

Physical channel design framework: Required changes to NR sidelink physical channel structures and procedures to operate on unlicensed spectrum The existing NR sidelink and NR-U channel structure shall be reused as the baseline.

No specific enhancements for existing NR SL feature

The study should focus on FR1 unlicensed bands (n46 and n96/n102) and is to be completed by RAN #98.

In New Radio (NR) Rel-16, it is a first release for NR sidelink Vehicle-to-Everything (V2X), and the current standard has already met the requirement as defined in SA1. Considering the upcoming future, with more and more devices requiring higher throughput and higher data rates, sidelink transmission on wider frequency resources may be desired. However, current band supporting PC5 interface or sidelink transmission may not be enough. Thus, introduction of sidelink transmission on unlicensed/shared spectrum with large spectrum availability may be one targeted solution. In order to have fair coexistence with other devices in same or different Radio Access Technology (RAT) or different techniques (e.g., WiFi) in unlicensed spectrum, Listen-Before-Talk (LBT) may be required. LBT is one energy detection or sensing technique, according to LBT result (which is idle or busy) before transmission, a device could determine whether the transmission is allowed. There is a short introduction of New Radio-Unlicensed for Uu interface in [2]R1-2308756 and [3]R1-2308720. LBT could briefly separate into short LBT (e.g., CAT1-LBT, and CAT2-LBT) and long LBT (e.g., CAT4-LBT). For short LBT, a device may be allowed to perform transmission without LBT or performing a relatively short LBT; while for long LBT, a device may need to perform transmission with LBT with a relatively longer time (e.g., with more sensing slots being idle and preferably with back off). Long LBT corresponds to type-1 channel access procedure in TS 37.213, and short LBT corresponds to type-2/2A/2B/2C channel access procedure in TS 37.213. While for sidelink reception, continuously monitoring or receiving or detecting sidelink resources may be one assumption in sidelink device.

In NR Rel-16, for resource allocation mode-1 in NR sidelink V2X (e.g., network scheduling mode), Transmission (TX) User Equipment (UE) may receive one sidelink grant from a network node and the sidelink grant may schedule one, two, or three sidelink resource(s) in a sidelink resource pool. The sidelink grant may indicate one Physical Uplink Control Channel (PUCCH) resource (in response to whether TX UE needs another sidelink resource(s)). The sidelink grant indicates the one PUCCH resource by at least indicating a slot offset with respect to slot of a Physical Sidelink Feedback Channel (PSFCH) time location (e.g., indicating PUCCH is in which slot). The sidelink grant indicates the one PUCCH resource by at least a PUCCH resource indicator (e.g., within the slot, indicating which PUCCH resource). The PUCCH resource indicator would indicate one PUCCH resource in each set of PUCCH resources in the slot. The slot of the PUCCH resource is based on the slot offset and slot of a PSFCH, wherein the PSFCH is associated with the last scheduled sidelink resource(s). The size of Hybrid Automatic Repeat Request (HARQ) information associated with sidelink may impact on the UE determining which set of PUCCH resources in the slot is being used. The one PUCCH resource is later than the last PSFCH time location associated with the last scheduled resources among the one, two, or three scheduled sidelink resource(s). In addition, HARQ information associated with sidelink may associate with one sub-codebook and HARQ information associated with downlink assignment may associate with another sub-codebook. HARQ information associated with downlink assignment could be HARQ information in response to PDSCH (including Semi-Persistent Scheduling (SPS) PDSCH), SPS release (i.e., Physical Downlink Control Channel (PDCCH) only indicating SPS release), beam indicating DCI without downlink assignment (i.e., PDCCH only indicating beam indication), dormancy without downlink assignment (i.e., PDCCH only indicating dormancy). PUCCH carrying/delivering the one sub-codebook and PUCCH carrying/delivering the another sub-codebook shall be different PUCCH resources. Different PUCCH resources may be in time domain division. Different PUCCH resources may be two different PUCCHs in different slots or in different symbols. The UE does not multiplex the one sub-codebook and the another sub-codebook into one PUCCH resource. The TX UE performs sidelink transmission via the scheduled sidelink resource(s) to one or more Reception (RX) UE(s). The TX UE may set Sidelink (SL) HARQ enabled or not enabled (disabled) for the sidelink transmission. The one, two, or three scheduled sidelink resource(s) are associated with a same Transport Block (TB)/Medium Access Control (MAC) Packet Data Unit (PDU) or different TBs/MAC PDUs. The one, two, or three scheduled sidelink resource(s) may be in consecutive (physical) slots or in consecutive (sidelink) slots in the sidelink resource pool.

Figure 5:
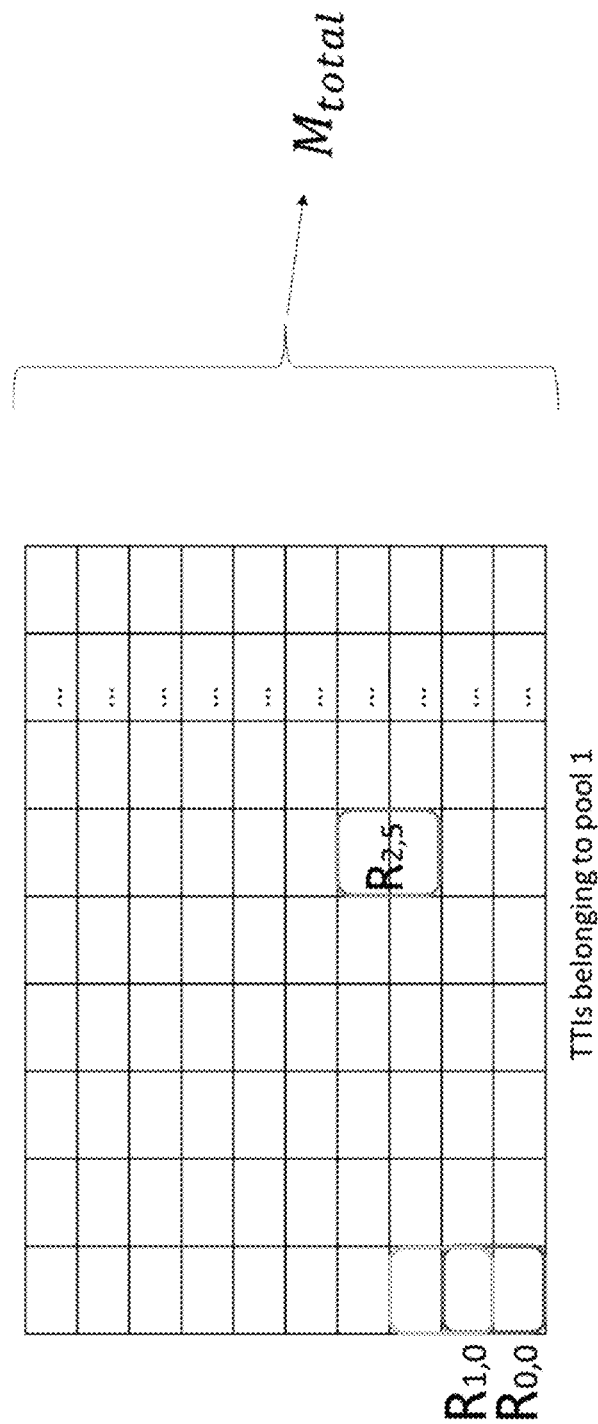
FIG. 5 is an example diagram, wherein assuming higher layer of the TX UE indicates 2 sub-channels as one candidate resource, the TX UE determines M total candidate resource in sidelink resource pool 1, in accordance with embodiments of the present invention.

In NR Rel-16, for resource allocation mode-2 in NR sidelink V2X (e.g., autonomous selection mode), the TX UE performs full/partial sensing in a sidelink resource pool, and determines one or more sidelink resources based on one or more sensing results. The sensing here is different than the channel access procedure defined in unlicensed spectrum. The sensing means or corresponds that the TX UE determines whether a candidate resource is occupied based on Sidelink Control Information (SCI) indication and/or Reference Signal Received Power (RSRP) measurement. In one example, in FIG. 5, assuming higher layer of the TX UE indicates 2 sub-channels as one candidate resource, the TX UE determines M total candidate resource in sidelink resource pool 1, wherein one candidate resource corresponds to one Transmission Time Interval (TTI) and 2 sub-channels. One candidate resource is denoted as $R_{x,y}$, wherein x corresponds to a starting sub-channel index and y corresponds to a TTI index.

For NR rel-18, people are trying to improve throughput of sidelink for supporting higher data rate service. A possible direction is to apply carrier aggregation, apply FR2 carrier which has a larger bandwidth, and/or apply sidelink communication on unlicensed spectrum. One general assumption for sidelink communication on unlicensed spectrum is the PC5 interface (i.e., an interface between UE and UE) is on unlicensed spectrum and the Uu interface (i.e., an interface between a UE and a network node) is on licensed spectrum. With an aspect of uncertainty of LBT failure for each channel/signal on unlicensed spectrum, increasing transmission occasions/opportunities are considered. For example, there may be benefits to increasing time opportunities of Physical Sidelink Control Channel (PSCCH)/Physical Sidelink Shared Channel (PSSCH). In previous releases, time domain unit for sidelink transmission is one TTI/slot/subframe and there is only one starting symbol position (which may be configured in an SL Bandwidth Part (BWP) configuration, e.g., configured via sl-StartSymbol in SL-BWP-Config) in each TTI/slot/subframe. However, with introduction of sidelink using unlicensed spectrum, it may be less competitive for the TX UE with only one starting symbol. Once the TX UE cannot pass LBT for initiating Channel Occupancy Time (COT) for a legacy starting symbol, the TX UE needs to perform LBT for the next slot which may cause unnecessary latency (especially when other/another RAT merely occupies a number of starting symbols in the TX UE's LBT failed slot/TTI). More than one (candidate) starting symbol in a sidelink slot could leverage sidelink transmission on unlicensed spectrum. Once the TX UE fails to pass LBT for the first (candidate) starting symbol but could pass LBT for the next (candidate) starting symbol, the TX UE could still perform sidelink transmission in the slot. One assumption is that a same sidelink resource pool could be (pre-)configured with the one or more (candidate) starting symbols in a slot. An alternative assumption is that the one or more (candidate) starting symbols could be (pre-)configured in a different sidelink resource pool, which the two different sidelink resource pools at least comprise one same slot (preferably in a same or different sub-channel and/or carrier/SL BWP). No matter which assumption is used, there are at least two (candidate) starting symbol position(s) denoted as #x and #y, wherein #x is earlier than #y (e.g., x is smaller than y), and #x is #0~#13, #y is #0~#13. In one embodiment/concept, for a sidelink resource pool, the second (candidate) starting symbol position may be derived/determined based on the first (candidate) starting symbol position and a number of PSCCH symbols configured in the sidelink resource pool (e.g., 2 or 3 symbols based on the configured parameter sl-TimeResourcePSCCH in the sidelink resource pool configuration). Preferably in certain embodiments, y=x+number of PSCCH symbols. Alternatively, y=x+1+number of PSCCH symbols. For instance, when the first (candidate) starting symbol position is symbol #x and 2 PSCCH symbols are configured/utilized, the second (candidate) starting symbol position may be derived/determined as symbol #(x+2) or #(x+2+1). For instance, when the first (candidate) starting symbol position is symbol #x and 3 PSCCH symbols are configured/utilized, the second (candidate) starting symbol position may be derived/determined as symbol #(x+3) or #(x+3+1).

Preferably in certain embodiments, before transmitting in unlicensed spectrum, the TX UE performs LBT for energy detection. Preferably in certain embodiments, LBT corresponds to a channel access procedure defined in unlicensed spectrum. Preferably in certain embodiments, frequency granularity of LBT in FR1 would be 20 MHz which could be denoted as LBT band or LBT unit or Resource Block (RB) set (in frequency domain). Preferably in certain embodiments, a carrier or SL BWP or a SL resource pool could comprise one or more LBT bands. Preferably in certain embodiments, interlace structure may be used for meeting Occupied Channel Bandwidth (OCB) and Power Spectral Density (PSD) requirement specified in unlicensed spectrum. Preferably in certain embodiments, equal space within one interlace or equal Physical Resource Block (PRB) number between two adjacent PRBs within one interlace is preferred. Preferably in certain embodiments, for two adjacent interlaces, it could be a PRB domain offset between each other. For example, interlace #0 would occupy PRB #0, #10, #20, . . . #90 and interlace #1 would occupy PRB #1, #11, #21, . . . #91. Preferably in certain embodiments, such interlace structure is feasible to meet the requirement in unlicensed spectrum for one LBT band.

When it comes to sidelink transmission in unlicensed spectrum, the concept of COT sharing may be considered since a responding UE, receiving COT sharing information from another UE (e.g., COT initiating UE), could perform type-2A/2B/2C channel access instead of performing type-1 channel access. Based on the time gap, if the RX UE could determine it, between timing associated with receiving COT sharing information and timing associated with sidelink transmission performed by the responding UE, type-2A, type-2B, or type-2C channel access could be determined. With type-2 series channel access, a sensing duration (which is performed before the responding UE's sidelink transmission) is rather less than type-1 channel access. Based on COT sharing information, at least one of the following information could be determined: Channel Access Priority Class (CAPC) (used by initiating UE for a COT), remaining COT duration, RB set (which could be indicated by a frequency field associated with a Frequency Resource Indicator Value (FRIV) for RB set).

Due to different power class between different nodes, when a COT initiating UE performs a type-1 channel access procedure, an energy detection threshold is determined based on a (pre-)configured Energy Detection Threshold (EDT) value (e.g., ue-toUE-COT-SharingED-Threshold). Such a (pre-)configured value may be (pre-)configured per sidelink resource pool. Based a COT initiating UE uses the (pre-)configured EDT value for performing a type-1 channel access procedure, channel is idle under such a (pre-)configured EDT value if the COT initiating UE has performed successful channel access. In other words, even when different nodes being associated with different power classes (with different transmit power), COT sharing is available and will not cause an unfair issue to the other/another RAT (e.g., Wi-Fi). However, there may be one issue when such a (pre-)configured value is configured per sidelink resource pool.

In one example, an SL BWP in a carrier may be configured with more than one sidelink resource pool comprising at least a first sidelink resource pool and a second sidelink resource pool. Each of the more than one sidelink resource pools comprises an integer number of RB sets (being included in the SL BWP). Typically, different sidelink resource pools can be configured with different characteristics, for example, different number of time and frequency resources, different reservation period set, and/or different (pre-)configured EDT. Besides, in order to avoid inter-UE blocking issues from the pool aspect, a whole RB set in one TTI shall be associated with only one sidelink resource pool. In other words, there is no case that the first sidelink resource pool comprises a subset of one RB set and the second sidelink resource pool comprises another subset of the one RB set in one TTI. However, configuration of the first sidelink resource pool and the second sidelink resource pool may cause Time Division Multiplexing (TDM) between the first sidelink resource pool and the second sidelink resource pool which may exist a switching boundary between the first sidelink resource pool and the second sidelink resource pool.

Figure 6:
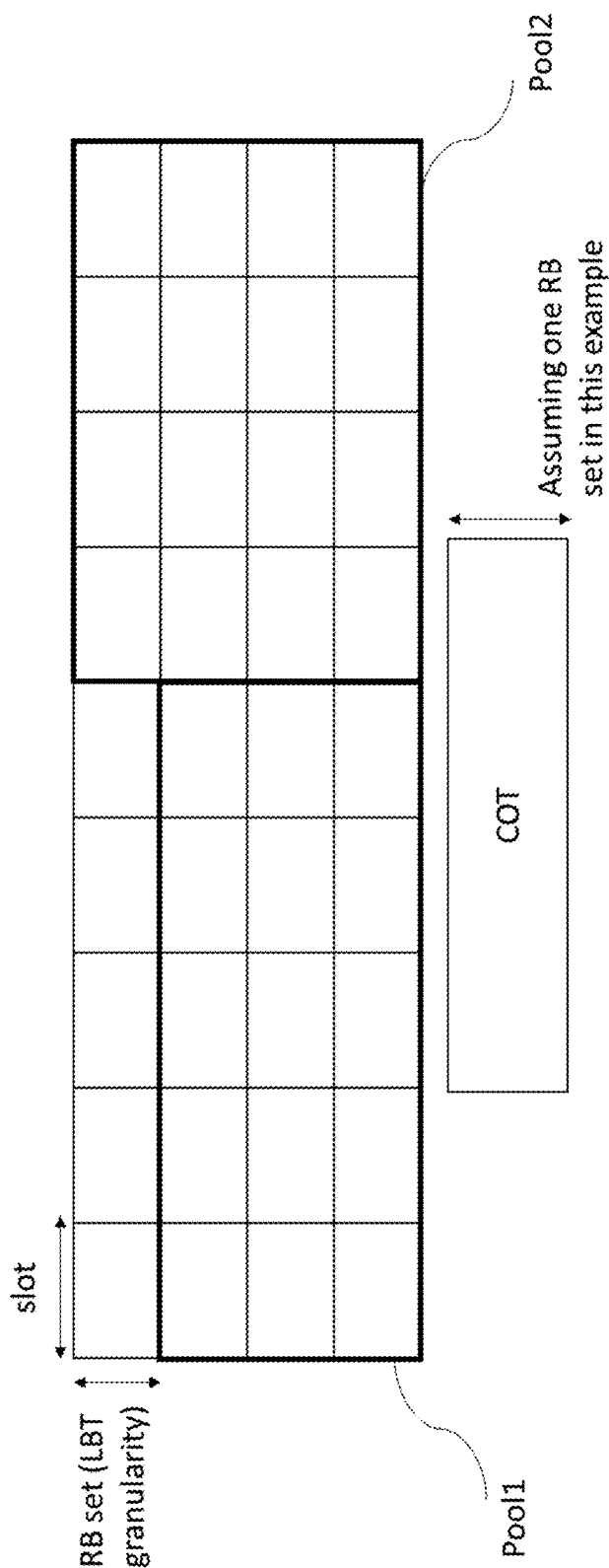
FIG. 6 is an example diagram showing the switching boundary is at the end of the 5-th slot, in accordance with embodiments of the present invention.

For example, in FIG. 6, the switching boundary is at the end of the 5-th slot. For Multi-Consecutive Slots transmission (MCSt) used by a COT initiator UE, the COT initiating UE seems to allow to continuously use the COT till the maximum COT value associated with Channel Access Priority Class (CAPC). Customer Premise Equipment (CPE) and transmit power for sidelink transmission in pool2 in the 6-th slot seems to be fine for the COT initiating UE to perform. On the other hand, for COT sharing, there may be issue for COT sharing for CPE and transmit power for sidelink transmission in pool2 in the 6-th slot. Due to different characteristics of two sidelink resource pools, transmit power used by the responding UE on the 6-th slot may cause interference to a surrounding node or a surrounding other RAT. The responding UE may also have issue with whether to determine CPE before the 6-th slot based on the CPE associated with being outside the COT or CPE associated with being inside the COT. Based on the above, it is necessary to design a method solving this issue.

Figure 7:
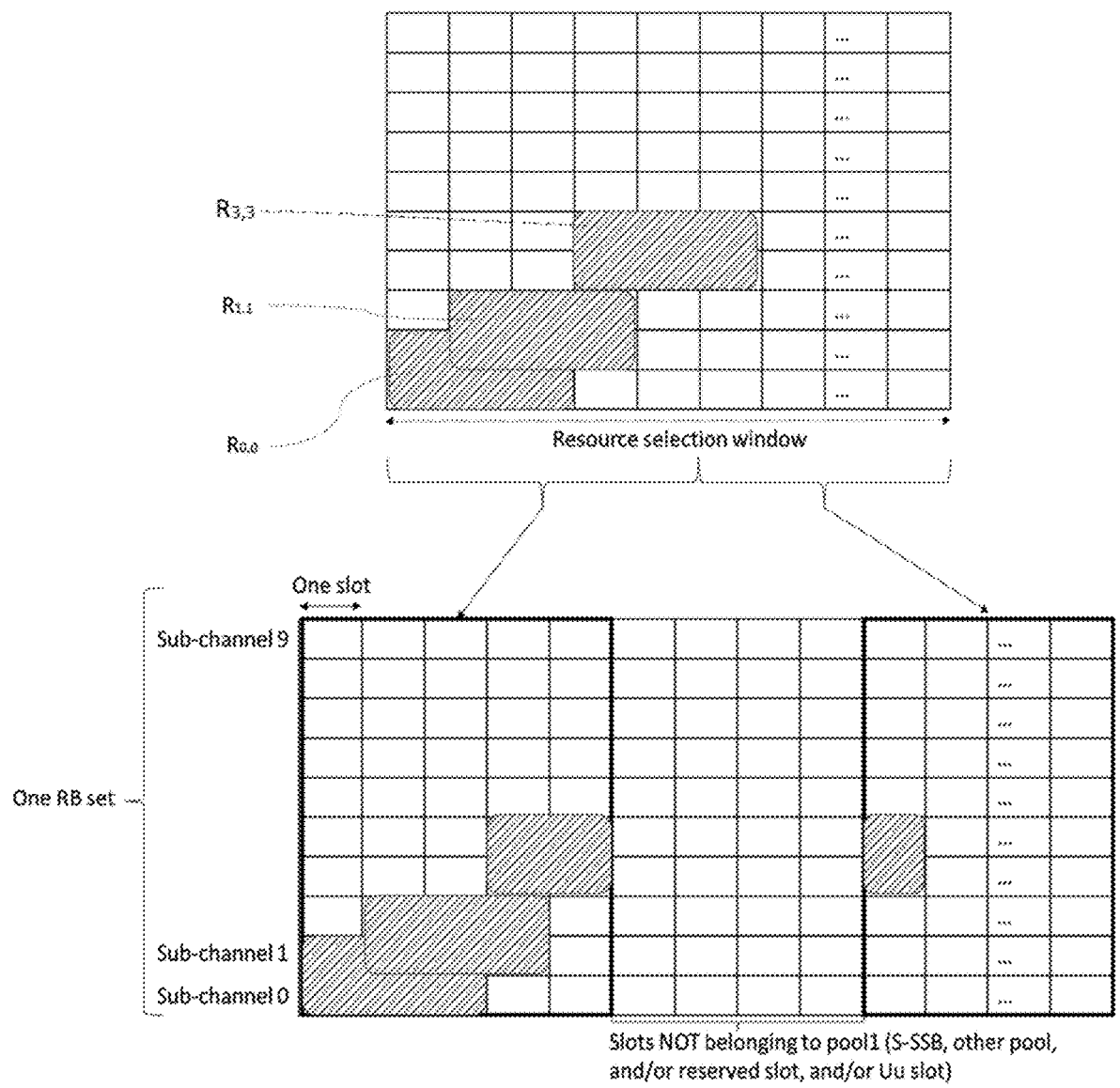
FIG. 7 is an example diagram showing the higher layer of the UE provides information for resource identification as "1 RB set, 2 sub-channels, 3 slots", in accordance with embodiments of the present invention.

A second issue is related to MCSt. When a higher layer of a UE provides a parameter (when triggering a resource identification and/or selection procedure for a sidelink resource pool), the parameter would indicate what a candidate (multi-TTI) resource looks like. For example, when the parameter indicates 3 consecutive TTIs, the candidate (multi-TTI) resource is defined as a bundle of 3 consecutive TTIs. However, since a resource selection window may comprise some TTIs without being included in the sidelink resource pool for resource identification and/or selection or any two consecutive TTIs in a resource selection window may be not physically consecutive in time domain, a definition of a candidate (multi-TTI) resource under logical TTI/slot may need to be designed and updated. For example, in FIG. 7, the higher layer of the UE provides information for resource identification as "1 RB set, 2 sub-channels, 3 slots". Assuming there are X logical TTIs, e.g., logical TTIs with index 0~(X−1), within a resource selection window (i.e., there are X logical TTIs in the sidelink resource pool for resource identification and/or selection). Based on the above, there are (X−2)(10−1) candidate (multi-TTI) resources within the resource selection window. One candidate (multi-TTI) resource could be denoted as $R_{x,y}$, wherein x corresponds to the starting sub-channel index and y corresponds to the starting TTI index. However, there may be some problems for $R_{x,3}R_{x,4}$. due to actual system that may comprise some (physical) TTIs not belonging to the sidelink resource pool for resource identification and selection. Since indexing/ordering of logical TTIs for the sidelink resource pool only considers physical TTIs comprised/covered in the sidelink resource pool. As the example in FIG. 7, if logical TTI 4 for the sidelink resource pool corresponds to a physical TTI t, logical TTI 5 for the sidelink resource pool corresponds to a physical TTI (t+5). The candidate resource $R_{x,3}$ $R_{x,4}$, may somehow deviate from motivation of introducing MCSt or the concept of one bundle. Using resource $R_{x,3}$ $R_{x,4}$, may result in the UE performing an additional type-1 channel access procedure since the COT for previous TTIs cannot extend or cover the whole TTIs in the candidate (multi-TTI) resource. Thus, how the UE determines candidate (multi-TTI) resource for a bundle may need further design. The some (physical) TTIs may be used for other sidelink resource pools or Sidelink Synchronization Signal Block (S-SSB) or reserved TTI, and/or Uu TTI (e.g., Downlink (DL)/Uplink (UL)/flexible TTI).

One thought is to design whether to have cross-pool COT sharing and/or cross-pool MCSt. It is quick thinking that S-SSB slots are excluded from sidelink resource pool in time domain, however the S-SSB transmission is eligible to use shared COT. It seems reasonable to have cross-pool COT sharing. Although supporting cross-pool COT sharing is beneficial, difficulty to task, another direction is to merely support cross-pool MCSt (not supporting cross-pool COT sharing). In other words, EDT for checking whether the channel is clear is performed from a single UE perspective, and thus allowing cross-pool MCSt seems feasible. Typically, since the COT initiating UE may not predict the exact time for having a successful type-1 channel access procedure, it may be somehow hard for the COT initiating UE to determine whether the COT covers cross-pool case. In the last, CPE and transmit power may be further discussed if cross-pool COT sharing is indeed supported.

A first concept is that when a first UE initiates a COT comprising TTIs associated with more than one sidelink resource pool and/or associated with S-SSB in one sidelink BWP in one RB set (here is exampled as one RB set, but not limited to one RB set), the first UE determines EDT among one of the more than one sidelink resource pools and/or S-SSB. More specifically, the EDT is determined based on lowest or highest value among EDTs (pre-)configured on configuration of the more than one sidelink resource pool (or EDTs (pre-configured) for the more than one sidelink resource pool) and/or (pre-)configured on configuration of S-SSB (or EDT (pre-configured) for S-SSB). Preferably in certain embodiments, one motivation is to apply a larger value to guarantee the responding UE using shared COT cross sidelink resource pools (and/or S-SSB) with different EDTs is still under regulation. Preferably in certain embodiments, the (pre-)configured value is or corresponds to ue-toUE-COT-SharingED-Threshold. Preferably in certain embodiments, the first UE determines EDT among one of the more than one sidelink resource pools and/or S-SSB when the first UE determines to share COT. Preferably in certain embodiments, the first UE determines EDT based on sidelink resource being within which sidelink resource pool when the first UE determines to share a COT without comprising TTI associated with a different sidelink resource pool. Preferably in certain embodiments, once the first UE determines to NOT share COT, the first UE does not (need to) use the (pre-)configured value to determine EDT. (When there is no (pre-)configured EDT for S-SSB), a second UE which is eligible for using the shared COT would determine whether its maximum transmit power for S-SSB is under EDT associated with one sidelink resource pool where the second UE receives SCI with COT sharing information from the first UE. Alternatively, (When there is no (pre-)configured EDT for S-SSB), a second UE which is eligible for using a shared COT would determine a second maximum transmit power (which is used for bounding sidelink transmission of S-SSB is under EDT which the first UE used to initiate a COT). Alternatively, no matter whether there is EDT (pre-)configured for S-SSB, the COT initiating UE's COT sharing could comprise TTI for S-SSB transmission by the responding UE. Alternatively, one restriction for EDT for S-SSB is that EDT for S-SSB is smaller than EDT for all sidelink resource pools in an SL BWP. In this way, the responding UE could use shared COT to transmit S-SSB (without further considering power control constraint). Alternatively, one restriction for EDT for S-SSB is that EDT for S-SSB is smaller than EDT for a subset of sidelink resource pools in an SL BWP. The subset of sidelink resource pools comprises one or more TTIs being consecutive and earlier than TTI for S-SSB. When a first sidelink resource pool comprises a TTI being earlier than and consecutive to TTI i+1 for S-SSB, EDT associated with S-SSB is (pre-)configured to be smaller than EDT associated with the first sidelink resource pool. When a second sidelink resource pool does not comprise TTI being earlier than and consecutive to TTI for S-SSB, there is no restriction for EDT associated with S-SSB being smaller than EDT associated with the second sidelink resource pool. In one alternative, S-SSB and one or more sidelink resource pools in the same SL BWP shares the same EDT. Preferably in certain embodiments, EDT configuration could be per S-SSB and/or per pool but with constraint to being associated with the same EDT.

Preferably in certain embodiments, for a SL BWP or a sidelink resource pool comprising a single RB set (or without being configured with a gap between RB sets),
  one restriction for EDT for S-SSB is that EDT for S-SSB is smaller than EDT for all sidelink resource pools in an SL BWP, and/or
  one restriction for EDT for S-SSB is that EDT for S-SSB is smaller than EDT for a subset of sidelink resource pools in an SL BWP. The subset of sidelink resource pools comprises one or more TTIs being consecutive and earlier than TTI for S-SSB, and/or
  S-SSB and one or more sidelink resource pools in the same SL BWP shares the same EDT.

A second concept is that when a first UE initiates a COT comprising TTIs associated with more than one sidelink resource pool in one sidelink BWP in one RB set (here exampled as one RB set, but not limited to one RB set) and the first UE (has already) determines EDT based on a sidelink resource pool comprising earlier TTIs in the COT, whether the first UE sharing the COT on the later TTIs in another sidelink resource pool is based on whether the determined EDT is lower or higher than a (pre-)configured value associated with the another sidelink resource pool. When EDT used/determined for channel access to initiate a COT is larger than a (pre-)configured value associated with another sidelink resource pool in later TTI(s) in the COT, the first UE is allowed to or the first UE shares the COT to other UE(s), wherein the shared COT could comprise TTI associated with the another sidelink resource pool. When EDT used/determined for channel access to initiate a COT is smaller than a (pre-)configured value associated with another sidelink resource pool in later TTI(s) in the COT, the first UE is NOT allowed to or the first UE does not share the COT to other UE(s). More specifically, the first UE is NOT allowed to or the first UE does not share later TTI(s) in another sidelink resource pool in the COT to other UE(s). In other words, the first UE could share earlier TTI(s) in original sidelink resource pool in the COT to other UE(s). A brief summary for this concept is that the first UE determines whether to share COT or indicate (shared COT on another pool in the same RB set) based on whether EDT for the type-1 channel access procedure to initiate a COT is larger than EDT for COT sharing (pre-)configured for the another sidelink resource pool. Typically, due to uncertain timing of the clear type-1 channel access procedure, the first UE has already decided to clear channel based on one EDT while starting timing of the COT comprising TTI, in a same RB set, associated with another sidelink resource pool.

Preferably in certain embodiments, for an SL BWP or a sidelink resource pool comprising a single RB set (or without being configured with a gap between RB sets),
  whether the first UE sharing the COT on later TTIs for transmitting S-SSB is based on whether the determined EDT is lower or higher than the (pre-)configured value associated with the S-SSB, and/or when EDT used/determined for channel access to initiate a COT is larger than a (pre-)configured value associated with S-SSB in later TTI(s) in the COT, the first UE is allowed to or the first UE shares the COT to other UE(s), wherein the shared COT could comprise a TTI associated with the S-SSB. When EDT used/determined for channel access to initiate a COT is smaller than a (pre-)configured value associated with S-SSB in later TTI(s) in the COT, the first UE is NOT allowed to or the first UE does not share the COT to other UE(s). Preferably in certain embodiments, when a second UE attempts to transmit S-SSB, If the first UE does not share COT comprising TTI associated with the S-SSB, the second UE performs a type-1 channel access procedure for acquiring a COT for transmitting S-SSB or the second UE performs a type-2A channel access procedure for transmitting S-SSB (consider/determine S-SSB as short control signaling) or directly transmits S-SSB without performing a channel access procedure (consider/determine S-SSB as an LBT exemption), and/or If the first UE shares COT comprising TTI associated with the S-SSB, the second UE performs a type-2A/2B/2C channel access procedure to use the shared COT for transmitting S-SSB and preferably whether using type-2A/2B/2C is based on a time gap between (earliest) TTI for transmitting S-SSB (in the shared COT) and TTI comprising SCI providing COT sharing information.

Preferably in certain embodiments, for an SL BWP or a sidelink resource pool comprising more than one single RB set (or with being configured with a gap between RB sets), a responding UE could transmit S-SSB in a shared COT (no matter/regardless of EDT that COT initiating UE uses for initiating a COT).

Preferably in certain embodiments, EDT for S-SSB is NOT (pre-)configured when an SL BWP is configured with more than one single RB set (or with being configured with a gap between RB sets). Preferably in certain embodiments, EDT for S-SSB is NOT (pre-)configured when an associated sidelink resource pool (to the S-SSB) is configured with more than one single RB set (or with being configured with a gap between RB sets). In other words, EDT for S-SSB is NOT needed for multiple RB sets pool or SL BWP. Preferably in certain embodiments, the rationale is that the responding UE's maximum transmit power would be divided or separated into the multiple RB sets such that a regulation requirement could be met.

A third concept is that a first UE is not allowed to initiate a COT comprising TTIs associated with more than one sidelink resource pool in one sidelink BWP in one RB set (here exampled as one RB set, but not limited to one RB set). Preferably in certain embodiments, a sidelink resource pool boundary is at least determined as an ending time of COT. Preferably in certain embodiments, switching a boundary between two sidelink resource pools is at least determined as an ending time of COT. Alternatively, the first UE could initiate a COT comprising TTIs associated with more than one sidelink resource pool in one sidelink BWP in one RB set (here exampled as one RB set, but not limited to one RB set). The first UE can utilize the COT to perform sidelink transmission in the first/earliest sidelink resource pool among the more than one sidelink resource pool, and/or the first UE cannot utilize the COT to perform sidelink transmission in other sidelink resource pools among the more than one sidelink resource pool. This means that the first UE can utilize the COT to perform sidelink transmission in the first/earliest sidelink resource pool at most until the switching boundary (of the first/earliest sidelink resource pool and next sidelink resource pool) in time domain. Alternatively, the first UE could initiate a COT comprising TTIs associated with more than one sidelink resource pool in one sidelink BWP in one RB set (here exampled as one RB set, but not limited to one RB set) when the more than one sidelink resource pool is (pre-)configured with or associated with the same attributes/characteristics. The attributes/characteristics correspond to a same interlace structure, number of interlace corresponding to a sub-channel, EDT, and/or a number of RB sets (with a same starting RB set). When the more than one sidelink resource pool is NOT (pre-)configured with or associated with the same attributes/characteristics, the first UE is not allowed to initiate a COT comprising TTIs associated with more than one sidelink resource pool in one sidelink BWP in one RB set. Preferably in certain embodiments, for an SL BWP or a first sidelink resource pool comprising a single RB set (or without being configured with a gap between RB sets), the first UE is allowed to share COT from TTI in the first sidelink resource pool to the TTI associated with S-SSB.

A fourth concept is that a first UE initiates a COT comprising TTIs associated with more than one sidelink resource pool in one sidelink BWP in one RB set (here exampled as one RB set, but not limited to one RB set). The first UE is not allowed to share COT on TTIs being in different sidelink resource pools. Preferably in certain embodiments, the first UE could perform sidelink transmission on TTIs in the COT for its sidelink transmission. Preferably in certain embodiments, the first UE shall indicate remaining COT duration is until the switching boundary (of two sidelink resource pools) in time domain. Preferably and/or additionally, when switching boundary (is from TTI associated with a sidelink resource pool to TTI(s) associated with S-SSB), the first UE could indicate remaining COT duration covering TTI(s) associated with S-SSB. Preferably in certain embodiments, the first UE is not allowed or does not indicate remaining COT duration comprising TTIs associated with more than one sidelink resource pool. Alternatively, the first UE could share COT on TTIs being in different sidelink resource pools when the more than one sidelink resource pools is (pre-)configured with or associated with same attributes/characteristics. Attributes/characteristics correspond to the same interlace structure, number of interlace corresponding to a sub-channel, EDT, and/or a number of RB sets (with a same starting RB set). When the more than one sidelink resource pool is NOT (pre-)configured with or associated with same attributes/characteristics, the first UE is not allowed to share COT on TTIs being in different sidelink resource pools.

A fifth concept is that EDT for COT sharing is (pre-)configured as a same value among a set of sidelink resource pools. Preferably in certain embodiments, the set of sidelink resource pools are (pre-)configured in a same SL BWP. Preferably in certain embodiments, the set of sidelink resource pools are time domain division in at least one RB set. Preferably in certain embodiments, the SL BWP may comprise one or more RB sets. The set of sidelink resource pools comprise a first and a second sidelink resource pool. When both the first sidelink resource pool and the second sidelink resource pool comprise different TTIs but in the at least one RB set, the (pre-)configured EDT value shall be the same for these two sidelink resource pools. Alternatively, EDT (for COT sharing) could be (pre-)configured per RB set instead of per sidelink resource pool. Alternatively, when one sidelink resource pool comprising multiple RB sets, EDT (for COT sharing) could be (pre-)configured per RB set in the sidelink resource pool (e.g., multiple EDTs for COT sharing would be (pre-)configured for the sidelink resource pool). Preferably in certain embodiments, based on which RB set is used for initiating a COT, the COT initiating UE would determine which EDT to use. Preferably in certain embodiments, when the COT initiating UE determines a candidate resource occupying more than one RB set, one example is that the COT initiating UE uses/determines EDT based on the largest value among EDTs associated with the more than one RB set. Preferably in certain embodiments, another example is that when the COT initiating UE determines a candidate resource occupying more than one RB set, the COT initiating UE is not allowed to share COT to other UEs. Preferably in certain embodiments, another different example is that when the COT initiating UE determines a candidate resource occupying more than one RB set, the COT initiating UE merely shares a COT to other UEs, wherein the COT occupies a subset of the more than one RB set. Preferably in certain embodiments, the subset of the more than one RB set corresponds to RB sets with EDT being smaller than the EDT that the COT initiating UE uses/determines to initiate the COT. Alternatively, when one sidelink resource pool comprising multiple RB sets, one EDT (for COT sharing) could be (pre-)configured in the sidelink resource pool. Preferably in certain embodiments, the COT initiating UE would use the (same) one EDT when initiating COT (and also when the COT initiating UE determines to share the COT). Preferably in certain embodiments, no matter the COT initiating UE initiates COT occupying how many number of RB sets in the sidelink resource pool, the (same) one EDT could be used when the COT initiating UE initiates the COT. Alternatively, EDT (for COT sharing) could be (pre-)configured per SL BWP or carrier instead of per sidelink resource pool.

A sixth concept is from a (pre-)configuration point of view that for a sidelink carrier/cell/SL BWP in unlicensed spectrum, when one sidelink resource pool is configured with one RB set in the sidelink carrier/cell/SL BWP, the UE does not expect a configuration providing another sidelink resource pool being configured with the one RB set. Preferably in certain embodiments, one RB set is configured with merely one sidelink resource pool. Preferably in certain embodiments, even for different TTIs in the one RB set, different sidelink resource pools are not configured to be TDMed in the one RB set. Preferably in certain embodiments, a number of sidelink resource pools is at most the number of RB sets in a sidelink carrier/cell/SL BWP. For example, when a sidelink carrier/cell/SL BWP comprises X RB sets, the number of sidelink resource pools in the sidelink carrier/cell/SL BWP is at most X RB sets. Preferably in certain embodiments, when a sidelink resource pool may be configured with Y RB sets, then the UE does not expect that configuration to provide the number of sidelink resource pools being larger than 1+(X-Y) (e.g., 1 corresponds to the sidelink resource pool with Y RB sets).

Alternatively, from a (pre-)configuration point of view that for a sidelink carrier/cell/SL BWP in unlicensed spectrum, one SL BWP comprises only one sidelink resource pool. Preferably in certain embodiments, the UE does not expect a configuration providing more than one RB set in an SL BWP. Preferably in certain embodiments, the one sidelink resource pool comprises a same number of RB sets (or all RB sets associated with the one SL BWP) as the one SL BWP.

Preferably in certain embodiments, a UE (pre-)configured with a maximum number of (pre-)configured TDM sidelink resource pools in one RB set in an SL BWP.

Preferably in certain embodiments, there is a (pre-)configured maximum number of TDM sidelink resource pools in one RB set in an SL BWP.

Preferably in certain embodiments, when a network node provides such (pre-)configuration to a UE, the network node shall maintain or ensure a number of (pre-)configured TDM sidelink resource pools in one RB set being smaller than or equal to the (pre-)configured maximum number of TDM sidelink resource pools in one RB set. Preferably in certain embodiments, a UE does not expect to receive a configuration or being (pre-)configured with a number of (pre-)configured TDM sidelink resource pools in one RB set being larger than the (pre-)configured maximum number of TDM sidelink resource pools in one RB set.

Preferably in certain embodiments, one alternative is each RB set could be (pre-)configured with a maximum number of TDM sidelink resource pools. Preferably in certain embodiments, another alternative is that a number of (pre-)configured TDM sidelink resource pools for each RB set of all RB sets in SL BWP shall be smaller than or equal to a number of (pre-)configured TDM sidelink resource pools in one RB set. Preferably in certain embodiments, all RB sets are associated with a same number of (pre-)configured TDM sidelink resource pools in one RB set.

Preferably in certain embodiments, a maximum number of (pre-)configured TDM sidelink resource pools in one RB set in an SL BWP is 2.

A seventh concept is that when a candidate (multi-TTI) resource comprising a number of consecutive logical TTIs in a resource selection window is divided into at least two parts or subsets of TTIs in an actual system, the candidate (multi-TTI) resource is not determined as a (valid/identified/remaining/initialized) candidate (multi-TTI) resource. A UE, performing resource identification and selection, would exclude such a resource from a set of (valid/identified) candidate (multi-TTI) resources. Preferably in certain embodiments, when a candidate (multi-TTI) resource comprising the number of consecutive logical TTIs in the resource selection window does not comprise the number of consecutive physical TTIs, the candidate (multi-TTI) resource is excluded from a set of (valid/identified/remaining/initialized) candidate (multi-TTI) resources. Preferably in certain embodiments, when a candidate (multi-TTI) resource comprising the number of consecutive logical TTIs in the resource selection window is not consecutive in time domain, the candidate (multi-TTI) resource is excluded from a set of (valid/identified/remaining/initialized) candidate (multi-TTI) resources. The set of candidate (multi-TTI) resources (after performing resource exclusion) is reported to the higher layer of the UE. The set of candidate (multi-TTI) resources comprise candidate (multi-TTI) resources comprising a number consecutive logical TTIs in the resource selection window and being with RSRP below a threshold. Preferably in certain embodiments, cardinality or size of the set of candidate (multi-TTI) resources is at least X %*a total number of candidate (multi-TTI) resources in the resource selection window.

In one alternative, when a candidate (multi-TTI) resource comprising a number of consecutive logical TTIs in a resource selection window is divided into at least two parts or subsets of TTIs in an actual system, the UE does not count the candidate (multi-TTI) resource as a total number of (remaining) candidate (multi-TTI) resources in the resource selection window. Preferably in certain embodiments, when a candidate (multi-TTI) resource comprising the number of consecutive logical TTIs in the resource selection window does not comprise the number of consecutive physical TTIs, the UE does not count the candidate (multi-TTI) resource as total number of (remaining) candidate (multi-TTI) resources in the resource selection window. Preferably in certain embodiments, when a candidate (multi-TTI) resource comprising the number of consecutive logical TTIs in the resource selection window are not consecutive in time domain, the UE does not count the candidate (multi-TTI) resource as a total number of (remaining) candidate (multi-TTI) resources in the resource selection window. Preferably in certain embodiments, the total number of candidate (multi-TTI) resources is denoted as $M_{total}$ (e.g., notation is from step 1 in section 8.1.4 in TS 38.214).

A text proposal is provided below with underlining and bolding.

---

The following steps are used:
1) If a number of consecutive slots $N_{slot, MCSt}$ is provided with a value larger than 1, the candidate multi-slot resource definition is applied. Otherwise, the candidate single-slot resource definition is applied.
   . . .
   If the higher layer parameter transmissionStructureForPSCCHandPSSCH is set to 'contiguousRB', the UE shall exclude candidate single-slot or candidate multi-slot resources with the lowest subchannel including resource blocks of the intra-cell guardband PRBs, configured by higher layer parameter, intraCellGuardBandsSL-List.
   If a candidate multi-slot resource is separated by (actual/physical) slots NOT associated with a sidelink resource pool, the UE shall exclude the candidate multi-slot resources.
   The total number of remaining candidate single-slot resources or candidate multi-slot resources is denoted by $M_{total}$.

---

In a second alternative, the UE counts the candidate resource as a total number of (remaining) candidate (multi-TTI) resources in the resource selection window (for simplicity) and the UE excludes the candidate (multi-TTI) resource when initiating the set of candidate (multi-TTI) resources. Preferably in certain embodiments, when a candidate (multi-TTI) resource comprising the number of consecutive logical TTIs in the resource selection window does not comprise the number of consecutive physical TTIs, the UE excludes the candidate (multi-TTI) resource when initiating the set of candidate (multi-TTI) resources or the candidate (multi-TTI) resource is not included in the initialized set of candidate (multi-TTI) resources. Preferably in certain embodiments, when a candidate (multi-TTI) resource comprising the number of consecutive logical TTIs in the resource selection window are not consecutive in time domain, the UE excludes the candidate (multi-TTI) resource when initiating the set of candidate (multi-TTI) resources or the candidate (multi-TTI) resource is not included in the initialized set of candidate (multi-TTI) resources. Preferably in certain embodiments, the set of candidate (multi-TTI) resources correspond to set $S_A$ (e.g., notation is from step 4 in section 8.1.4 in TS 38.214)

A text proposal is provided below with underlining bolding.

---

The following steps are used:
4) The set $S_A$ is initialized to the set of all the candidate single-slot resources or candidate multi-slot resources, wherein in case of candidate multi-slot resources, a candidate multi-slot resource is excluded by the UE if the candidate multi-slot resource is separated by (actual/physical) slots NOT associated with a sidelink resource pool.

---

In a third alternative, the UE counts the candidate (multi-TTI) resource as the total number of candidate (multi-TTI) resources in the resource selection window (for simplicity) and the UE excludes the candidate (multi-TTI) resource when determining the set of (valid/identified) candidate (multi-TTI) resources. Preferably in certain embodiments, when a candidate (multi-TTI) resource comprising the number of consecutive logical TTIs in the resource selection window does not comprise the number of consecutive physical TTIs, the UE excludes the candidate (multi-TTI) resource when determining the set of (valid/identified) candidate (multi-TTI) resources. Preferably in certain embodiments, when a candidate (multi-TTI) resource comprising the number of consecutive logical TTIs in the resource selection window are not consecutive in time domain, the UE excludes the candidate (multi-TTI) resource when determining the set of (valid/identified) candidate (multi-TTI) resources. Preferably in certain embodiments, the set of candidate resources correspond to set $S_A$ (e.g., notation is from step 5× or step 6× in section 8.1.4 in TS 38.214)

A text proposal is proposed below with underlining and bolding.

---

The following steps are used:
  5x) The UE shall exclude any candidate multi-slot resource $R_{x,y}$ or $R_{x,y,z}$ from the set $S_A$ if the candidate multi-slot resource is separated by (actual/physical) slots NOT associated with a sidelink resource pool.
  6x) The UE shall exclude any candidate multi-slot resource $R_{x,y}$ or $R_{x,y,z}$ from the set $S_A$ if the candidate multi-slot resource is separated by (actual/physical) slots NOT associated with a sidelink resource pool.

---

Preferably in certain embodiments, the candidate (multi-TTI) resource is separated by (actual/physical) slots NOT associated with a sidelink resource pool.

Preferably in certain embodiments, there are some further conditions determining whether to exclude the candidate (multi-TTI) resource. Preferably in certain embodiments, the some further conditions may be CBR, higher layer configuration, and/or the number of 3 dB RSRP threshold increments.

Excluding the candidate (multi-TTI) resource is NOT performed (e.g., step 5× or step 6× is not performed) when a number of 3 dB RSRP thresholds increasing is larger than a number threshold. In other words, when the number of 3 dB RSRP thresholds increasing is NOT larger than a number threshold, the UE excludes the candidate (multi-TTI) resource.

In a fourth alternative, a candidate multi-slot resource definition is updated. Preferably in certain embodiments, when a multi-slot resource comprises $N_{slot,MCSt}$ consecutive slots starting from slot $t'^{SL}_y$ (which means the starting of the resource starts from the slot belonging to the sidelink resource pool for resource selection) but comprising slots NOT belonging to the sidelink resource pool, the multi-slot resource is not determined or defined as a candidate multi-slot resource. Preferably in certain embodiments, a set of candidate multi-slot resources correspond to set $S_A$ (e.g., notation is from step 4 in section 8.1.4 in TS 38.214) does not comprise the resource.

A text proposal is provided below with underlining and bolding. Preferably in certain embodiments, the following TP is to allow $R_{3,3}$ of FIG. 8 but disallow $R_{3,3}$ in FIG. 9.

---

1) If a number of consecutive slots $N_{slot, MCSt}$ is provided with a value larger than 1, the candidate multi-slot resource definition is applied. Otherwise, the candidate single-slot resource definition is applied.
If the higher layer parameter transmissionStructureForPSCCHandPSSCH is set to 'contiguousRB', a candidate multi-slot resource $R_{x,y}$ is defined as a set of $L_{subCH}$ contiguous sub-channels starting from sub-channel x in $N_{slot, MCSt}$ consecutive slots starting from slot $t'^{SL}_y$, and (at least) including slot y + l in slot $t'^{SL}_y$ where l = 0, . . . , $N_{slot,MCSt}$ − 1.
If the higher layer parameter transmissionStructureForPSCCHandPSSCH is set to 'interlaceRB', a candidate multi-slot resource $R_{x,y,z}$ is defined as a set of $L_{subCH}$ contiguous sub-channels starting from sub-channel x in $N_{slot, MCSt}$ consecutive slots starting from slot $t'^{SL}_y$ in $L_{RBset}$ contiguous RB sets starting from RB set z, and (at least) including slot y + l in slot $t'^{SL}_y$ where l = 0, . . . , $N_{slot,MCSt}$ − 1.

---

A text proposal is provided below with underlining and bolding. Preferably in certain embodiments, the following TP is to disallow both $R_{3,3}$ of FIG. 8 but disallow $R_{3,3}$ in FIG. 9.

---

1) If a number of consecutive slots $N_{slot, MCSt}$ is provided with a value larger than 1, the candidate multi-slot resource definition is applied. Otherwise, the candidate single-slot resource definition is applied.
If the higher layer parameter transmissionStructureForPSCCHandPSSCH is set to 'contiguousRB', a candidate multi-slot resource $R_{x,y}$ is defined as a set of $L_{subCH}$ contiguous sub-channels starting from sub-channel x in $N_{slot, MCSt}$ consecutive slots starting from slot $t'^{SL}_y$, and (at least) including slot y + l in slot $t'^{SL}_y$ where l = 0, . . . , $N_{slot,MCSt}$ − 1.
If the higher layer parameter transmissionStructureForPSCCHandPSSCH is set to 'interlaceRB', a candidate multi-slot resource $R_{x,y,z}$ is defined as a set of $L_{subCH}$ contiguous sub-channels starting from sub-channel x in $N_{slot, MCSt}$ consecutive slots starting from slot $t'^{SL}_y$ in $L_{RBset}$ contiguous RB sets starting from RB set z, and (at least) including slot y + l in slot $t'^{SL}_y$ where l = 0, . . . , $N_{slot,MCSt}$ − 1.
The $N_{slot, MCSt}$ consecutive slots in a candidate multi-slot resource $R_{x,y}$ or a candidate multi-slot resource $R_{x,y,z}$ shall be consecutive in actual/physical slot (NOT only being consecutive in logical slot).

Preferably in certain embodiments, for frequency domain definition for a candidate multi-slot resource, the following text proposal is used to determine that a multi-slot resource is not defined or determined as a candidate multi-slot resource when the length of the multi-slot resource with sub-channels or when the length of the multi-slot resource with RB sets exceeds the frequency boundary of a sidelink resource pool. Preferably in certain embodiments, a candidate multi-slot resource (in frequency domain) is determined being within a frequency resource (e.g., sub-channel for contiguousRB structure, or both sub-channel and RB set for interlaceRB structure) in a sidelink resource pool.

A text proposal is provided below with underlining and bolding.

1) If a number of consecutive slots $N_{slot, MCSt}$ is provided with a value larger than 1, the candidate multi-slot resource definition is applied. Otherwise, the candidate single-slot resource definition is applied.
If the higher layer parameter transmissionStructureForPSCCHandPSSCH is set to 'contiguousRB', a candidate multi-slot resource $R_{x, y}$ is defined as a set of $L_{subCH}$ contiguous sub-channels starting from sub-channel x in $N_{slot, MCSt}$ consecutive slots starting from slot $t'^{SL}_y$, and (at least) including sub-channel x + j in slot $t'^{SL}_y$ where j = 0, . . . , $L_{subCH}$ − 1.
If the higher layer parameter transmissionStructureForPSCCHandPSSCH is set to 'interlaceRB', a candidate multi-slot resource $R_{x, y, z}$ is defined as a set of $L_{subCH}$ contiguous sub-channels starting from sub-channel x in $N_{slot, MCSt}$ consecutive slots starting from slot $t'^{SL}_y$ in $L_{RBset}$ contiguous RB sets starting from RB set z, and (at least) including RB set z + k in slot $t'^{SL}_y$ where k = 0, . . . , $L_{RBset}$ − 1, and including sub-channel x + j in slot $t'^{SL}_y$ where j = 0, . . . , $L_{subCH}$ − 1.

Figure 8:
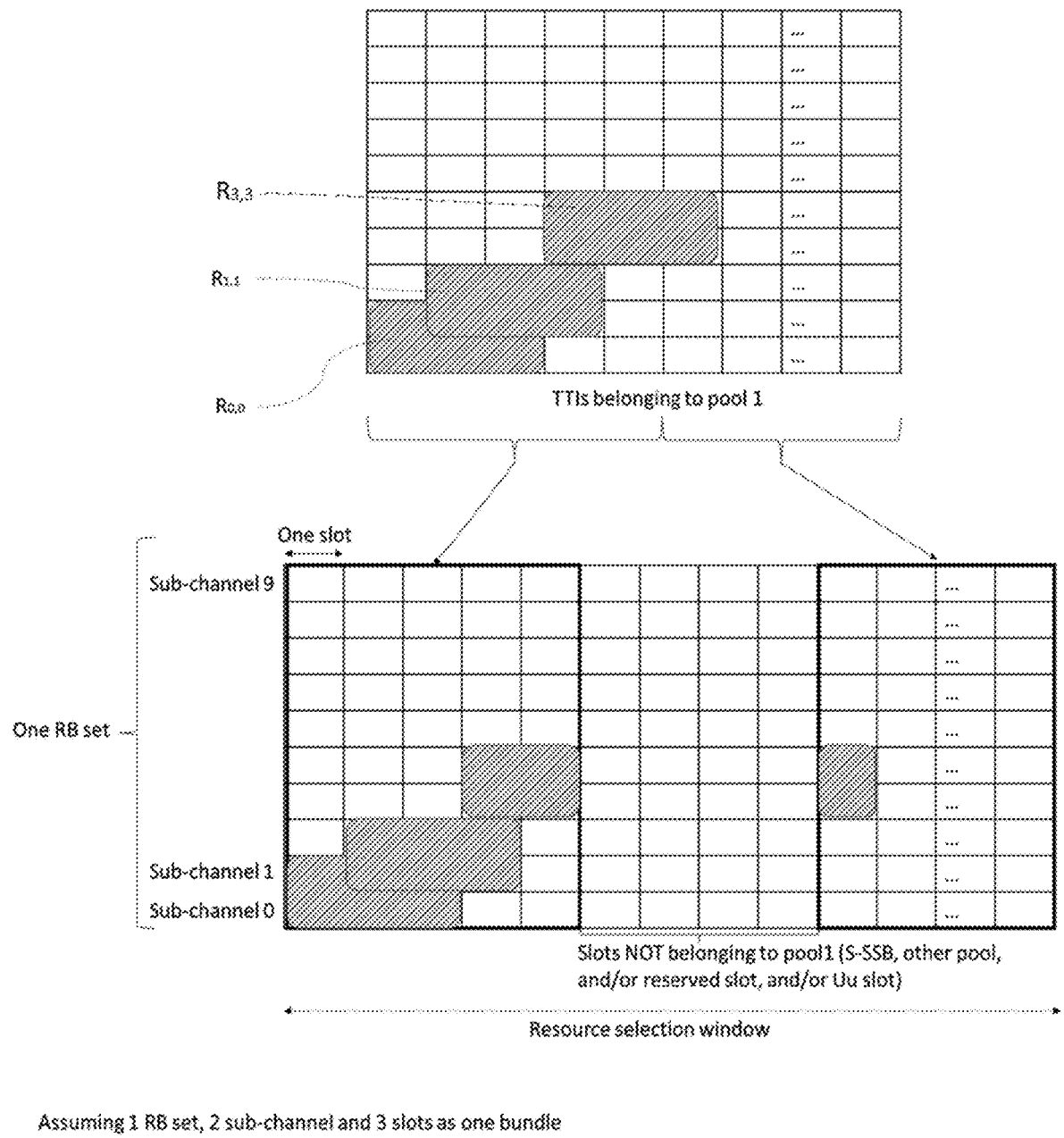
FIG. 8 is an example diagram showing sparse TTIs for candidate resources (but consecutive in logical domain), resulting in the UE performing an additional type-1 channel access procedure for accessing the channel, in accordance with embodiments of the present invention.
Figure 9:
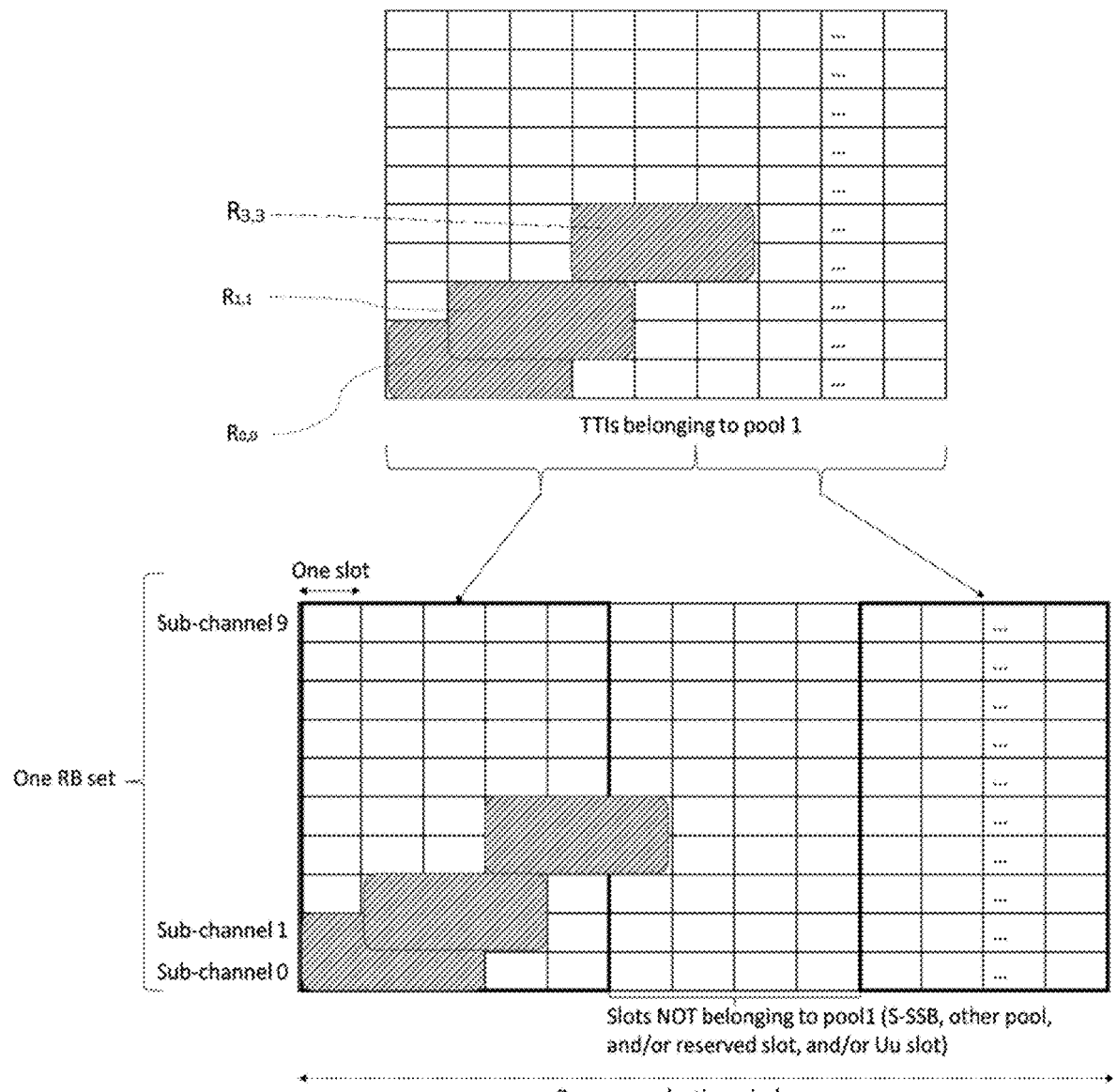
FIG. 9 is an example diagram showing that a candidate resource starts from TTIs in the sidelink resource pool but comprising/having TTIs outside the sidelink resource pool, such a candidate resource would be harmful for the UE since the UE has a reduced number of opportunities for sidelink transmission in unlicensed spectrum, in accordance with embodiments of the present invention.

For example, in FIG. 8 or FIG. 9, when a resource selection window comprises TTIs belonging to a sidelink resource pool and TTIs NOT belonging to the sidelink resource pool, determining candidate resource for multi-TTI for sidelink transmission in the sidelink resource pool should be enhanced. Otherwise, it would be as FIG. 8 shows sparse TTIs for candidate resources (but consecutive in logical domain), resulting in the UE performing an additional type-1 channel access procedure for accessing the channel. Alternatively, otherwise, it would be as FIG. 9 shows that a candidate resource starts from TTIs in the sidelink resource pool but comprising/having TTIs outside the sidelink resource pool, such a candidate resource would be harmful for the UE since the UE has a reduced number of opportunities for sidelink transmission in unlicensed spectrum.

An eighth concept is that when the UE selects a multi-TTI sidelink resource being discontinuously in time domain, there may be different handling of the UE. A UE may determine or select the multi-TTI sidelink resource based on mode-2 sensing and/or resource identification and/or resource selection for a sidelink resource pool.

When the multi-TTI sidelink resource comprises at least one TTI being NOT associated with the sidelink resource pool, the UE is not allowed to (attempt to) use the at least one TTI. Alternatively, when the multi-TTI sidelink resource comprises at least one TTI being NOT associated with the sidelink resource pool, but the UE has a selected or reserved resource or S-SSB being needed to be transmitted, the UE is allowed to (attempt to) use the at least one TTI. Preferably in certain embodiments, the at least one TTI is a remaining part of the multi-TTI sidelink resource or a later part of the multi-TTI sidelink resource in time domain.

When the multi-TTI sidelink resource comprises at least one TTI being associated with the sidelink resource pool and the at least TTI is discontinuously separated from part (e.g., previous/former part) of the multi-TTI sidelink resource, the UE is not allowed to (attempt to) use the at least one TTI. Alternatively, when the multi-TTI sidelink resource comprises at least one TTI being associated with the sidelink resource pool and the at least one TTI is discontinuously separated from part (e.g., previous/former part) of the multi-TTI sidelink resource, the UE is not allowed to (attempt to) use the at least one TTI. In one example, the at least one TTI is a remaining part of the multi-TTI sidelink resource or a later part of the multi-TTI sidelink resource in time domain.

When the UE performs one or more sidelink transmissions via the multi-TTI sidelink resource and when the UE stops sidelink transmission in at least one TTI of the multi-TTI (e.g., the at least one TTI is not associated with the sidelink resource pool, and/or the UE does not reserve/select another sidelink resource in the at least one TTI), the UE is not allowed to keep utilizing remaining resources, of the multi-TTI sidelink resource, after the at least one TTI.

The UE may consider the COT stops in the at least one TTI. For utilizing the remaining resources (which may or may not associate with the sidelink resource pool), the UE may need to initiate a new COT via Type-1 channel access.

Throughout the present disclosure, unlicensed spectrum corresponds that the UE needs to perform a type-1/2/2A/2B/2C channel access procedure before sidelink transmission.

Throughout the present disclosure, unlicensed spectrum could be replaced by the UE is (pre)configured with an RB set or guard band or interlace structure for sub-channel.

Throughout the present disclosure, actual/physical slots correspond to slots being used in a real time manner.

Throughout the present disclosure, logical slots correspond to slots associated with one sidelink resource pool or associated with being configured for sidelink.

Throughout the present disclosure, actual/physical slots in a carrier/cell are a superset of logical slots in a carrier/cell.

Throughout the present disclosure, a UE sharing a COT corresponds that the UE transmits a 1-st stage SCI with frequency assignment for indicating RB sets information associated with the COT and a 2-nd stage SCI with remaining COT information.

Throughout the present disclosure, both the 1-stage SCI and the 2-nd stage SCI are transmitted in a same TTI.

Throughout the present disclosure, the same TTI is the last TTI that a first part of COT where an initiating UE has data transmission in the COT.

Throughout the present disclosure, a COT could be separated into a first part, a second part, a third part, and the COT initiating UE could signal/indicate a remaining COT duration which is used for determining an end of the second part of the COT. Preferably in certain embodiments, the first part of the COT is used for the COT initiating UE's transmission. Preferably in certain embodiments, the second part of the COT is used for responding to the UE's transmission (e.g., COT initiating UE would perform sidelink reception). Preferably in certain embodiments, the third part of the COT is used for the COT initiating UE's transmission. Preferably in certain embodiments, in some examples, a COT may not comprise the third part of the COT. Preferably in certain embodiments, in some examples, when the COT initiating UE does not share the COT (e.g., signaled/indicated no remaining COT duration or remaining COT duration being as zero), there is no second part of the COT.

Throughout the present disclosure, a responding UE performs sidelink transmission using a shared COT after the responding UE performs a successful type-2/2A/2B/2C channel access procedure (for the sidelink transmission).

Throughout the present disclosure, a COT initiating UE initiates a COT after the COT initiating UE performs a successful type-1 channel access procedure.

Throughout the present disclosure, TTI, slot, mini-slot, subframe, a number of symbols could be used interchangeably.

Throughout the present disclosure, larger than, larger than and equal to could be used interchangeably.

Throughout the present disclosure, S-SSB is transmitted in a periodic manner and/or with a periodicity, and the periodicity is (pre-)configured.

Throughout the present disclosure, (in one period of S-SSB), S-SSB is transmitted in one or more TTIs, and a number of the one or more TTIs is (pre-)configured.

Throughout the present disclosure, S-SSB is transmitted in a number of RB sets in an SL BWP (when UE has a successful channel access procedure for the number of RB sets). Preferably in certain embodiments, the number of RB sets is a subset of all RB sets in the SL BWP or all RB sets in the SL BWP.

Throughout the present disclosure, for one RB set, S-SSB is transmitted in a repeated manner to equally span the one RB set (in order to fulfill the occupied channel bandwidth requirement (OCB) in regulation).

Figure 10:
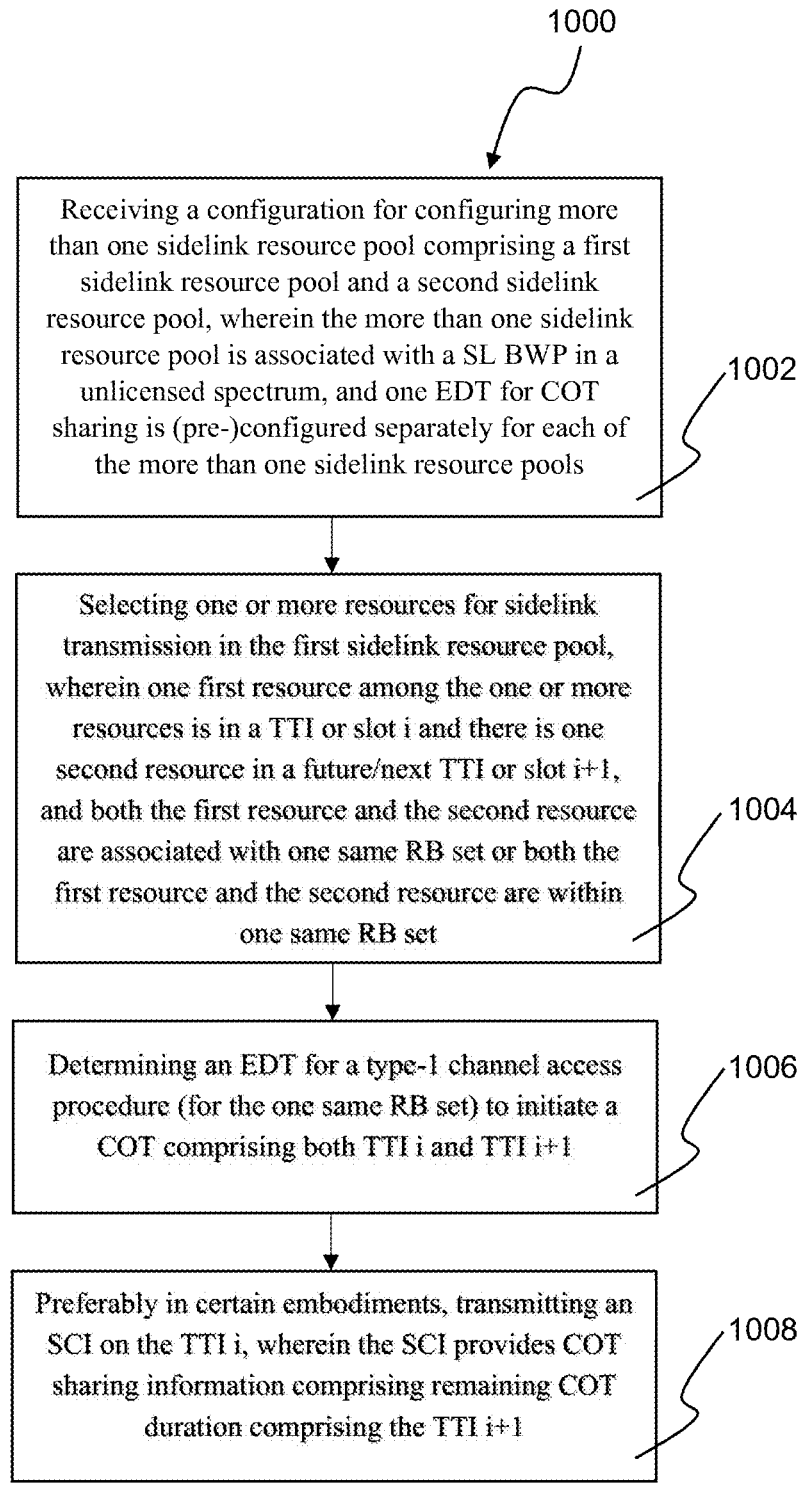
FIG. 10 is a flow diagram of a method of a first UE/device comprising receiving a configuration for configuring more than one sidelink resource pool comprising a first sidelink resource pool and a second sidelink resource pool, selecting one or more resources for sidelink transmission in the first sidelink resource pool, determining an EDT for a type-1 channel access procedure (for the one same RB set) to initiate a COT comprising both TTI i and TTI i+1, and preferably in certain embodiments, transmitting an SCI on the TTI i, wherein the SCI provides COT sharing information comprising remaining COT duration comprising the TTI i+1, in accordance with embodiments of the present invention.

Referring to FIG. 10, with this and other concepts, systems, and methods of the present invention, a method 1000 for a first UE/device in a wireless communication system comprises receiving a configuration for configuring more than one sidelink resource pool comprising a first sidelink resource pool and a second sidelink resource pool, wherein the more than one sidelink resource pool is associated with a SL BWP in a unlicensed spectrum, and one EDT for COT sharing is (pre-)configured separately for each of the more than one sidelink resource pools (step 1002), selecting one or more resources for sidelink transmission in the first sidelink resource pool, wherein one first resource among the one or more resources is in a TTI or slot i and there is one second resource in a future/next TTI or slot i+1, and both the first resource and the second resource are associated with one same RB set or both the first resource and the second resource are within one same RB set (step 1004), determining an EDT for a type-1 channel access procedure (for the one same RB set) to initiate a COT comprising both TTI i and TTI i+1 (step 1006), and preferably in certain embodiments, transmitting an SCI on the TTI i, wherein the SCI provides COT sharing information comprising remaining COT duration comprising the TTI i+1 (step 1008).

Preferably in certain embodiments, the determination of the EDT is based on a higher value of EDT (pre-)configured for the first and the second sidelink resource pools, and/or when EDT for the COT sharing (pre-)configured for the first sidelink resource pool is smaller than EDT for the COT sharing (pre-)configured for the second sidelink resource pool, the first UE determines EDT as EDT for the COT sharing (pre-)configured for the second sidelink resource pool, and/or when EDT for the COT sharing (pre-)configured for the first sidelink resource pool is higher than EDT for the COT sharing (pre-)configured for the second sidelink resource pool, the first UE determines EDT as EDT for the COT sharing (pre-)configured for the first sidelink resource pool, and/or in one example, when EDT for the COT sharing for the first sidelink resource pool is (pre-)configured as −60 dBm and EDT for the COT sharing for the second sidelink resource pool is (pre-)configured as −50 dBm, the first UE determines EDT for a type-1 channel access procedure based on EDT associated with the second sidelink resource pool (e.g., −50 dBm).

Preferably in certain embodiments, a different selection corresponds to a different TB or MAC PDU, and/or a different selection corresponds to a separate resource identification and selection procedure.

Preferably in certain embodiments, one resource corresponds to one TTI or one slot in one or the more than one sidelink resource pools, and/or the one or more resource for sidelink transmission is in a contiguous TTI or slot.

Preferably in certain embodiments, at least one RB set (e.g., the one same RB set) is time domain divided by the first sidelink resource pool and the second sidelink resource pool, and/or the at least one RB set being time domain divided by the first sidelink resource pool and the second sidelink resource pool corresponds to a slot level or a TTI level division, and/or one TTI or one slot being with one RB set does not simultaneously share to more than one sidelink resource pool.

Preferably in certain embodiments, the first UE monitors SCI in the second sidelink resource pool in the TTI i+1.

Preferably in certain embodiments, the first UE has sidelink data to transmit, and initiates the COT via a type-1 channel access procedure.

Preferably in certain embodiments, the sidelink data is associated with L1 priority which is associated with CAPC.

Preferably in certain embodiments, based on the associated CAPC, the first UE determines a maximum time duration for the COT.

Preferably in certain embodiments, when the maximum time duration of the COT comprises both TTI i and TTI i+1, the first UE determines the EDT based on the larger (pre-)configured one associated with the first and the second sidelink resource pools.

Preferably in certain embodiments, for the selected one or more resources, the first UE attempts to transmit all selected resources from the earliest one among the selected one or more resources.

Preferably in certain embodiments, for MCSt, the first UE selects another one or more resources in the second sidelink resource pool.

Preferably in certain embodiments, once the first UE has MCSt comprising both the first and the second sidelink resource pool, the first UE does not transmit SCI with the COT sharing information in TTI i, and instead the first UE may transmit another SCI with the COT sharing information in TTI i+1 or once the first UE does not have a selected sidelink resource in the COT.

Preferably in certain embodiments, if the EDT for the type-1 channel access procedure is larger than one EDT (pre-)configured for the second sidelink resource pool, the first UE shares the COT comprising TTI i+1.

Preferably in certain embodiments, if the EDT for the type-1 channel access procedure is smaller than one EDT (pre-)configured for the second sidelink resource pool, the first UE is not allowed to share the COT comprising TTI i+1.

Preferably in certain embodiments, if the determined EDT for the type-1 channel access procedure is based on at least or equal to EDT (pre-)configured for the first sidelink resource pool, the first UE at least shares the COT comprising TTI i.

Preferably in certain embodiments, if the determined EDT for the type-1 channel access procedure is based on at least or equal to EDT (pre-)configured for the first sidelink resource pool and EDT (pre-)configured for the first sidelink resource pool is larger than EDT (pre-)configured for the second sidelink resource pool, the first UE shares the COT comprising TTI i+1, and/or the remaining COT duration (set in SCI) cover(ing) both TTI i and TTI i+1 (two TTIs belonging to different sidelink resources in one RB set).

Preferably in certain embodiments, if the determined EDT for the type-1 channel access procedure is based on at least or equal to EDT (pre-)configured for the first sidelink resource pool and EDT (pre-)configured for the first sidelink resource pool is smaller than EDT (pre-)configured for the second sidelink resource pool, the first UE is not allowed to share the COT comprising TTI i+1, and/or the remaining COT duration is not allowed to (set in SCI) cover(ing) both TTI i and TTI i+1 (two TTIs belonging to different sidelink resources in one RB set).

Preferably in certain embodiments, no matter whether the first UE uses which EDT to perform the type-1 channel access procedure, the first UE (could) initiate the COT comprising TTI i and TTI i+1 (two TTIs belonging to different sidelink resources in one RB set).

Preferably in certain embodiments, the first UE performs a sidelink transmission using resources in TTI i and TTI i+1, wherein TB or MAC PDU transmitted on TTI i is different from TB or MAC PDU transmitted on TTI i+1.

Preferably in certain embodiments, one parameter is indicated by the higher layer of the first UE to indicate a number of consecutive TTIs in a bundle for one TB or MAC PDU.

Preferably in certain embodiments, when the first UE identifies a set of candidate resources in the first sidelink resource pool (within a resource selection window), the first UE determines a candidate resource (with such bundle) comprising the number of consecutive TTIs in a bundle.

Preferably in certain embodiments, when the one parameter indicates more than one, one candidate resource comprises the number of consecutive TTIs in a bundle.

Referring back to FIGS. 3 and 4, in one or more embodiments from the perspective of a first UE/device in a wireless communication system, the device 300 includes a program code 312 stored in memory 310 of the transmitter. The CPU 308 could execute program code 312 to: (i) receive a configuration for configuring more than one sidelink resource pool comprising a first sidelink resource pool and a second sidelink resource pool, wherein the more than one sidelink resource pool is associated with a SL BWP in a unlicensed spectrum, and one EDT for COT sharing is (pre-)configured separately for each of the more than one sidelink resource pools; (ii) select one or more resources for sidelink transmission in the first sidelink resource pool, wherein one first resource among the one or more resources is in a TTI or slot i and there is one second resource in a future/next TTI or slot i+1, and both the first resource and the second resource are associated with one same RB set or both the first resource and the second resource are within one same RB set; (iii) determine an EDT for a type-1 channel access procedure (for the one same RB set) to initiate a COT comprising both TTI i and TTI i+1; and (iv) preferably in certain embodiments, transmit an SCI on the TTI i, wherein the SCI provides COT sharing information comprising remaining COT duration comprising the TTI i+1. Moreover, the CPU 308 can execute the program code 312 to perform all of the described actions, steps, and methods described above, below, or otherwise herein.

Figure 11:
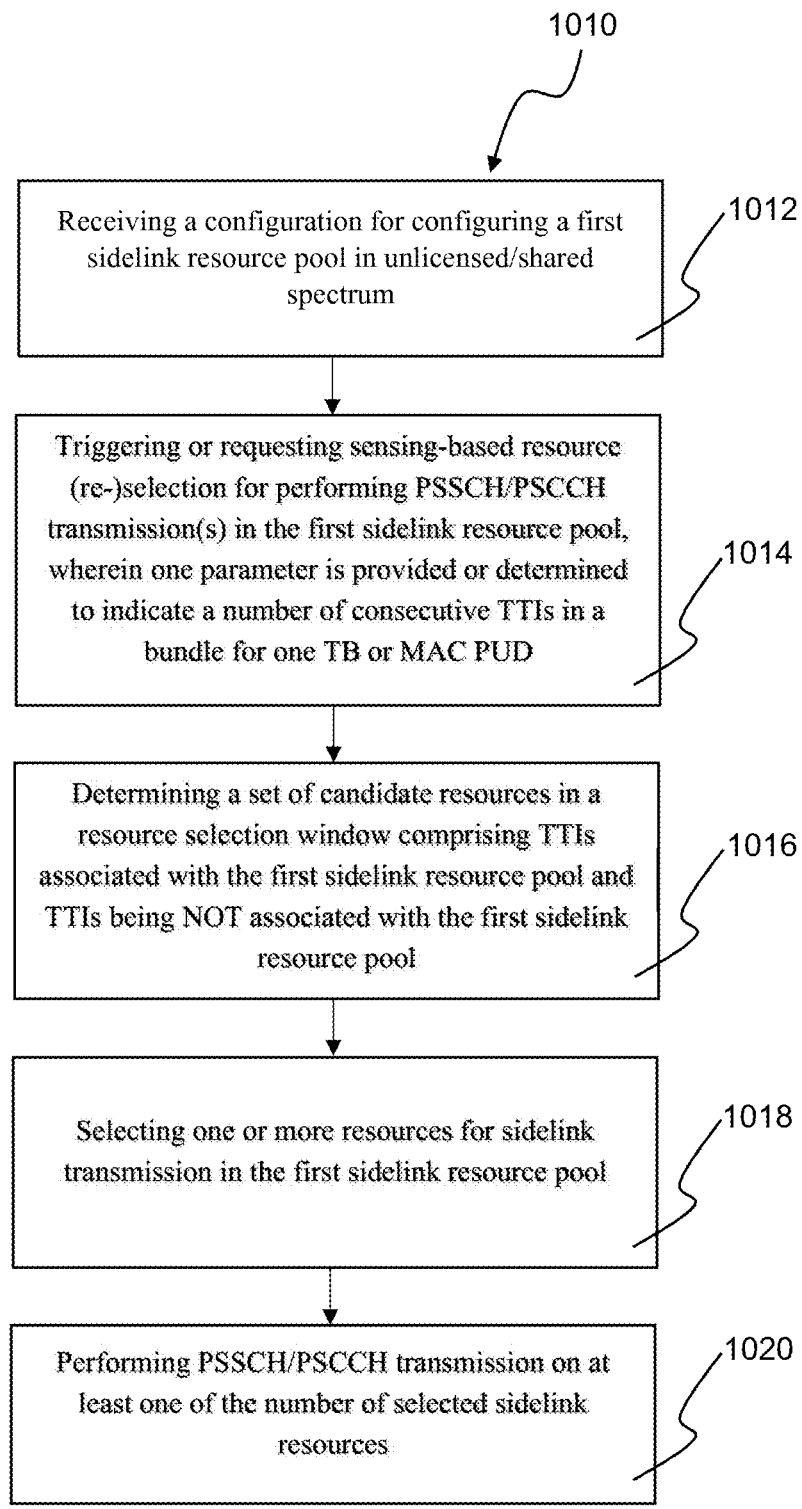
FIG. 11 is a flow diagram of a method of a first UE/device comprising receiving a configuration for configuring a first sidelink resource pool in unlicensed/shared spectrum, triggering or requesting sensing-based resource (re-)selection for performing PSSCH/PSCCH transmission(s) in the first sidelink resource pool, determining a set of candidate resources in a resource selection window comprising TTIs associated with the first sidelink resource pool and TTIs being NOT associated with the first sidelink resource pool, selecting one or more resources for sidelink transmission in the first sidelink resource pool, and performing PSSCH/PSCCH transmission on at least one of the number of selected sidelink resources, in accordance with embodiments of the present invention.

Referring to FIG. 11, with this and other concepts, systems, and methods of the present invention, a method 1010 for a first UE/device in a wireless communication system comprises receiving a configuration for configuring a first sidelink resource pool in unlicensed/shared spectrum (step 1012), triggering or requesting sensing-based resource (re-)selection for performing PSSCH/PSCCH transmission(s) in the first sidelink resource pool, wherein one parameter is provided or determined to indicate a number of consecutive TTIs in a bundle for one TB or MAC PUD (step 1014), determining a set of candidate resources in a resource selection window comprising TTIs associated with the first sidelink resource pool and TTIs being NOT associated with the first sidelink resource pool (step 1016), selecting one or more resources for sidelink transmission in the first sidelink resource pool (step 1018), and performing PSSCH/PSCCH transmission on at least one of the number of selected sidelink resources (step 1020).

Preferably in certain embodiments, the number of the valid/identified/remaining candidate multi-TTI resources is larger than or equal to $X-M_{total}$, wherein X is a configured value or ratio, and $M_{total}$ is a total number of initialized candidate multi-TTI resources in the part of the one or more RB sets or total number of initialized candidate single-TTI resources in the part of the one or more RB sets.

Preferably in certain embodiments, the resource selection window corresponds to 1, 5, 10, 20 milliseconds, and/or the resource selection window comprises TTI belonging to a second sidelink resource pool, TTI for S-SSB, TTI for Uu interface (e.g., DL, UL), and/or TTI for reserved purpose.

Preferably in certain embodiments, a first resource is excluded from the set of candidate resources or NOT included in the set of candidate resources when the first resource is starting in a TTI associated with the first sidelink resource pool and having the number of consecutive TTIs comprising at least one TTI NOT belonging to the first sidelink resource pool.

Preferably in certain embodiments, a first resource is NOT determined or defined as a candidate multi-TTI resource when the first resource is starting in a TTI associated with the first sidelink resource pool and having the number of consecutive TTIs comprising at least one TTI NOT belonging to the first sidelink resource pool.

Referring back to FIGS. 3 and 4, in one or more embodiments from the perspective of a first UE/device in a wireless communication system, the device 300 includes a program code 312 stored in memory 310 of the transmitter. The CPU 308 could execute program code 312 to: (i) receive a configuration for configuring a first sidelink resource pool in unlicensed/shared spectrum; (ii) trigger or request sensing-based resource (re-)selection for performing PSSCH/PSCCH transmission(s) in the first sidelink resource pool, wherein one parameter is provided or determined to indicate a number of consecutive TTIs in a bundle for one TB or MAC PUD; (iii) determine a set of candidate resources in a resource selection window comprising TTIs associated with the first sidelink resource pool and TTIs being NOT associated with the first sidelink resource pool; (iv) select one or more resources for sidelink transmission in the first sidelink resource pool; and (v) perform PSSCH/PSCCH transmission on at least one of the number of selected sidelink resources. Moreover, the CPU 308 can execute the program code 312 to perform all of the described actions, steps, and methods described above, below, or otherwise herein.

Figure 12:
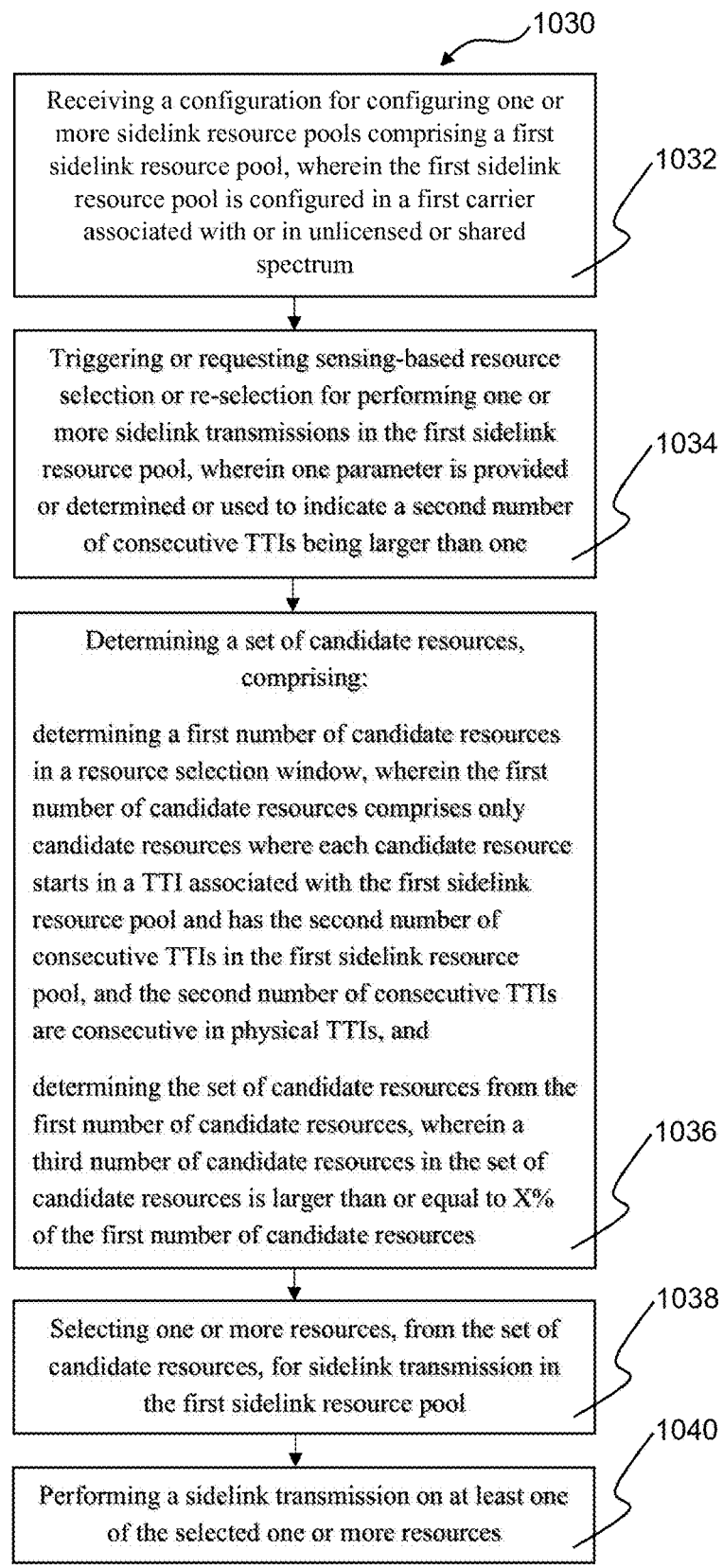
FIG. 12 is a flow diagram of a method of a first UE comprising receiving a configuration for configuring one or more sidelink resource pools comprising a first sidelink resource pool, triggering or requesting sensing-based resource selection or re-selection for performing one or more sidelink transmissions in the first sidelink resource pool, determining a set of candidate resources, comprising: determining a first number of candidate resources in a resource selection window and determining the set of candidate resources from the first number of candidate resources, selecting one or more resources, from the set of candidate resources, for sidelink transmission in the first sidelink resource pool, and performing a sidelink transmission on at least one of the selected one or more resources, in accordance with embodiments of the present invention.

Referring to FIG. 12, with this and other concepts, systems, and methods of the present invention, a method 1030 for a first UE in a wireless communication system comprises receiving a configuration for configuring one or more sidelink resource pools comprising a first sidelink resource pool, wherein the first sidelink resource pool is configured in a first carrier associated with or in unlicensed or shared spectrum (step 1032), triggering or requesting sensing-based resource selection or re-selection for performing one or more sidelink transmissions in the first sidelink resource pool, wherein one parameter is provided or determined or used to indicate a second number of consecutive TTIs being larger than one (step 1034), determining a set of candidate resources, comprising: determining a first number of candidate resources in a resource selection window, wherein the first number of candidate resources comprises only candidate resources where each candidate resource starts in a TTI associated with the first sidelink resource pool and has the second number of consecutive TTIs in the first sidelink resource pool, and the second number of consecutive TTIs are consecutive in physical TTIs, and determining the set of candidate resources from the first number of candidate resources, wherein a third number of candidate resources in the set of candidate resources is larger than or equal to X % of the first number of candidate resources (step 1036), selecting one or more resources, from the set of candidate resources, for sidelink transmission in the first sidelink resource pool (step 1038), and performing a sidelink transmission on at least one of the selected one or more resources (step 1040).

In various embodiments, the resource selection window comprises TTIs associated with the first sidelink resource pool and TTIs being not associated with the first sidelink resource pool, or the resource selection window comprises TTIs associated with the first sidelink resource pool, wherein TTI n and TTI n+1 of the TTIs associated with the first sidelink resource pool may or may not be physically consecutive in time domain, and/or the first sidelink resource pool comprises a single RB set, and/or the first sidelink resource pool is associated with one RB set.

In various embodiments, a TTI not associated with the first sidelink resource pool corresponds to any of Uu TTI, TTI associated with a second sidelink resource pool, or TTI for S-SSB, and/or the first sidelink resource pool comprises a subset of TTIs in the first carrier, and/or the subset of TTIs in the first carrier comprises at least two TTIs which are not consecutive in physical TTIs.

In various embodiments, the performing of the sidelink transmission is in response to a successful channel access procedure, and/or the first UE initiates a COT comprising one or more TTIs of the selected one or more resources, and/or the performing of the sidelink transmission comprises PSCCH and/or PSSCH.

In various embodiments, X % corresponds to or is configured by one sl-TxPercentage, and/or X % indicates a portion of candidate resources over the first number of candidate resources.

In various embodiments, the first number of candidate resources in the resource selection window corresponds to a total number of the candidate resources in the resource selection window and being associated with the first sidelink resource pool, and/or the first UE determines the set of candidate resources at least by performing candidate resource exclusion, from the first number of candidate resources, based on one or more sensing results.

In various embodiments, a first candidate resource starts in a TTI associated with the first sidelink resource pool, and having the second number of consecutive TTIs in the first sidelink resource pool, and if the second number of consecutive TTIs in the first sidelink resource pool are not consecutive in physical TTIs, the first number of candidate resources does not comprise the first candidate resource, and/or if the second number of consecutive TTIs in the first sidelink resource pool are consecutive in physical TTIs, the first number of candidate resources comprises the first candidate resource, and/or at least when TTI n of the first candidate resource and TTI n+1 of the first candidate resource is not physically consecutive in time domain, the first number of candidate resources does not comprise the first candidate resource.

In various embodiments, a second candidate resource starts in a TTI associated with the first sidelink resource pool, and having the second number of consecutive physical TTIs, and/or if the second number of consecutive physical TTIs comprises a TTI not associated with the first sidelink resource pool, the first number of candidate resources does not comprise the second candidate resource, and/or if the second number of consecutive physical TTIs comprises only TTIs associated with the first sidelink resource pool, the first number of candidate resources comprises the second candidate resource, and/or at least when one TTI of the second candidate resource is not associated with the first sidelink resource pool, the first number of candidate resources does not comprise the second candidate resource.

In various embodiments, the first UE receives one or more configurations for configuring one or more thresholds for UE-to-UE COT sharing, wherein the one or more configurations are configured per carrier.

In various embodiments, when both the first sidelink resource pool and a second sidelink resource pool are configured in the first carrier, the first sidelink resource pool and the second sidelink resource pool are associated with a same energy detection threshold for UE-to-UE COT sharing.

In various embodiments, when the first sidelink resource pool and a second sidelink resource pool are configured in a different carrier, the first sidelink resource pool and the second sidelink resource pool are associated with a same or a different energy detection threshold for UE-to-UE COT sharing.

In various embodiments, if the first UE receives a COT sharing information from a second UE in the second sidelink resource pool and remaining TTIs in a second COT according to the COT sharing information comprises the at least one of the selected one or more resources, the first UE performs a channel access procedure according to the energy detection threshold for UE-to-UE COT sharing.

Referring back to FIGS. 3 and 4, in one or more embodiments from the perspective of a first UE in a wireless communication system, the device 300 includes a program code 312 stored in memory 310 of the transmitter. The CPU 308 could execute program code 312 to: (i) receive a configuration for configuring one or more sidelink resource pools comprising a first sidelink resource pool, wherein the first sidelink resource pool is configured in a first carrier associated with or in unlicensed or shared spectrum; (ii) trigger or request sensing-based resource selection or re-selection for performing one or more sidelink transmissions in the first sidelink resource pool, wherein one parameter is provided or determined or used to indicate a second number of consecutive TTIs being larger than one; (iii) determine a set of candidate resources, comprising: determining a first number of candidate resources in a resource selection window, wherein the first number of candidate resources comprises only candidate resources where each candidate resource starts in a TTI associated with the first sidelink resource pool and has the second number of consecutive TTIs in the first sidelink resource pool, and the second number of consecutive TTIs are consecutive in physical TTIs, determining the set of candidate resources from the first number of candidate resources, wherein a third number of candidate resources in the set of candidate resources is larger than or equal to X % of the first number of candidate resources; (iv) select one or more resources, from the set of candidate resources, for sidelink transmission in the first sidelink resource pool; and (v) perform a sidelink transmission on at least one of the selected one or more resources. Moreover, the CPU 308 can execute the program code 312 to perform all of the described actions, steps, and methods described above, below, or otherwise herein.

Figure 13:
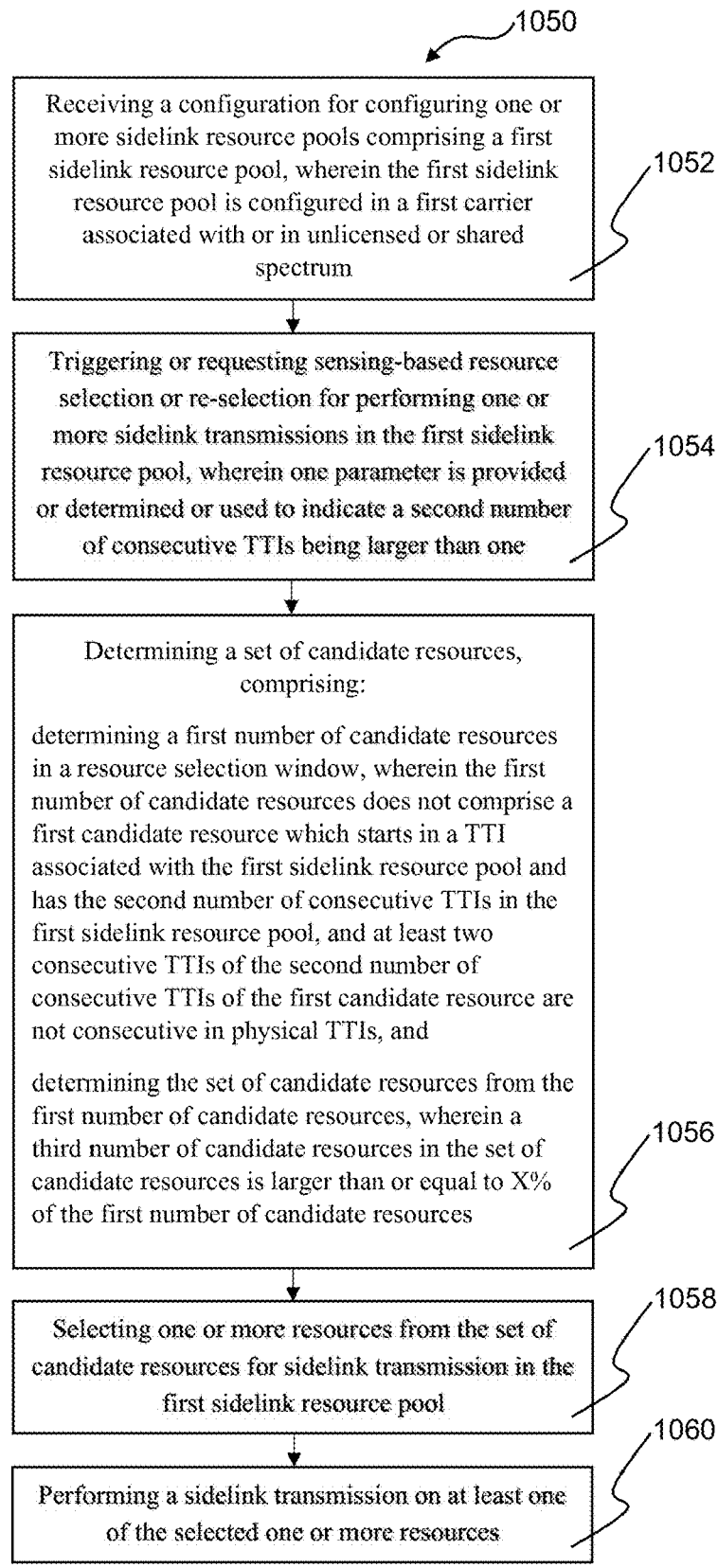
FIG. 13 is a flow diagram of a method of a first UE comprising receiving a configuration for configuring one or more sidelink resource pools comprising a first sidelink resource pool, triggering or requesting sensing-based resource selection or re-selection for performing one or more sidelink transmissions in the first sidelink resource pool, determining a set of candidate resources, comprising: determining a first number of candidate resources in a resource selection window and determining the set of candidate resources from the first number of candidate resources, selecting one or more resources from the set of candidate resources for sidelink transmission in the first sidelink resource pool, and performing a sidelink transmission on at least one of the selected one or more resources, in accordance with embodiments of the present invention.

Referring to FIG. 13, with this and other concepts, systems, and methods of the present invention, a method 1050 for a first UE in a wireless communication system comprises receiving a configuration for configuring one or more sidelink resource pools comprising a first sidelink resource pool, wherein the first sidelink resource pool is configured in a first carrier associated with or in unlicensed or shared spectrum (step 1052), triggering or requesting sensing-based resource selection or re-selection for performing one or more sidelink transmissions in the first sidelink resource pool, wherein one parameter is provided or determined or used to indicate a second number of consecutive TTIs being larger than one (step 1054), determining a set of candidate resources, comprising: determining a first number of candidate resources in a resource selection window, wherein the first number of candidate resources does not comprise a first candidate resource which starts in a TTI associated with the first sidelink resource pool and has the second number of consecutive TTIs in the first sidelink resource pool, and at least two consecutive TTIs of the second number of consecutive TTIs of the first candidate resource are not consecutive in physical TTIs, and determining the set of candidate resources from the first number of candidate resources, wherein a third number of candidate resources in the set of candidate resources is larger than or equal to X % of the first number of candidate resources (step 1056), selecting one or more resources from the set of candidate resources for sidelink transmission in the first sidelink resource pool (step 1058), and performing a sidelink transmission on at least one of the selected one or more resources (step 1060).

In various embodiments, the resource selection window comprises TTIs associated with the first sidelink resource pool and TTIs being not associated with the first sidelink resource pool, or the resource selection window comprises TTIs associated with the first sidelink resource pool, wherein TTI n and TTI n+1 of the TTIs associated with the first sidelink resource pool may or may not be physically consecutive in time domain, and/or the first sidelink resource pool comprises a single RB set, and/or the first sidelink resource pool is associated one RB set.

In various embodiments, a TTI not associated with the first sidelink resource pool corresponds to any of Uu TTI, TTI associated with a second sidelink resource pool, or TTI for S-SSB, and/or the first sidelink resource pool comprises a subset of TTIs in the first carrier, and/or the subset of TTIs in the first carrier comprises at least two TTIs which are not consecutive in physical TTIs.

In various embodiments, the at least two consecutive TTIs are in the first sidelink resource pool and are separated by a TTI not associated with the first sidelink resource pool.

In various embodiments, the first number of candidate resources does not comprise a second candidate resource which starts in a TTI associated with the first sidelink resource pool, having a second number of consecutive physical TTIs, and the second number of consecutive physical TTIs comprises at least a TTI not associated with the first sidelink resource pool.

In various embodiments, the performing of the sidelink transmission is in response to a successful channel access procedure, and/or the first UE initiates a COT comprising one or more TTIs of the selected one or more resources, and/or the performing of the sidelink transmission comprises PSCCH and/or PSSCH.

In various embodiments, X % corresponds to or is configured by one sl-TxPercentage, and/or X % indicates a portion of candidate resources over the first number of candidate resources.

In various embodiments, the first number of candidate resources in the resource selection window corresponds to a total number of candidate resources in the resource selection window and being associated with the first sidelink resource pool, and/or the first number of candidate resources is determined at least by excluding any candidate resource which starts in a TTI associated with the first sidelink resource pool and has the second number of consecutive TTIs in the first sidelink resource pool, and at least two consecutive TTIs of the second number of consecutive TTIs of the any candidate resource are not consecutive in physical TTIs, and/or the first UE determines the set of candidate resources at least by performing candidate resource exclusion, from the first number of candidate resources, based on one or more sensing results.

Referring back to FIGS. 3 and 4, in one or more embodiments from the perspective of a first UE in a wireless communication system, the device 300 includes a program code 312 stored in memory 310 of the transmitter. The CPU 308 could execute program code 312 to: (i) receive a configuration for configuring one or more sidelink resource pools comprising a first sidelink resource pool, wherein the first sidelink resource pool is configured in a first carrier associated with or in unlicensed or shared spectrum; (ii) trigger or request sensing-based resource selection or re-selection for performing one or more sidelink transmissions in the first sidelink resource pool, wherein one parameter is provided or determined or used to indicate a second number of consecutive TTIs being larger than one; (iii) determine a set of candidate resources, comprising: determining a first number of candidate resources in a resource selection window, wherein the first number of candidate resources does not comprise a first candidate resource which starts in a TTI associated with the first sidelink resource pool and has the second number of consecutive TTIs in the first sidelink resource pool, and at least two consecutive TTIs of the second number of consecutive TTIs of the first candidate resource are not consecutive in physical TTIs, and determining the set of candidate resources from the first number of candidate resources, wherein a third number of candidate resources in the set of candidate resources is larger than or equal to X % of the first number of candidate resources; (iv) select one or more resources from the set of candidate resources for sidelink transmission in the first sidelink resource pool; and (v) perform a sidelink transmission on at least one of the selected one or more resources. Moreover, the CPU 308 can execute the program code 312 to perform all of the described actions, steps, and methods described above, below, or otherwise herein.

In various embodiments, a method in a wireless communication system comprises receiving a configuration for configuring a first sidelink resource pool, triggering or requesting sensing-based resource selection or re-selection for performing one or more sidelink transmissions in the first sidelink resource pool, wherein one parameter is provided or determined or used to indicate a second number of consecutive TTIs being larger than one, determining a set of candidate resources, comprising: determining a first number of candidate resources in a resource selection window, wherein the first number of candidate resources comprises only candidate resources where each candidate resource starts in a TTI associated with the first sidelink resource pool and has the second number of consecutive TTIs in the first sidelink resource pool, and the second number of consecutive TTIs are consecutive in physical TTIs.

Any combination of the above or herein concepts or teachings can be jointly combined, in whole or in part, or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a first User Equipment (UE), comprising:
receiving a configuration for configuring one or more sidelink resource pools comprising a first sidelink resource pool, wherein the first sidelink resource pool is configured in a first carrier associated with or in unlicensed or shared spectrum, and the first sidelink resource pool comprises a subset of Transmission Time Intervals (TTIs) in the first carrier, and the subset of TTIs in the first carrier comprises at least two TTIs which are separated by at least a TTI for New Radio (NR) downlink or uplink, or for NR Sidelink Synchronization Signal Block (S-SSB);
receiving one or more configurations for configuring one or more thresholds for UE-to-UE Channel Occupancy Time (COT) sharing, wherein the one or more configurations are configured per carrier, wherein when both the first sidelink resource pool and a second sidelink resource pool are configured in the first carrier, the first sidelink resource pool and the second sidelink resource pool are associated with a same energy detection threshold for the UE-to-UE COT sharing;
triggering or requesting sensing-based resource selection or re-selection for performing one or more sidelink transmissions in the first sidelink resource pool, wherein one parameter is provided or determined or used to indicate a second number of consecutive TTIs being larger than one;
determining a set of candidate resources, comprising:
determining a first number of candidate resources in a resource selection window, wherein the first number of candidate resources comprises only candidate resources where each candidate resource starts in a TTI associated with the first sidelink resource pool and has the second number of consecutive TTIs in the first sidelink resource pool, and the second number of consecutive TTIs are consecutive in physical TTIs; and
determining the set of candidate resources from the first number of candidate resources, wherein a third number of candidate resources in the set of candidate resources is larger than or equal to a percentage of the first number of candidate resources;
selecting one or more resources, from the set of candidate resources, for sidelink transmission in the first sidelink resource pool;
performing, if COT sharing information is received from a second UE in the second sidelink resource pool and remaining TTIs in a second COT according to the COT sharing information comprises the at least one of the selected one or more resources, a channel access procedure according to the energy detection threshold for the UE-to-UE COT sharing; and
performing a sidelink transmission on at least one of the selected one or more resources.

2. The method of claim 1, wherein:
the resource selection window comprises TTIs associated with the first sidelink resource pool and TTIs being not associated with the first sidelink resource pool, or the resource selection window comprises TTIs associated with the first sidelink resource pool, wherein TTI n and TTI n+1 of the TTIs associated with the first sidelink resource pool are possibly not physically consecutive in time domain, and/or
the first sidelink resource pool comprises a single Resource Block (RB) set, and/or
the first sidelink resource pool is associated with one RB set.

3. The method of claim 1, wherein:
the performing of the sidelink transmission is in response to a successful channel access procedure, and/or
the first UE initiates a COT comprising one or more TTIs of the selected one or more resources, and/or
the performing of the sidelink transmission comprises Physical Sidelink Control Channel (PSCCH) and/or Physical Sidelink Shared Channel (PSSCH).

4. The method of claim 1, wherein:
the percentage corresponds to or is configured by one sl-TxPercentage, and/or
the percentage indicates a portion of candidate resources over the first number of candidate resources.

5. The method of claim 1, wherein:
the first number of candidate resources in the resource selection window corresponds to a total number of the candidate resources in the resource selection window and being associated with the first sidelink resource pool, and/or
the first UE determines the set of candidate resources at least by performing candidate resource exclusion, from the first number of candidate resources, based on one or more sensing results.

6. The method of claim 1, wherein:
a first candidate resource starts in a TTI associated with the first sidelink resource pool, and having the second number of consecutive TTIs in the first sidelink resource pool, and if the second number of consecutive TTIs in the first sidelink resource pool are not consecutive in physical TTIs, the first number of candidate resources does not comprise the first candidate resource, and/or
if the second number of consecutive TTIs in the first sidelink resource pool are consecutive in physical TTIs, the first number of candidate resources comprises the first candidate resource, and/or
at least when TTI n of the first candidate resource and TTI n+1 of the first candidate resource is not physically consecutive in time domain, the first number of candidate resources does not comprise the first candidate resource.

7. The method of claim 1, wherein:
a second candidate resource starts in a TTI associated with the first sidelink resource pool, and having the second number of consecutive physical TTIs, and/or
if the second number of consecutive physical TTIs comprises a TTI not associated with the first sidelink resource pool, the first number of candidate resources does not comprise the second candidate resource, and/or
if the second number of consecutive physical TTIs comprises only TTIs associated with the first sidelink resource pool, the first number of candidate resources comprises the second candidate resource, and/or
at least when one TTI of the second candidate resource is not associated with the first sidelink resource pool, the first number of candidate resources does not comprise the second candidate resource.

8. The method of claim 1, wherein when the first sidelink resource pool and the second sidelink resource pool are configured in a different carrier, the first sidelink resource pool and the second sidelink resource pool are associated with a same or a different energy detection threshold for UE-to-UE COT sharing.

9. A method of a first User Equipment (UE), comprising:
receiving a configuration for configuring one or more sidelink resource pools comprising a first sidelink resource pool, wherein the first sidelink resource pool is configured in a first carrier associated with or in unlicensed or shared spectrum, and the first sidelink resource pool comprises a subset of Transmission Time Intervals (TTIs) in the first carrier, and the subset of TTIs in the first carrier comprises at least two TTIs which are separated by at least a TTI for New Radio (NR) downlink or uplink, or for NR Sidelink Synchronization Signal Block (S-SSB);
triggering or requesting sensing-based resource selection or re-selection for performing one or more sidelink transmissions in the first sidelink resource pool, wherein one parameter is provided or determined or used to indicate a second number of consecutive TTIs being larger than one;
determining a set of candidate resources, comprising:
determining a first number of candidate resources in a resource selection window, wherein the first number of candidate resources does not comprise a first candidate resource which starts in a TTI associated with the first sidelink resource pool and has the second number of consecutive TTIs in the first sidelink resource pool, and at least two consecutive TTIs of the second number of consecutive TTIs of the first candidate resource are not consecutive in physical TTIs; and
determining the set of candidate resources from the first number of candidate resources, wherein a third number of candidate resources in the set of candidate resources is larger than or equal to a percentage of the first number of candidate resources;
selecting one or more resources from the set of candidate resources for sidelink transmission in the first sidelink resource pool; and
performing a sidelink transmission on at least one of the selected one or more resources.

10. The method of claim 9, wherein:
the resource selection window comprises TTIs associated with the first sidelink resource pool and TTIs being not associated with the first sidelink resource pool, or
the resource selection window comprises TTIs associated with the first sidelink resource pool, wherein TTI n and TTI n+1 of the TTIs associated with the first sidelink resource pool are possibly not physically consecutive in time domain, and/or
the first sidelink resource pool comprises a single Resource Block (RB) set, and/or
the first sidelink resource pool is associated one RB set.

11. The method of claim 9, wherein the at least two consecutive TTIs are in the first sidelink resource pool and are separated by a TTI not associated with the first sidelink resource pool.

12. The method of claim 9, wherein the first number of candidate resources does not comprise a second candidate resource which starts in a TTI associated with the first sidelink resource pool, having a second number of consecutive physical TTIs, and the second number of consecutive physical TTIs comprises at least a TTI not associated with the first sidelink resource pool.

13. The method of claim 9, wherein:
the performing of the sidelink transmission is in response to a successful channel access procedure, and/or
the first UE initiates a Channel Occupancy Time (COT) comprising one or more TTIs of the selected one or more resources, and/or
the performing of the sidelink transmission comprises Physical Sidelink Control Channel (PSCCH) and/or Physical Sidelink Shared Channel (PSSCH).

14. The method of claim 9, wherein:
the percentage corresponds to or is configured by one sl-TxPercentage, and/or
the percentage indicates a portion of candidate resources over the first number of candidate resources.

15. The method of claim 9, wherein:
the first number of candidate resources in the resource selection window corresponds to a total number of candidate resources in the resource selection window and being associated with the first sidelink resource pool, and/or
the first number of candidate resources is determined at least by excluding any candidate resource which starts in a TTI associated with the first sidelink resource pool and has the second number of consecutive TTIs in the first sidelink resource pool, and at least two consecutive TTIs of the second number of consecutive TTIs of the any candidate resource are not consecutive in physical TTIs, and/or
the first UE determines the set of candidate resources at least by performing candidate resource exclusion, from the first number of candidate resources, based on one or more sensing results.

* * * * *